United States Patent [19]

Hall et al.

[11] 4,406,004

[45] Sep. 20, 1983

[54] RING SCHEDULING APPARATUS FOR A DIGITAL MULTIPLEXED TELECOMMUNICATION SYSTEM

[75] Inventors: Jay D. Hall, Westminster; Theodore M. Stump, Costa Mesa; Charles W. Thode, Tustin, all of Calif.

[73] Assignee: Anaconda-Ericsson, Inc., Greenwich, Conn.

[21] Appl. No.: 204,298

[22] Filed: Nov. 5, 1980

[51] Int. Cl.[3] .................. H04J 3/12; H04M 3/02; H04Q 5/08

[52] U.S. Cl. .................. 370/15; 179/17 E; 179/18 HB; 370/110.1

[58] Field of Search .......... 179/18 HB, 51 AA, 17 E, 179/84 A, 84 R; 370/15, 110.1, 56, 58

[56] References Cited

U.S. PATENT DOCUMENTS

| | | | |
|---|---|---|---|
| 3,767,857 | 10/1973 | Colas et al. | 179/18 HB |
| 3,978,292 | 8/1976 | Hill et al. | 179/18 HB |
| 4,048,448 | 9/1977 | Canniff et al. | 179/17 E |
| 4,079,210 | 3/1978 | Sanderson | 179/18 HB |
| 4,081,613 | 3/1978 | Reines et al. | 179/18 J |
| 4,140,877 | 2/1979 | Joslow et al. | 370/86 |
| 4,161,633 | 7/1979 | Treiber | 179/170.2 |
| 4,192,007 | 3/1980 | Becker | 179/17 E X |
| 4,270,028 | 5/1981 | Young | 179/84 R |
| 4,273,964 | 6/1981 | Szpindel | 179/84 R |
| 4,282,410 | 8/1981 | Gauthier et al. | 179/84 R |

OTHER PUBLICATIONS

"Study of a Rural Digital End Office", M. J. Kelly, GTE Automatic Electric Journal, May 1977, pp. 294-302.

"Applications for Programmable Ringing Generators", by D. J. Becker, INTELEC 78, International Telephone Energy Conference (Washington, D.C.), Oct. 25-27, 1978, Conf. Record, pp. 292-298.

Primary Examiner—Thomas W. Brown
Attorney, Agent, or Firm—Knobbe, Martens, Olson & Bear

[57] ABSTRACT

A ring scheduling apparatus for use in a digital multiplexed telephone communication system. The apparatus utilizes a controller which sorts messages indicating which telephone lines are being rung and what frequency and DC signal level are required to ring the lines. The messages are sorted into voltage and frequency compatible groups, and then digital data is sent to a ring signal generating circuit to control the frequency of the ring signal generated and the polarity of the DC signal upon which the ring signal is superimposed. Disclosure of a multiplexer and line interface circuitry for use in this system is included as well as a self-test circuit for testing the audio circuitry of idle telephone lines.

34 Claims, 15 Drawing Figures

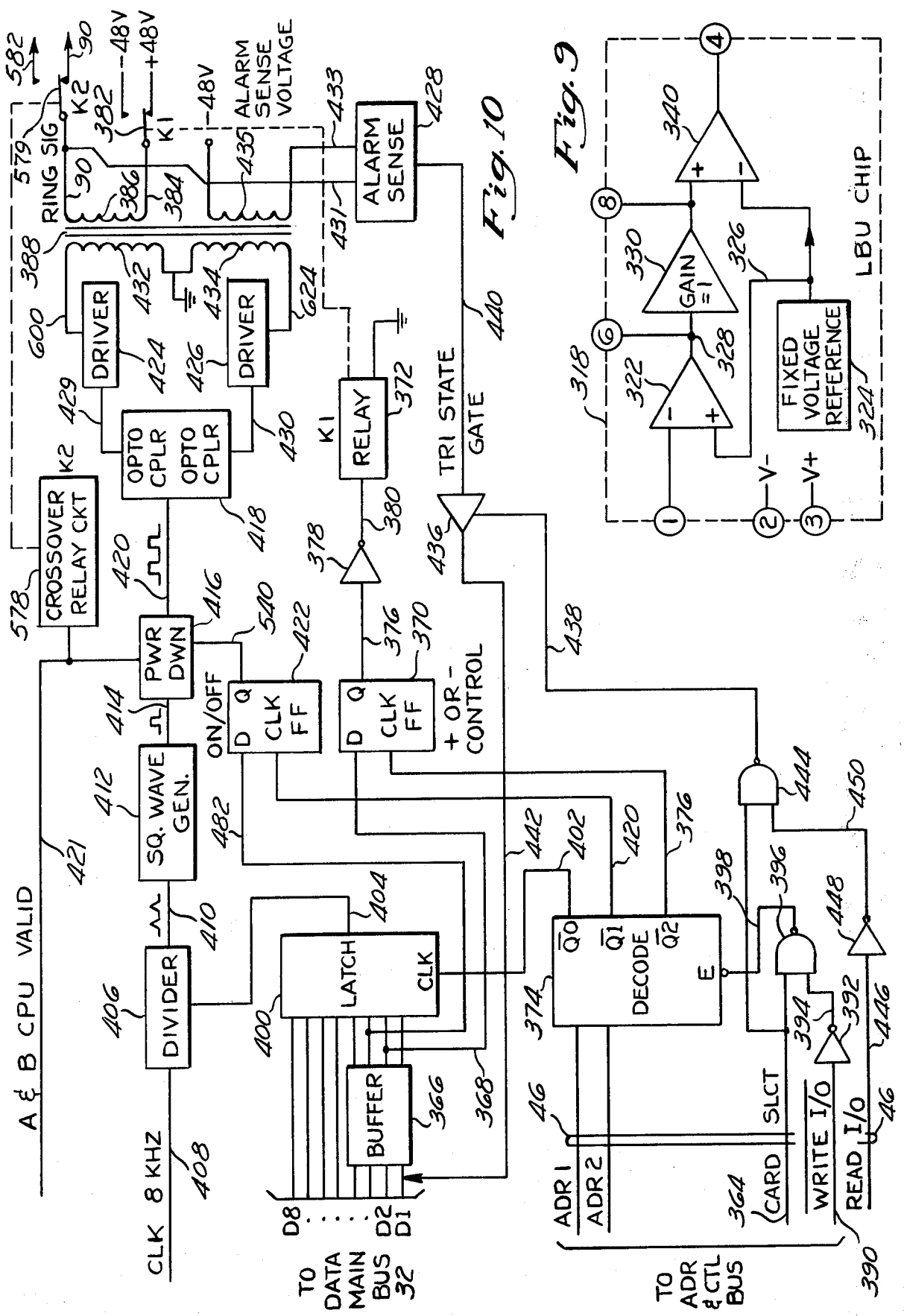

RING SCHEDULING APPARATUS FOR A DIGITAL MULTIPLEXED TELECOMMUNICATION SYSTEM

CROSS-REFERENCE TO RELATED APPLICATIONS

The subject matter of this disclosure is related to the subject matter of the following copending patent applications: Automatic Self-Test System For A Digital Multiplexed Telecommunication System, Serial Number, 204,300, Filed on even date herewith; and FIFO Buffer For Use In A Multiplexer of A Digital Multiplexed Telecommunication System, Ser. No. 204,299, Filed on even date herewith.

BACKGROUND OF THE INVENTION

As the cost of copper and copper cable rises and the population of the world increases, it is becoming more important for telephone companies to avoid installing new telephone cables to meet increased demands for service. High costs of new cable, new repeaters, new poles, and new central office switching circuitry would be incurred. In addition, labor costs in installing new cable on new poles and tearing up the streets and highways for new underground routes would drive costs still higher. All these news costs would necessitate rate hikes with the ultimate cost being borne by the telephone subscribers.

Accordingly, telephone utilities have sought ways to stretch their already existing facilities by such techniques as digital time division multiplexing and frequency multiplexing so that larger numbers of telephone users can all share the fixed number of circuits available in the cables already in place. Frequency division multiplexing involves transmitting the outgoing speech signals of a telephone line on one frequency and receiving the incoming speech signals for that line on a different frequency. Each telephone line then operates independently on its own pair of carrier frequencies, which pair of frequencies is different from all the other pairs of frequencies assigned to the other telephones sharing the common link. All the frequencies then are transmitted over the common link with frequency selective filters associated with each telephone such that no interference between the individual conversations occurs.

The digital multiplexing system disclosed herein uses time division multiplexing whereby each conversation is assigned a particular time slot on a common circuit in a cable, which time slot is different from the time slots assigned to all the other conversations traveling down the common circuit "simultaneously". The analog or varying amplitude speech signals comprising the transmit and receive portions of each telephone conversation are converted to digital signals comprised of binary words or bytes. Each byte is a predetermined number of bits in length. Each combination of logic ones and zeroes in each byte represents a different amplitude level of the speech signal during a particular sample period. That is, each varying amplitude speech signal is chopped into a number of pieces of the same duration, which duration is called the sampling period. An analog-to-digital converter then converts the amplitude of the speech signal during each sampling period to a digital word in a code which represents that amplitude. For example, if an eight-bit word is used with each bit either a one or a zero, there are 256 distinct combinations whch can be made. Each combination represents a specific amplitude level of the speech signal. These data words are then transmitted to the other party over the common circuit during the assigned time slot whereupon circuitry at the other end reconverts the digital words back to analog signals and transmits them to the earpiece of the second telephone. A similar circuit transmits the speech signals from this second telephone back to the earpiece of the first telephone during the same time slot.

Each common link circuit is called a span line, and each span line is comprised of two pairs of wires, one pair for each direction of transmission. Each span line in the disclosed system normally handles sixty-four telephone lines, and there are two span lines in the system, such that one-hundred and twenty-eight users can be coupled to the central office over only four pairs of wires. When one span line breaks down, all 128 users are coupled to the remaining span line.

Because span lines cover large distances and causes losses such that signals become weaker as they travel down the line, it is necessary to insert repeater amplifiers in the line to periodically boost the signal levels. Thus, it is advantageous to use digital multiplexing because it is easier for the repeaters to detect binary ones and zeroes than analog signals. As long as the repeaters can distinguish between a one and a zero, the distance of transmission has no effect on received signal quality. Also, identical circuitry is used as opposed to frequency multiplexing where different frequencies require different frequency selective filters.

The present invention pertains generally to the field of digital multiplexed telecommunication systems and, more particularly, to apparatus for scheduling ringing telephones on party lines into frequency and voltage compatible groups and for generating the proper ring signal for each group.

SUMMARY OF THE INVENTION

The present invention provides an apparatus for use in a digital multiplexed telephone communication system for generating a ring signal for use on party lines used by the Bell Telephone System or as used by the independent telephone companies. The Bell Telephone System's party line uses ring signals which are all of the same frequency but vary in the polarity of the DC signal upon which the frequency is imposed. These party lines also vary in that the individual subscriber telephones connected to them respond to these ring signals only if applied to a selected one of the tip or ring lines comprising the party line. The independent telephone companies, on the other hand, use subscriber telephones on each party line, each of which responds to a different frequency ring signal.

The ring scheduling circuitry disclosed herein includes a controller which sorts messages indicating which telephones are ringing and what frequency and polarity of ring signal is required. These messages are sorted into groups of telephones which are voltage and/or frequency compatible. The controller then causes a ring signal generator to generate a periodic waveform ring signal of the proper characteristics, i.e., the proper frequency and superimposed upon the proper polarity DC voltage level during different clock periods of a duty cycle for the generator means. The controller then causes this signal to be coupled to the telephone line which is to be rung. Line termination circuitry under the control of the controller couples the ring signal to the proper lines coupled to telephones which are to be rung. The controller establishes duty cycles comprised of ringing periods interrupted by quiet periods. The line termination circuitry under controller direction couples the frequency and/or voltage compatible groups of lines to the ring signal generator during the portions of the duty cycle in which the ring signal generator is generating the proper frequency ring signal superimposed on the proper polarity DC voltage level.

A transformer is used to superimpose the ring signal upon a DC voltage level of the proper polarity. Amplifiers are used to drive the primary windings of this transformer with the ring signal generated by the signal generator. A signal generator is used to generate a periodic waveform to be coupled to the amplifiers, the frequency of which is controlled by a control word from the controller. A latch is used for storing the digital data from a controller which indicates what frequency of ring signal is to be generated by the signal generator and what polarity of DC signal upon which the ring signal is to be superimposed. This digital data is fed to the signal generator to control the frequency and to relay circuitry for causing the proper DC voltage to be applied to the secondary of the transformer.

DESCRIPTION OF THE DRAWINGS

These, and other advantages of the present invention, are best understood through reference to the drawings, in which:

FIG. 9 is a circuit diagram of the one-kilohertz LBU detector circuit forming part of the one-kilohertz detector;

FIG. 10 is a block diagram of the ring generator card;

DETAILED DESCRIPTION OF THE PREFERRED EMBODIMENT

Figure 1:
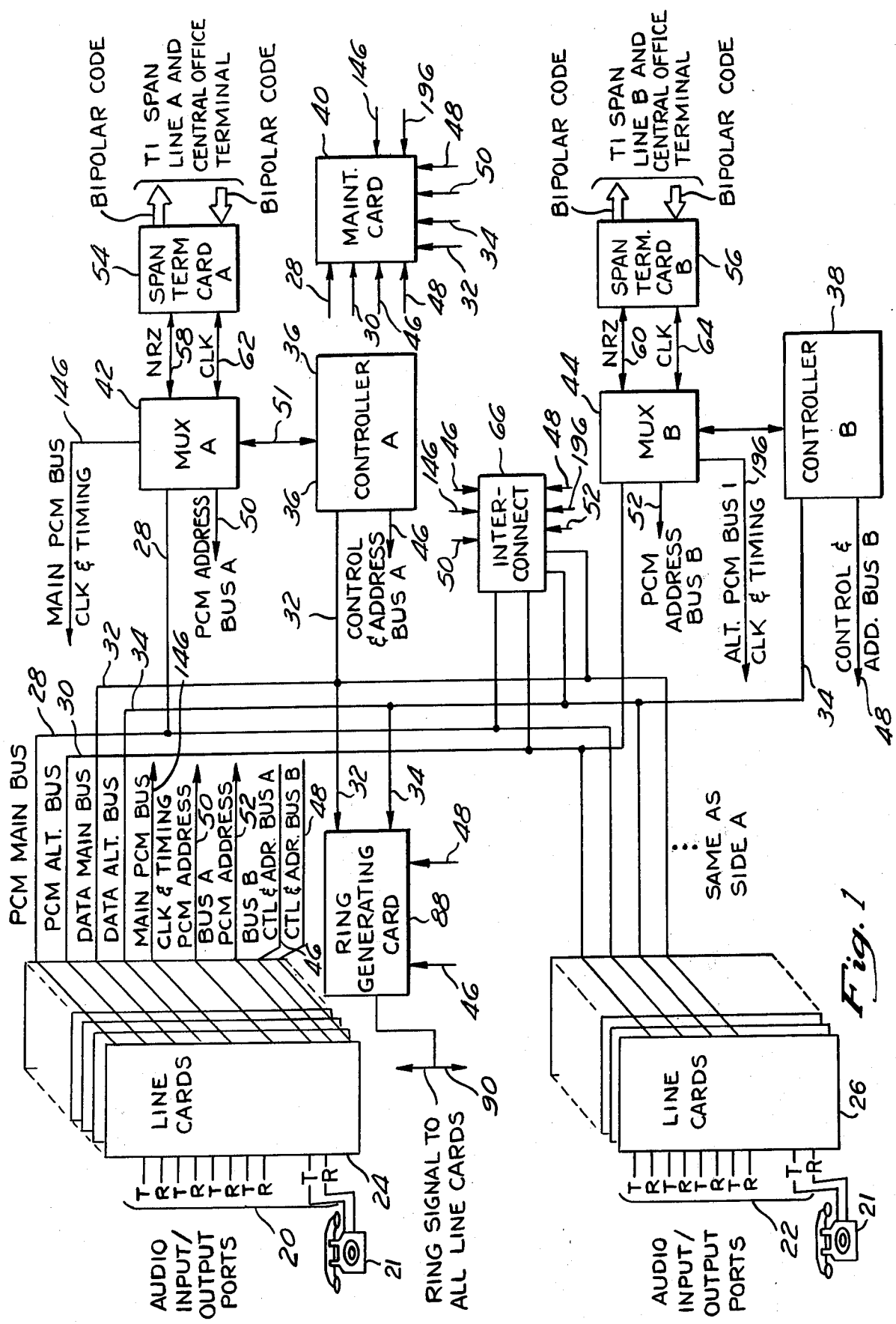
FIG. 1 is a block diagram of the digital multiplexing communication system.

FIG. 1 shows a block diagram of the major functional components in either the remote terminal or the central office terminal of the digital time division multiplexing system which incorporates the circuitry of the present invention.

The audio signals to and from the telephones 21 of the subscribers enter and leave the system on tip and ring pair groups 20 and 22. Each group of four telephone lines, i.e., eight wires, is coupled to one line card of which cards 24 and 26 are illustrative.

These line cards serve to interface the tip and ring telephone lines to the digital multiplexer system by performing several functions. First, they provide a stratus indication on whether any of the telephones connected to the line card are off-hook or dialing. The line card also amplifies the audio signals, converts outgoing audio to digital data and converts incoming digital data to audio signals, filters out high frequency components and other undesirable elements caused by these conversions and stores or buffers the signals for use by the rest of the system.

The line cards are coupled to the eight-bit parallel PCM main bus 28 and a PCM alternate bus 30. These buses carry the pulse code modulated digital signals to and from the multiplexers 42 and 44. The alternate bus is for reliability purposes, i.e., should one side of the system fail, its other side can then service the lines coupled to the failed side. The line cards are also coupled to the eight-bit parallel data main bus 32 and data alternate bus 34. These data buses carry digital status and control information to a pair of controllers 36 and 38 which control the two halves of the system, as will be more fully discussed below.

Controller A 36 and controller B 38 each contain a programmed microprocessor in the preferred embodiment. These controllers independently and asynchronously control the A and B halves of the terminal and each has two principal functions: call processing and maintenance supervision. The arrangement shown in FIG. 1 is used both at the remote terminal which interfaces with the actual telephone lines being serviced, and at the central office terminal which multiplexes the calls on the lines from the central office onto the span line coupled to the remote terminal. The controllers at both ends of the system have the same structure, but there is a difference in controller operation between the two ends of the system. For example, the controllers at the remote terminal end have a call processing function which includes checking the status of all the line cards via data buses 32 and 34 to determine which telephones are off-hook and which telephones are not in use. The remote terminal (RT) controller's call processing function also includes detecting pulse dialing on a dial-type telephone and transmitting a code indicating the number dialed to the central office (CO) controller which then causes a dial pulse relay connected to the proper line going to the central office switching apparatus to recreate the number dialed by suitably shorting together the tip and ring lines of the line to the central office.

The CO controller call processing functions are to allocate a time slot to a particular telephone user who is receiving a call or who is making a call. The CO controller also cancels time slots for terminated calls. In addition, the CO controller detects what lines from the central office are ringing and what frequency and DC polarity ring signal is present and sends a message to RT controllers indicating what lines are ringing and containing ring codes designating the frequency and polarity of the ring signal to be applied to the line being called. Both controllers at both ends engage in their maintenance supervision functions when not busy doing call processing operations. Basically, this maintenance supervision involves the automatic self-testing of the operational status of the line cards including alarm and display functions indicating when and where failures have been found.

Controller A 36 is coupled to all the line cards by control and address bus A 46 and data main bus 32. Controller B 38 is coupled to all the line cards by control and address bus B 48 and data alternate bus 34. Other individual control lines from both controller A 36 and controller B 38 are coupled to various circuits in the system to coordinate functions as needed.

Multiplexer A 42 serves to do the digital switching function under the control of controller A 36. For example, when controller A 36, assuming it is a CO controller, wants to connct a particular line for a telephone being called to the central office line which it finds ringing, it will scan for a free time slot and assign the time slot to the subscriber being called. There are twenty-three possible time slots of the twenty-four time slots on a span line in the system. The twenty-fourth time slot is used for supervisory message transmission between the CO and RT controllers. After the CO controller assigns a time slot, it signals the RT controller during the twenty-fourth time slot to indicate which telephone is being called and which time slot has been assigned. Controller A 36 and will then send a control word over bus 51 to MUX A 42 telling it what exchange to make and during which time slot to make it. Bus 51 includes data, address, and control lines of controller A 36.

MUX A 42 is fundamentally a limited-scope, high-speed computer which uses the control word from controller A 36 as its program. The eight-bit, parallel digital data coming from and going to the particular telephones in use pass back and forth from the line cards involved via PCM main bus 28 with each transfer to and from a particular line card buffer occurring during the assigned time slot for that conversation. Multiplexer 42 contains a clock oscillator and counter which counts out the multiplexer's internal time slots. There are two multiplexer internal time slots for each span line time slot. Each multiplexer internal time slot has a read cycle and a write cycle. The control word received on bus 51 is stored in a memory which stores the control words for each internal time slot. The control word for each time slot is decoded in the multiplexer to tell it what source and what destination are involved in the transfer for that particular time slot.

Two transfers are made during each internal time slot. During the write cycle of a particular time slot, the multiplexer 42 will move the data to be sent to the telephone assigned that time slot from a source register, such as the span line receiver, to the line card buffer. During the previous read cycle, the binary data stored in the line card buffer coupled to the telephone line assigned that time slot is loaded onto the PCM main bus 28 and read into an input buffer in MUX A 42 coupled to the PCM main bus 28. During the write cycle of the next internal time slot associated with the single time slot assigned on the span line, the data in the input data buffer will be loaded in a destination register, such as the transmitter inside MUX A 42. During the read cycle of this next internal time slot, the data in the output buffer of the MUX will be loaded onto PCM main bus 28 and loaded into the buffer of the line card coupled to the telephone to which the data is being sent.

The timing/control signals to be sent to the line cards to control these transfers are generated in internal control timing circuitry coupled to the clock oscillator in MUX A 42.

The address signals which are needed to select the line cards and individual line buffers involved in these transfers are generated in internal source/destination decoder circuitry coupled to the control word memory holding the control words for each time slot.

The aforementioned timing/control signals and address signals are sent to all the line cards via PCM address bus A 50 and clock and timing bus 146. Similar functions are performed by MUX B 44, PCM address bus B 52, and clock and timing bus 196.

Both multiplexers 42 and 44 convert the eight-bit, parallel digital data received on the PCM main and alternate data buses to a serial bit stream in NRZ, i.e., non-return-to-zero, code. This serial bit stream is transmitted to span terminating cards A and B, 54 and 56 respectively, on lines 58 and 60 respectively. Likewise, multiplexers 42 and 48 receive serial NRZ code from span terminating cards A and B and convert this serial data to parallel PCM data in NRZ code for transmission on PCM main and alternate buses 28 and 30. Multiplexers 42 and 44 also supply clock signals on lines 62 and 64 respectively, to span terminating cards 54 and 56, respectively, for use by those circuits if these multiplexers are functioning in the central office terminal, as will be described more fully below.

Span terminating cards A and B, 54 and 56, serve to interface between the multiplexers 42 and 44 and the T1-type repeatered span line, as described in Bell System and At&T specifications available to the public. Since this type of repeatered line is not designed to transmit digital signals in NRZ code, i.e., unipolar code, the span terminating cards 54 and 56 combine the NRZ code and the clock signal from the multiplexers into a bipolar code suitable for transmission out on a T1-type repeatered line. In the other direction, the span terminating cards 54 and 56 convert received bipolar data into unipolar NRZ code. Each span terminating card 54 and 56 has an output for coupling to a transmit pair of a T1 line and an input terminal for coupling to a receive pair of a T1 line. The span line cards of the central office terminal also provide current feed to the repeaters.

Interconnect card 66 serves to help the system during heavy traffic conditions. Each of the A and B halves of the system can only accommodate twenty-three conversations at any particular time because that is all the time slots that are available on a T1 line with twenty-four time slots. When all twenty-three time slots in either half of the system are filled, the twenty-fourth user on that half of the system who is calling or being called will be shut out by an equipment busy signal. The interconnect card 66 serves to provide an overflow path for these shut out users to the other half of the system if there are unused time slots on that side. Likewise, when one side of the system fails, all the users connected to that half of the circuit are coupled to the other half. The interconnect circuit 66 aids in this transfer. Interconnect circuit 66 is coupled to PCM main and alternate buses 28 and 30, the data main and alternate buses 32 and 34, CPU control and address buses A and B, 46 and 48, PCM address buses A and B 50 and 52, and clock and timing buses 146 and 196. The transfer function of interconnect circuit 66 is under the control of controllers 36 and 38.

The circuitry of the line cards, multiplexers A and B, 42 and 44, controllers A and B, 36 and 38, span terminating cards A and B, 54 and 56, and interconnect circuit 66 is not critical to the invention and any circuitry which accomplishes the functions described herein will be adequate. The design and construction of these circuits is well within the capability of any designer of digital telecommunication systems in the exercise of ordinary engineering skill given a knowledge of the functions of these circuits as described herein. Detailed description of some of the circuitry will be omitted for the sake of brevity so that the true gist of the invention will not be lost in excessive detail.

Maintenance card 40 is shared by both halves of the system and is coupled to both the PCM data buses 28 and 30, both CPU data buses 32 and 34, both control and address buses 46 and 48, and both PCM address buses 50 and 52 and both PCM clock and timing buses 146 and 196. The maintenance card 40 has circuitry to generate a one-kilohertz test tone in parallel, digital, eight-bit word format with eight digital words comprising the digital amplitude description of a single cycle of a one-kilohertz sinusoid. This digital data can be addressed by the multiplexers 42 and 44 under the control of controllers 36 and 38 as a source of digital data to be sent to a particular line.

The maintenance card 40 also includes circuitry to detect the presence of a one-kilohertz tone or, more accurately, the digital representation thereof, and to indicate the presence or absence of such a signal.

The self-test feature of the system described herein involves the controllers 36 and 38, the multiplexers 42 and 44, the line cards 24 and 26, and the maintenance card 40. Each half of the system works in similar fashion so only the A side will be discussed. Controller A 36 constantly scans the line cards for their status by sequentially addressing the status registers of each line card via control and address bus 46. The status word in each register indicates the on-hook or off-hook condition of each line coupled to the line card, which status word is read into memory in controller 36 via data main bus 32. Controller 36, by virtue of this call processing function, also knows which lines are idle. A self-test program for the CPU in controller A sequentially tests the audio link circuitry of each idle line by sending the proper control words to the multiplexer 42. This control word causes multiplexer 42 to obtain a byte of the one-kilohertz test tone from maintenance card 40 and send it to the proper line card and the proper input buffer thereof for the idle line to be tested. These control words also direct the multiplexer to send the data received from the line card back to the one-kilohertz detection circuitry on maintenance card 40. Maintenance card 40 also includes controller addressable alarm and display circuitry for indicating when and on what line a failure has occurred.

Figure 2:
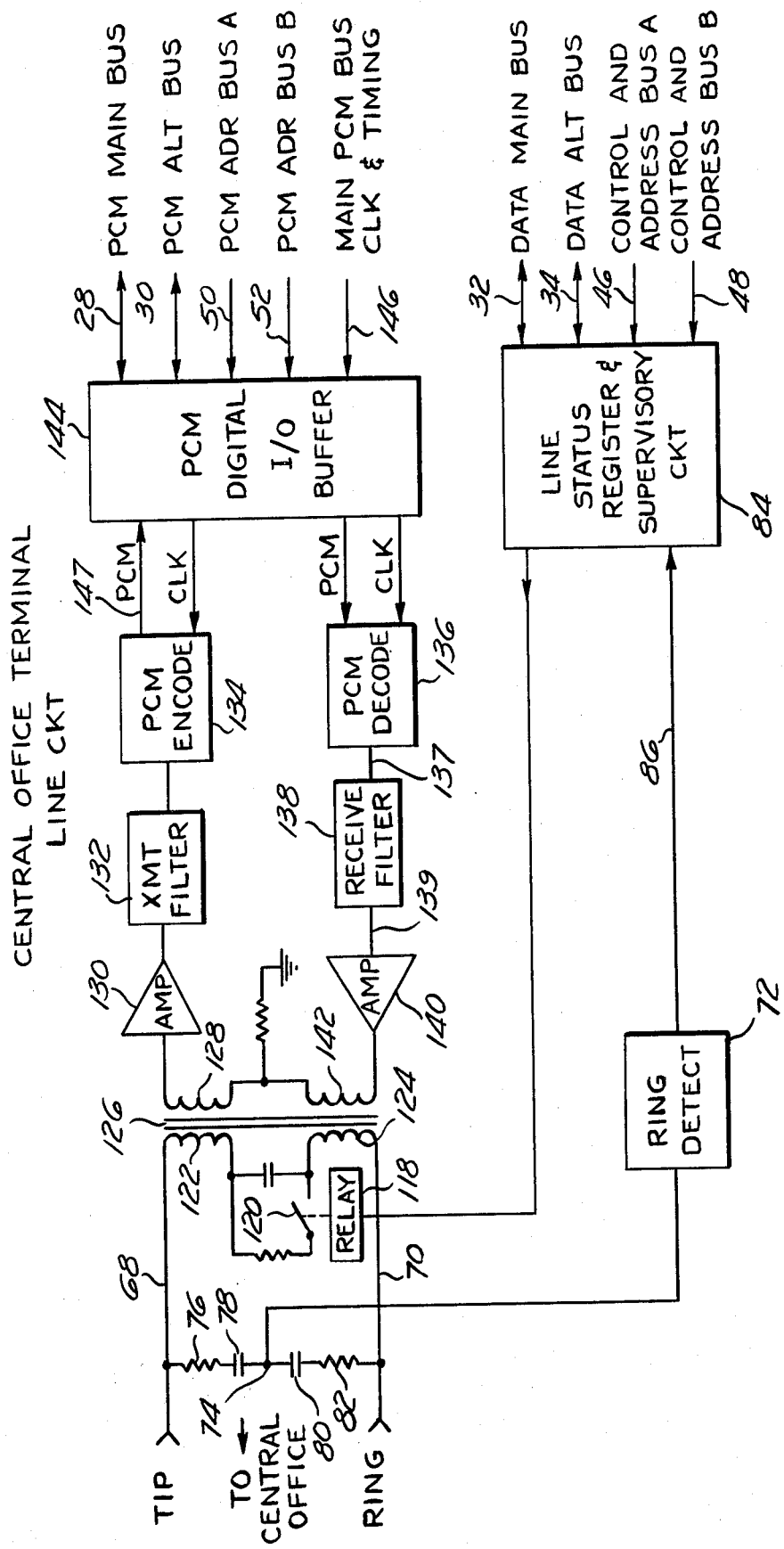
FIG. 2 is a block diagram of the line circuitry for one line of a typical line card in the central office terminal.

Referring to FIG. 2, there is shown a typical line circuit for one of the four telephone lines coming from the central office to a line card of the central office terminal. The circuitry of FIG. 2 is found on each line card 24 or 26 in FIG. 1. Each line card interfaces with four telephone lines, and the circuitry shown in FIG. 2 is the circuitry necessary to interface with one line. Altogether 128 telephone lines are coupled to the line card group 24 and 26 shown in FIG. 1. A ring detector circuit 72 senses the electrical condition of node 74. Node 74 is coupled to tip line 68 by resistor 76 and capacitor 78, and to ring line 70 by capacitor 80 and resistor 82. When that particular telephone line is being rung, a voltage will appear on tip and ring lines 68 and 70 sufficient to change the state of ring detector 72. Ring detector 72 then sets a latch in line status register 84 via line 86 which indicates that the line is being rung.

Line status register 84 is continuously and periodically scanned by controller 36 or 38 (in FIG. 1) in the central office terminal. The controllers continuously scan all the status registers for all the line cards by selecting them through control and address buses A or B, 46 or 48. The data in the status register is then read over data main or alternate buses 32 or 34 and the status of all the lines connected to the line cards is determined.

When ringing is detected on the telephone lines 68 and 70 coming from the central office, the controller 36 or 38 of the central office terminal sends a message over the twenty-fourth supervisory time slot on the span line to the controller in the remote terminal telling it which line is ringing. When the RT controller (not shown, but similar to that shown in FIG. 1) receives this message, it addresses the proper line card (containing the circuitry of FIG. 2 with the line interface circuitry shown in FIG. 3) and the proper status register for the selected line via its address and control bus 46 or 48 and sets, with its data bus 32 or 34, a ring code in the status register for that line. This ring code tells the line card which line to connect to the ring generator and whether to connect the tip or ring line to the ring signal from ring generator 88 (in FIG. 1) so that ringing of the proper telephone will start. Meanwhile, the RT controller has enabled the ring generating card, 88 in FIG. 1, to cause it to generate a ringing waveform and has sent the proper control word to establish the frequency of ring signal to be generated and the proper polarity of DC voltage upon which the periodic portion of the ring signal is to be superimposed. This aspect will be discussed more fully in connection with FIGS. 10, 11, and 12. Ring generator card 88 is coupled to both the data main and alternate buses 32 and 34, respectively, and to control and address buses 46 and 48, respectively, and is also coupled to all line cards by its ring signal line 90.

Figure 3:
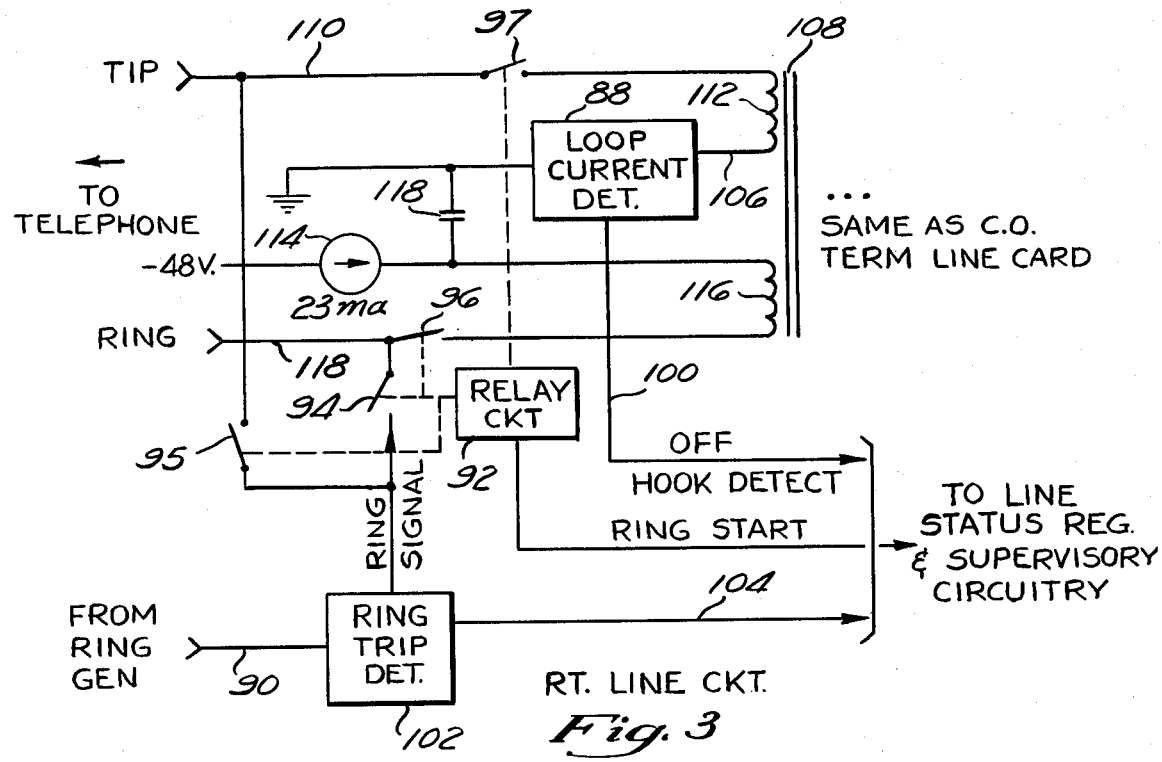
FIG. 3 illustrates the difference between the line interface circuitry for a line circuit in the remote terminal and a line circuit in the central office terminal.

FIG. 3 shows the different circuitry used to couple the telephone lines coupled to the remote terminal to the D/A and A/D circuitry of the remote terminal line cards. This latter circuitry is the same as shown in FIG. 2. Referring to FIG. 3, the addressed line card, when it detects a ring code in its status register, will signal ring relay circuit 92 to connect the ring signal to the proper line via contacts 94 or 95. Ring relay circuit 92 also opens contacts 96 and 97 during ringing so that the ring signal is not fed into transformer 108. The action of the ring relay will be inhibited if loop current detector 88 signals the line status and supervisory circuitry 84 via line 100 that the telephone is off-hook. Ringing will also be inhibited immediately when the telephone user picks up the ringing telephone. Ring trip detector 102 detects this condition and signals the supervisory circuitry 84 via line 104 to inhibit ringing. The controllers can also inhibit ringing when both controllers in a terminal have failed. Ring trip detector 102 couples the ring signal to the ring line 118 through relay contact 94 and provides a fast inhibit action via line 104 to the supervisory circuitry until loop current detector 88 takes over and indicates an off-hook condition to inhibit ringing. The circuitry of the ring trip detector 102 and the loop current detector 88 is not critical to the invention.

The remote terminal line cards also indicate to the RT controllers that the user is off-hook and pulse dialing. This is done by loop current detector 88 which is coupled between terminal 106 of primary winding 112 of transformer 108 and ground. Tip line 110 is coupled to terminal 106 through transformer winding 112. Loop current detector 88 senses the DC component of the total loop current flowing through the tip and ring circuit from current source 114. This current source 114 supplies "talk battery" current through transformer winding 116, ring line 118, the user's telephone, and back through tip line 110, winding 112, and loop current detector 88 to ground. This follows from the fact that there is a very high impedance seen between tip and ring lines 118 and 110 when the telephones coupled to these lines are on-hook but a finite impedance is seen between tip and ring lines 110 and 118 when any user coupled to these lines comes off-hook. Capacitor 118 provides an AC path for the audio signals between windings 112 and 116 while blocking DC current. Current source 114 is turned on by the controller 36 (in FIG. 1) when the user goes off-hook by a connection not shown.

The loop current detector signals the controller through line 100 and the status and supervisory circuitry 84 when pulse dialing is occurring as follows. The loop current detector 88 senses when current is flowing in the tip and ring lines during the "make" portion of the pulse and sets line 100 to one binary state. During the "break" portion, line 100 is set to the opposite binary state. The controller reads line 100 via its data bus and determines what numbers are being dialed. It then sends this information, i.e., the line being dialed and the number dialed, to the controller in the central office terminal so that the line to the central office may be pulse dialed to recreate the number dialed. The circuitry of the line status and supervisory circuitry 84 is not critical and will be apparent to those skilled in the art.

Referring back to FIG. 2, when the CO terminal controller receives this dialing message, it addresses the line status register and supervisory circuitry 84 of the proper line card and the proper line and begins operating the dial pulse relay 118.

Two codes are involved in pulse dialing. A "dial pulse" code is sent by the RT controller during the make portion of the dial pulse and an "idle" code is sent by the RT controller during the "break" portion of the pulse dialing. When the CO terminal controller receives the dial pulse code, it causes relay 118 to close contact 120 and cause DC continuity between tip and ring lines 68 and 70 through transformer windings 122 and 124. Upon receipt of the idle code, relay 118 is caused to open contact 120. By making and breaking DC continuity through the central office tip and ring lines, the pulse dialing at the telephone is recreated. Touch tone dialing audio tones are transmittted through the regular audio circuitry of the line cards, as described more fully below.

The audio signals being transmitted between the central office and the telephone are coupled from tip and ring lines 68 and 70 through two-wire to four-wire conversion transformer 126. Signals coming from the CO are coupled through windings 122 and 128 to the input of amplifier 130. The output of amplifier 130 is passed through a fifth-order elliptical configuration transmit filter 132 of the sampled data type to remove frequencies that are higher than one-half the sampling rate of eight kilohertz. Signals higher than four kilohertz would cause in-band components in the sampling process and cause speech distortion. Low frequency rejection is also provided by transmit filter 132 to avoid low frequency return signals.

The output of transmit filter 132 is coupled to the A/D input of a PCM encoder 134. This encoder converts analog voice or test tone signals into standard eight-bit encoded PCM digital data with MU-255 companding. Encoder 134 is a standard PCM encoder utilizing an internal structure of a low pass filter on the input line, and a sample and hold circuit with its output going to the positive input of a comparator. The output of the comparator goes to a successive approximation register with an eight-bit parallel output coupled to a digital-to-analog converter. The D/A converter has its analog output coupled to the negative input of the comparator. The eight-bit parallel bus is then also fed through a parallel-to-serial converter. The sample and hold circuit provides the analog value of the input signal as it was at sampling time and holds it for the conversion cycle. Successive approximations are made with the output of the sample and hold circuit. The approximations are made by first turning on the most-significant bit at the input of the D/A converter causing it to output its highest voltage. The output is compared and if it exceeds the output voltage of the sample and hold circuit, the bit is turned off. If not, the bit is left on and the next bit is turned on. The process is continued until the least-significant bit is determined. The bits are then converted to serial format.

The PCM decoder 136 on the receive side of the circuit consists of the same circuits in reverse order. The output analog voltage is sampled and held then filtered to remove any quantization noise by filter 138. The output of filter 138 is amplified in amplifier 140 and transmitted through winding 142 of transformer 126 to tip and ring lines 68 and 70 via inductively coupled winding 124.

In the system disclosed herein, the sampling occurs 8,000 times per second and eight bits are used to quantize. The twenty-four voice band channels are received and transmitted simultaneously over a single two-wire pair in serial format at a rate of 1.544 megabits per second. The MU-255 companded pulse code modulation for T-carrier transmission means that low level analog amplitudes are encoded with small steps and high level signals with larger steps. This results in instantaneous companding following a logarithmic curve. Thus, each digital number represents the logarithm rather than the linear value of the sampled amplitude. This gives the voice quality transmission capability of twelve-bit linear PCM conversion.

The circuitry of amplifiers 130 and 140, filters 132 and 138, PCM encoder 134, and PCM decoder 136 are not critical to the invention and will be apparent to those skilled in the art given their functions as described herein.

The serial digital data is loaded on line 147 into registers in PCM digital I/O buffer 144 under control of the timing and control signals received on main PCM clock and timing bus 146 from multiplexer A 42 in FIG. 1. These timing and control signals indicate when the time slot assigned to a particular transfer of data is occurring and control the transfers during that time slot. There is one eight-bit register in buffer 144 for each telephone line coupled to a particular line card. The PCM data is transferred to the selected multiplexer on the appropriate PCM main or alternate bus 28 or 30 when the register for the particular line involved is selected by signals on the PCM address bus A or B, 50 or 52. Conventional selection circuitry under the control of the controllers 36 and 38 determines whether the line card is coupled to the main or alternate PCM data bus 28 or 30 and to CPU data bus 32 or 34 and to PCM address bus A 50 or B 52 and to CPU address and control bus 46 or 48.

Figure 4:
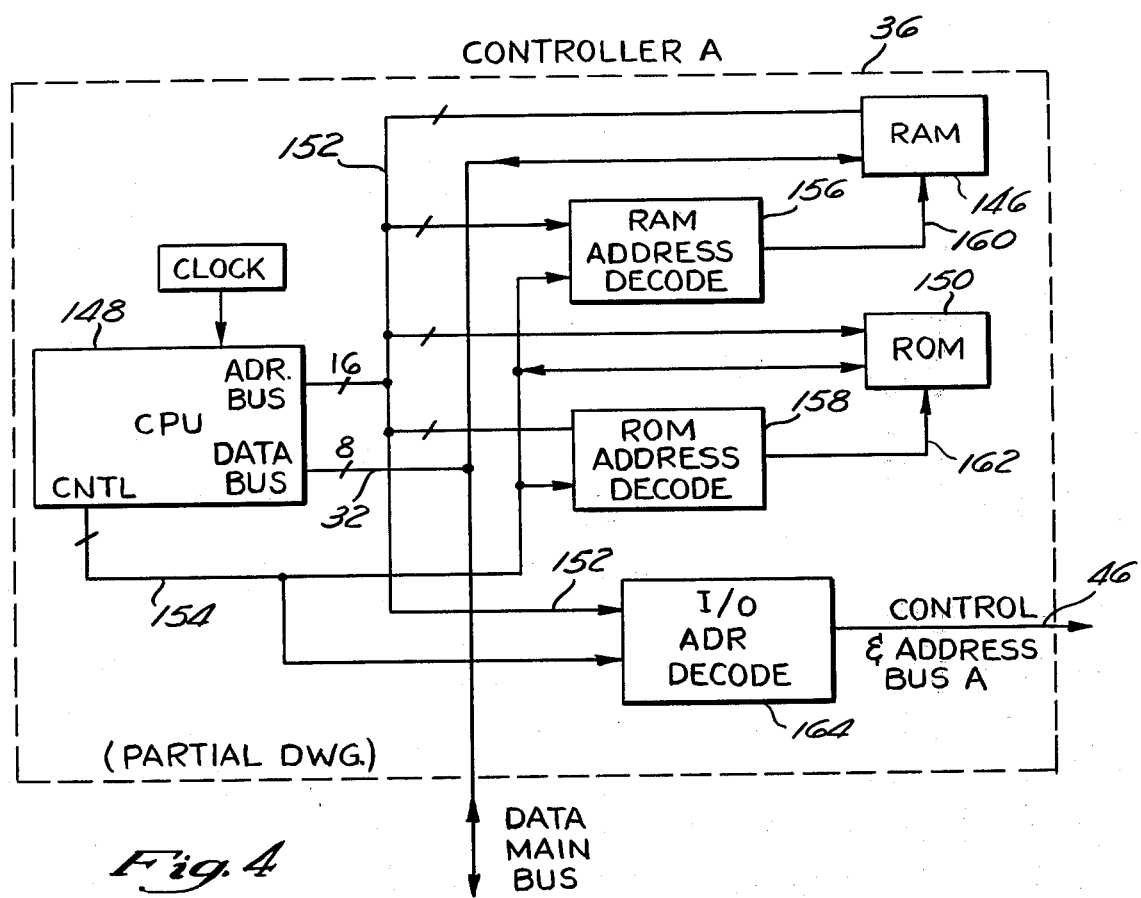
FIG. 4 is a block diagram of portions of the controller.

FIG. 4 shows a block diagram of a structure for controllers 36 or 38 in FIG. 1 which would be satisfactory. There is nothing critical to the invention about this particular structure. Referring to FIG. 4, the status words from the A side line cards are loaded from the line status registers and supervisory circuitry 84 in FIG. 2 by controller A 36 into RAM 146 via data main bus 32. This scanning and loading is accomplished by CPU 148 under control of a program stored in ROM 150, relevant portions of which program are disclosed below in more detail. In the preferred embodiment, CPU 148 is a Z80 TM microprocessor as it existed as of the filing date of this disclosure, manufactured by Zilog TM Incorporated or any second source of Zilog TM. The operation of CPU 148 is conventional in that the program instructions and data transfers are accomplished by transfers on data main bus 32 to and from the address written on address bus 152 under the control of various conventional input and output control signals on control bus 154. RAM address decoder 156 and ROM address decoder 158 decode addresses on address bus 152 and control the locations accessed in RAM 146 and ROM 150 via lines 160 and 162, respectively. I/O address decoder 164 decodes addresses on address bus 152 and combines the various control signals on control bus 154 into control and address bus A 46. This bus is coupled to various other circuits in the system, as described herein, and serves to allow the various other circuits to be enabled when controller A 36 needs to write data to or read data from the selected circuit via data main bus 32. Control and address bus 46 also serves to control the timing of the transfers. There is nothing critical to the invention about the particular arrangement of the controller or the particular coding of the program disclosed herein.

Figure 5:
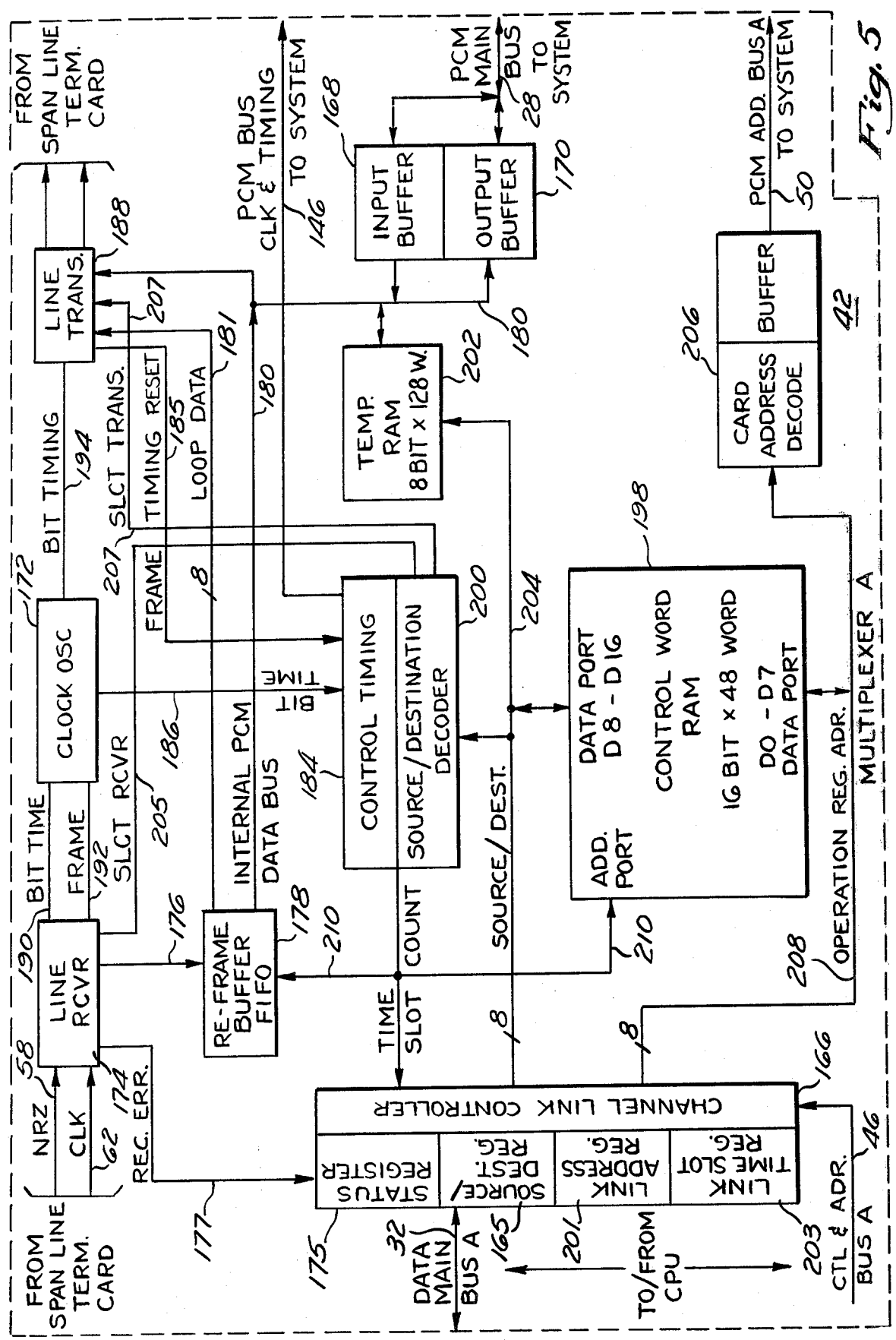
FIG. 5 is a block diagram of the multiplexer.

Turning now to FIG. 5, which shows one possible structure for the multiplexers in the system, the operation of these multiplexers will be described. The specific circuitry used to accomplish the multiplexing function in the system is not critical to the invention. The description of the structure and functional relationship between the various internal portions of the multiplexer given here is intended only for the purpose of disclosing the best mode for combining the functional elements known at the time of filing. Any other equivalent combination of subcomponents that will accomplish the purpose and functions, as described herein, is intended to be included within the scope of this disclosure.

Multiplexer A 42 counts out the time slots for digital data transfers between various telephone lines in the system and either the line transmitter or receiver connected to the span line terminating circuit, or the maintenance card 40 in FIG. 1. Another multiplexer at the central office terminal takes the data received from multiplexer A 42 during a time slot on the span line and transfers it to the proper line coming from the central office main distribution frame equipment. The transfers of data to and from the maintenance card and the line cards are for self-test purposes of some of the audio circuits on the line cards coupled to idle telephone lines.

Multiplexer A 42 establishes an eight-bit, parallel, high-speed digital data link during each assigned time slot between the telephone lines in use or being tested and the proper source and destination registers. These links are established under the control of controller A 36 in FIG. 1 by way of control words written into four registers in channel link controller 166. These transfers occur over data main bus 32 and are controlled by control and address bus A 46. These two buses are combined into bus 51. Each control word controls the transfer during a single internal time slot.

During each time slot on the T1 span line, there are actually two internal transfers that take place: one between the line card and the MUX 42; and the other between the MUX 42 and the source and destination registers. There is nothing critical about the use of twenty-three or twenty-four time slots on the T1 span line and any other number which will work is permissible.

Multiplexer A 42 has a 1.544 megahertz clock oscillator 172 if it is in the central office terminal. If the MUX is in the remote terminal, the clock signals are received on the incoming clock line 62. These clock signals are derived from the RT incoming data on the span line by span terminating card A 54 in FIG. 1. The A side MUX at the central office terminal generates the master timing clock and the B side central office MUX is slaved to it so that they run synchronously until the master fails, at which time the slave runs on its own clock. The remote terminal MUX circuits are slaved to the incoming clock signals on line 62.

Line receiver 174 receives serial data in NRZ code on line 58 from span terminating card A 54 in FIG. 1 at a 1.544 megabits per second rate. It converts this data to parallel format digital output data and a time slot count for each eight bits and sends this data to re-frame buffer 178 via internal PCM bus 176. In the case that the line receiver 174 detects a loss of frame sync by way of detecting a frame bit error within three to five frames of the previous frame bit error, it signals the controller in FIG. 1 by writing an error status word into status register 175 via bus 177.

Data format in the preferred embodiment consists of twenty-four eight-bit words and one frame bit for a total of one-hundred-and-ninety-three bits per frame. The frame rate is eight kilohertz, i.e., eight thousand frames occur in the span line data every second. The frame bits alternate every other frame, and frame synchronization is accomplished by finding these frame bits.

The re-frame buffer 178 serves to establish synchronization between the received data and the data on the internal PCM data bus 180. This synchronization is necessary because delay in propagation of the data over the span line results in a phase difference between the received and transmitted data. In the preferred embodiment, the re-frame buffer receives the time slot count on bus 210 from control timing 184, and stores the eight-bit parallel data and time slot count received on bus 176 at the top of a thirty-two word First-In-First-Out buffer.

Data is loaded from the FIFO buffer onto internal PCM data bus 180 when the time slot count for the word at the output of the buffer equals the time slot that is presently being transferred on the PCM bus as indicated on line 210. This comparison is done by a comparator in re-frame buffer 178.

Control timing circuit 184 is coupled to clock oscillator 172 by bit timing line 186. Eight pulses occur on line 186 for each time slot on the span line. Clock oscillator 172 is coupled to line receiver 172 by bit timing line 190 and frame timing line 192 and to line transmitter 188 by bit timing line 194. The purpose of these connections is to keep clock oscillator 172, line receiver 174, line transmitter 188, and control timing 184 in synchronization with the master clock. The control timing circuit 184 also receives a frame reset signal on line 185 from line transmitter 188 to reset its time slot counter after twenty-four time slots. The frame timing reset signal on line 185 is generated by arbitrarily starting a count at any bit time and occurs after every one-hundred-and-ninety-third bit. It serves as the framing pulse at the end of the span line to which the multiplexer is coupled. This line to which the multiplexer is coupled. This frame timing pulse is independent of the frame timing pulse at the central office terminal multiplexer and is independent of and asynchronous to the frame timing pulse from line receiver 174. This frame timing pulse is used to slave the re-frame buffer 178 so as to cause it to release incoming data for a time slot on the span line during the corresponding time slot for line transmitter 188. This insures that bidirectional transfers to and from the line cards are synchronized. The re-frame buffer 178 permits the incoming and outgoing data transfers to be synchronized within the terminal regardless of time delays caused by the length of the span line. The control timing circuitry 184 generates the main timing signals for the MUX circuitry. It also generates PCM bus clock and timing signals on bus 146 to control PCM data transfers to and from the line cards and maintenance card.

Control word RAM 198 has eight bits of its data bus coupled to source/destination register 165 and status register 175 in channel link controller 166 by bus 204. These same eight bits are also coupled to source/destination decoder 200 and temporary RAM 202. Link address register 201 and link time slot register 203 in channel link controller 166 and card address decoder 206 are coupled to the other eight bits of the data port of control word RAM 198 by operation register address bus 208. The output of card address decoder 206 is buffered and sent out over PCM address bus A 50 to the line cards and maintenance card 40 in FIG. 1.

There is one sixteen-bit word in control word RAM 198 for each of the forty-eight internal time slots used by MUX 42.

The control words are written into control word RAM 198 over source/destination bus 204 and operation register address bus 208 from the four, four-bit registers in channel link controller 166 during the write cycle of the time slot corresponding to a particular address in the RAM 198 to be updated. The address port of RAM 198 is coupled by line 210 to the time slot count from control timing 184. Control RAM 198 is constantly being read using the time slot count on line 210 from control timing 184 as the read address during every time slot. Its contents are decoded to determine which operation register and which source and destination registers are involved in the transfers to be made during each time slot. The decoded outputs enable the proper registers for reading and writing.

The CPU in the controller 36 (in FIG. 1) can address any one of four registers in the channel link controller 166 individually to change a control word. One register, 203 in FIG. 5, contains data on the time slot assigned to a particular exchange; another pair, 201 and 165, contain information as to the link address and the source and destination registers for a particular transfer; and the last is a status register 175 which may be read or updated by the controller at any time. The channel link controller can only update a word in the control word RAM 198 during the write cycle of a particular time slot. Also, the CPU must write to the link address register 201 or source/destination register 165 before writing to the link time slot register 203. A busy flag in the status register 175 will be raised when the time slot register is updated by the CPU. This flag will not be cleared until the channel link controller 166 has had an opportunity to update the word in the control word RAM 198 during the write cycle of the time slot corresponding to the new control word.

The internal PCM data bus 180 from re-frame buffer 178 is coupled to line transmitter 188, temporary RAM 202, and input and output buffers 168 and 170. The re-frame buffer is also coupled to line transmitter 188 by a loop data bus 181 which merely transfers data from the line receiver 174 back out through line transmitter 188 in the eventuality that no transfer is made by multiplexer 42 during a particular time slot for testing purposes. Input and output buffers 168 and 170 are also coupled to PCM main bus 28 from the rest of the system.

Operation of the multiplexer during a typical time slot assigned to a telephone conversation is as follows. The central office terminal controller will detect ringing on a line and send a message to the remote terminal controller via the twenty-fourth supervisory time slot indicating that a line is ringing, which line it is and what time slot is assigned to it. The remote terminal controller will then start ringing on the designated line and send a control word to the MUX 42. The control word would put the code for the designated line in link address register 201 and the code for the line receiver 174 as the source and the line transmitter 188 as the destination in source/destination register 165. The controller would then write the code for the designated time slot into link time slot register 203. The next time this time slot count came up on bus 210, this control word would be written into the address in control word RAM 198 corresponding to that time slot via source/destination bus 204 and operation register address bus 208.

The next time that assigned time slot count occurred at the address part of control word RAM 198, the new control word would appear on source/destination bus 204 and operation register address bus 208. The eight bits on the source/destination bus 204 would be decoded and would enable line receiver 174 via select receiver line 205 and would enable line transmitter 188 via select transmitter line 207. The other eight bits on operation register address bus 208 would be decoded by card address decoder 206 into the address of the correct buffer on the line card coupled to the telephone line being called and would enable that buffer.

Then during the read cycle of the assigned time slot, the contents of the line receiver 174 will be loaded via internal PCM data bus 180 into output buffer 170. At the same time, the buffer of the line being called will be loaded via PCM main bus 28 into input buffer 168, all under the control of PCM clock and timing bus 146. During the write half of the time slot, the input buffer 168 will be loaded into the line transmitter 188 via internal PCM data bus 180, and the output buffer 170 will be loaded into the buffer for the line being called via PCM main bus 28.

DESCRIPTION OF THE SELF-TEST SYSTEM

Figure 6:
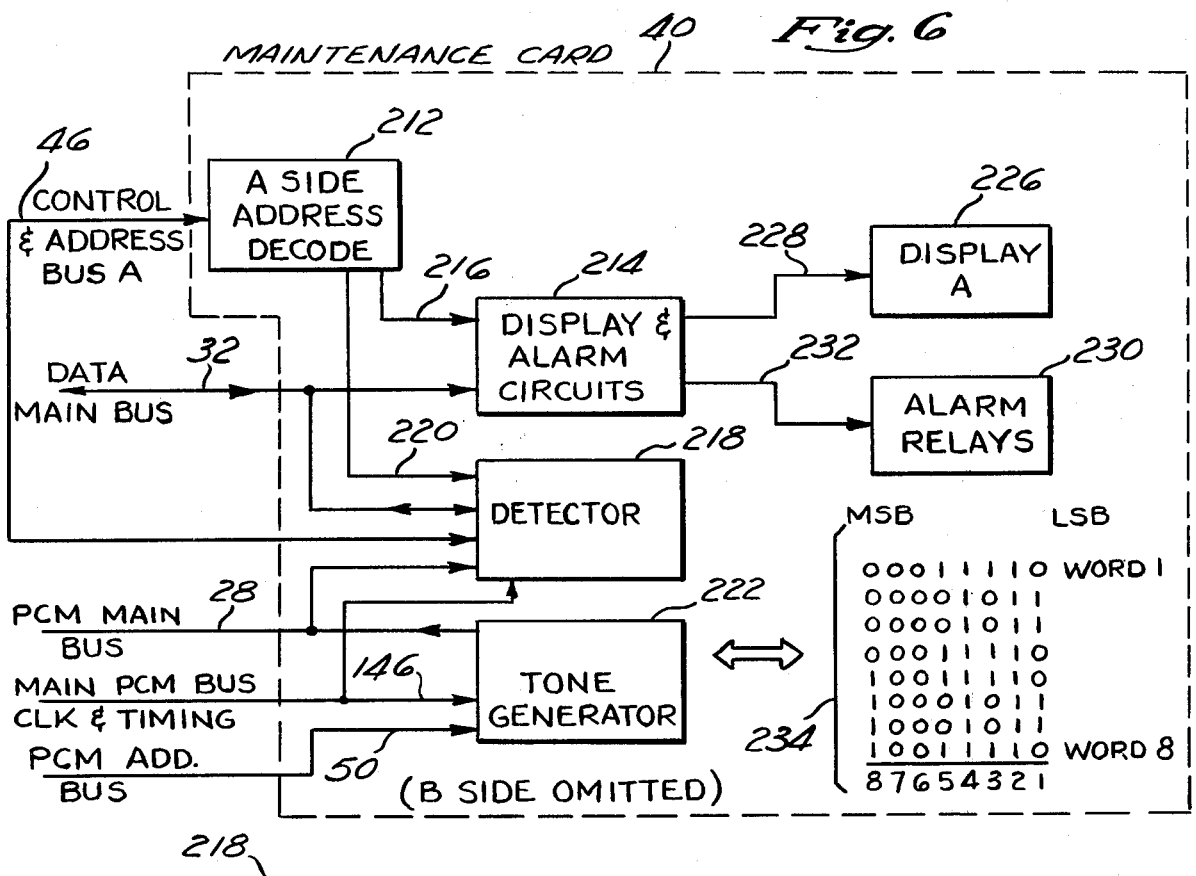
FIG. 6 is a block diagram of the self-test circuitry of the maintenance card.

FIG. 6 shows the structure of maintenance card 40 in FIG. 1. Turning now to FIG. 6, the operation of the maintenance card 40 will be described. Control and address bus A 46 from controller A 36 (in FIG. 1) is coupled to address decoder 212 and to one-kilohertz detector 218. Address decoder 212 is coupled to display and alarm circuit 214 via enable line 216 and enables these circuits when the address of the alarm and display circuits is detected on control and address bus 46. Decoder 212 enables one-kilohertz detector 218 via enable line 220 when the address of the detector appears on control and address bus 46.

Data main bus 32 (in FIG. 1) is coupled to display and alarm circuits 214 and to detector 218. PCM main bus 28 is coupled to both the detector 218 and the tone generator 222. Main PCM clock and timing bus 146 is also coupled to tone generator 222 and to detector 218. Display A 226 is coupled to display and alarm circuit 214 by line 228, and PCM address bus 50 (in FIG. 1) is coupled to tone generator 222.

When the controller A 36 (in FIG. 1) determines during its normal scan of its telephone lines that a line is idle, a self-test routine is entered. The program for this self-test routine is disclosed more fully below. To self-test the idle line, the controller sends a control word to multiplexer 42 (in FIG. 1) telling it to set up a link between the maintenance card and the idle line during time slots assigned for this purpose. The controller 36 will then enable the tone generator 222 via PCM address bus 50 (in FIG. 1) and clock and timing bus 146 (in FIG. 1). The tone generator generates the digital representation of a periodic test tone, one kilohertz in the preferred embodiment, by placing one of eight, eight-bit words on PCM main bus 28. These eight words represent the logarithmically compressed amplitude at eight sampling points of a one-kilohertz sinusoidal waveform. One eight-bit word is placed on PCM main bus 28 during each frame during the assigned time slot as determined by a control signal on main PCM bus clock and timing bus 146. The eight bit is a sign bit and is derived from the most-significant bit of a counter which functions in the circuitry used to generate the eight digital words for the self-test feature. The eight digital words comprising the logarithmic description of one cycle are shown generally at 234 in FIG. 6. Inversion of the first seven bits starting at the LSB and conversion to analog yields the compressed version of the sinusoid where $y = \log(1 + (MU)X / \log(1 + MU)$ and $MU = 225$.

Two internal MUX time slots are dedicated to the self-test function. One slot is for transfers between the MUX 42 (in FIG. 1) and maintenance card 40. The other time slot is for transfers between the line card being tested (in FIG. 1) and the MUX. There is a read cycle and a write cycle for each time slot. During the read cycle of the first assigned time slot, the first word of the one-kilohertz test tone will be loaded into the input buffer, 168 in FIG. 5, of MUX 42. Simultaneously, source/destination decoder 200 will have decoded the bits of the control word on source/destination bus 204 so as to enable temporary RAM 202 and will cause it to load its contents into output buffer 170. During the write cycle of the assigned time slot, the input buffer 168 will load its data via internal PCM data bus 180 into temporary RAM 202. Simultaneously, the contents of the output buffer 170 are placed on the system PCM main bus 28 and loaded into the detector 218 in FIG. 6. This completes the first transfer.

During the read cycle of the second self-test time slot, data from the buffer coupled to the line circuitry to be tested is transferred to the input buffer 168 and data from the temporary RAM 202 is loaded into the output buffer 170. During the write cycle, the data in the input buffer 168 is loaded into temporary RAM 202 and data from output buffer 170 is loaded into the register coupled to the line being tested. This completes the second transfer. Transfers such as these occur for one external time slot per frame until the controller 36 is satisfied that the line is working. The controller then picks the next idle line and assigns the same two time slots to test it.

Referring again to FIG. 2 showing the circuitry of the line cards in the central office terminal, the self-test feature tests the operability of the PCM digital I/O buffer 144, PCM decoder 136, receive filter 138, amplifier 140, winding 142, winding 128, amplifier 130, transmit filter 132, and PCM encoder 134. Because there is a very large impedance seen looking out from the tip and ring line when the subscriber is on-hook or the central office equipment is not ringing the line, the audio energy leaving PCM decoder 136 on line 137 cannot go out of transformer 126. Instead it propagates through receive filter 13, line 139, amplifier 140, winding 142, winding 128, and then back through the transmit side of amplifier 130, transmit filter 132, PCM encoder 134, and back into I/O buffer 144 as digital information which is read and conveyed back to the detector circuit 218 in FIG. 6.

Controller 36 (in FIG. 1) decides if the line is functioning properly by addressing detector circuit 218 via control and address bus A 46 (in FIG. 1) and reads the detector output via data main bus 32 (in FIG. 1). If a one-kilohertz tone is present, the line has passed. If no positive indication is received, the controller checks to see if the tone generator 222 is working by enabling detector 218 so that it is loading data from the PCM main bus 28 (in FIG. 1) when data is being transferred from the tone generator 222 to temporary RAM 202 in FIG. 5. If the tone generator is working properly, then the controller enables the detector when data is being transferred from the temporary RAM 202 to the line card. If temporary RAM 202 is working properly, then the detector 218 is enabled when data is being transferred from the line card to the temporary RAM. If this transfer fails, the controller sets an alarm by addressing and writing to display and alarm circuits 214 in FIG. 6 via data main bus 32. Display and alarm circuits 214 set an alarm relay 230 by line 232 and displays the location of the malfunctioning line on display A 226 via line 228.

Figure 7:
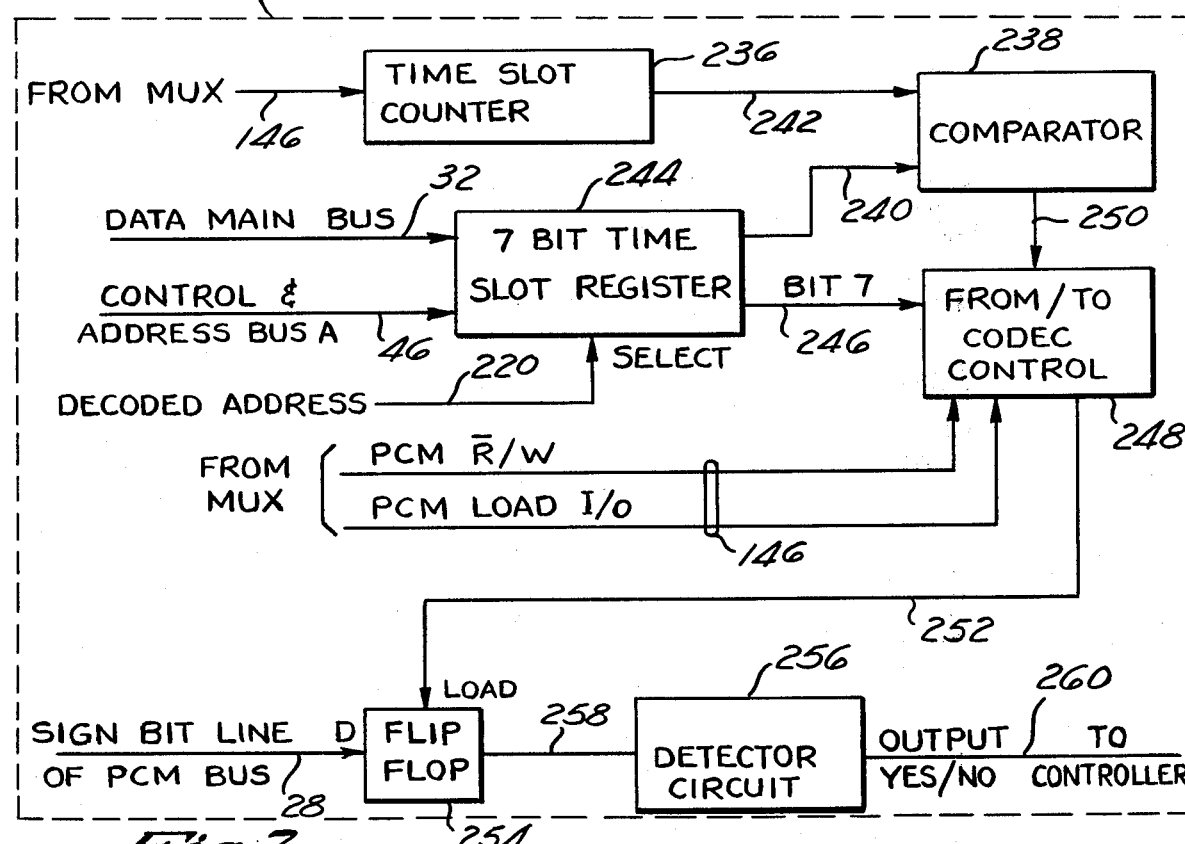
FIG. 7 is a block diagram of the one-kilohertz detector circuitry of the maintenance card.
Figure 8A:
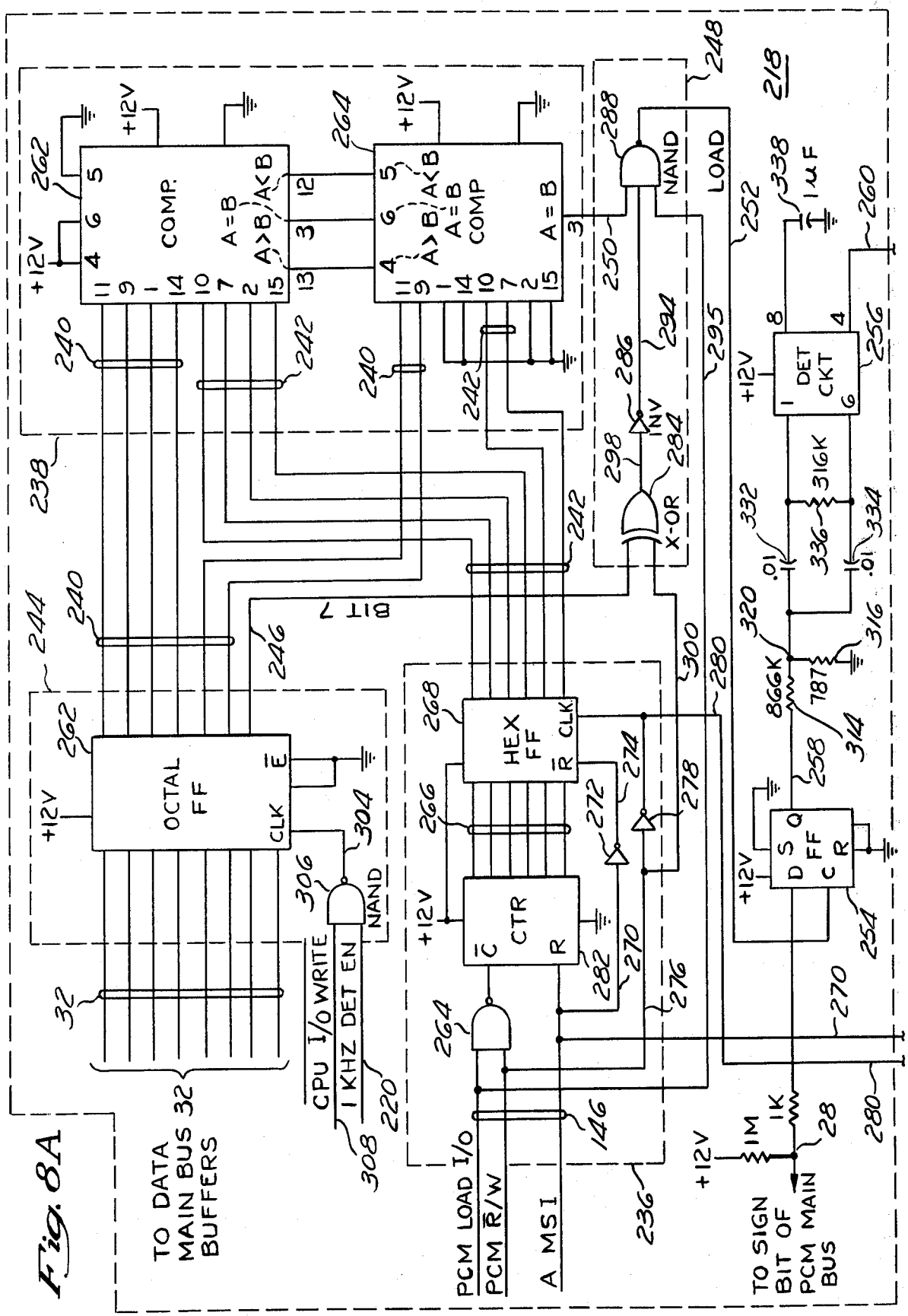
FIGS. 8a and 8b are a circuit diagram of the one-kilohertz detector 218 of FIG. 6 and the one-kilohertz tone generator.
Figure 8B:
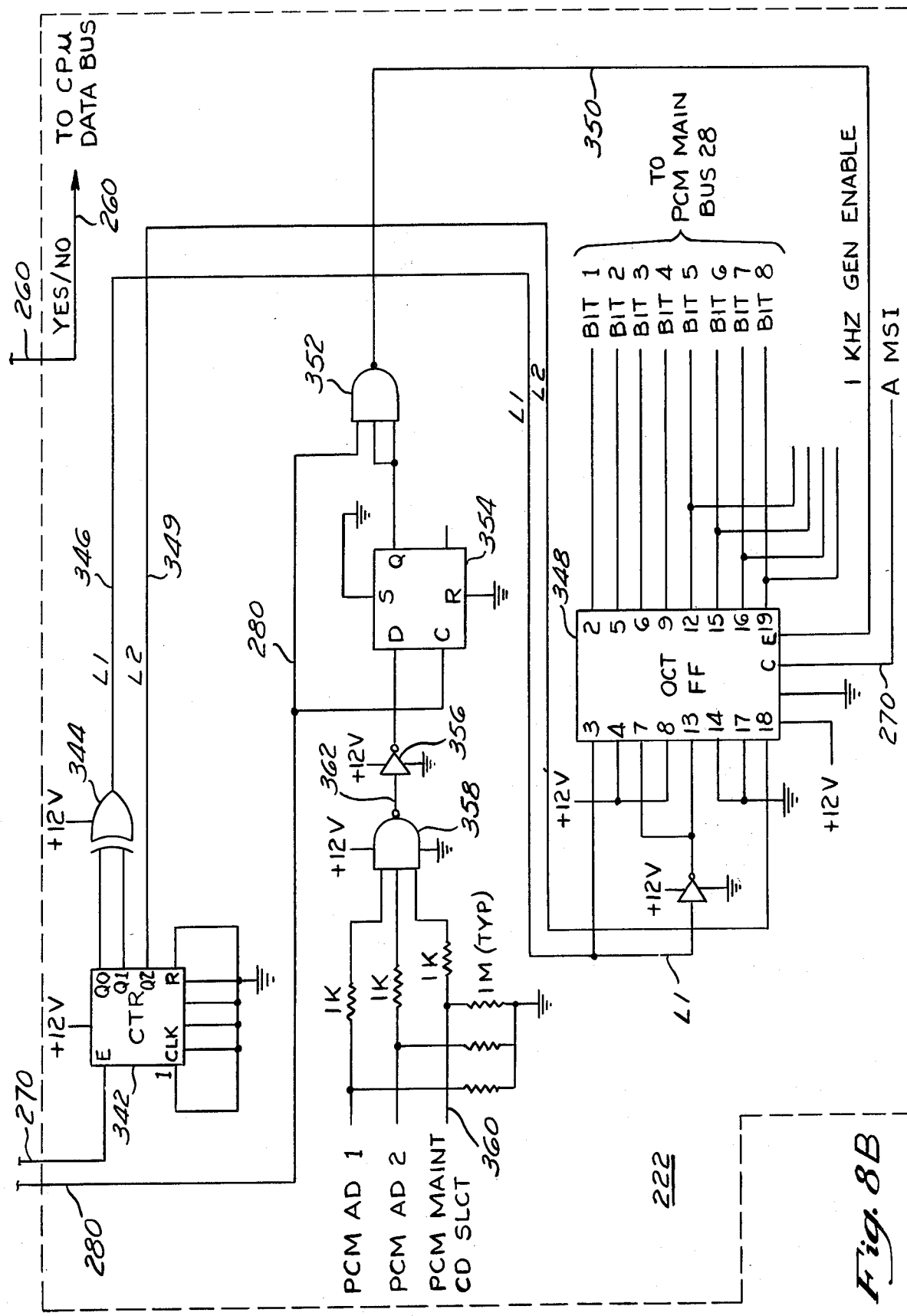

FIG. 7 shows the structure of detector 218 in FIG. 6. FIGS. 8a and 8b show the detailed logic of the detector 218 and tone generator 222 in FIG. 6 when placed side by side. Turning now to FIGS. 7, 8b and 8b, the operation of detector 218 and tone generator 222 in FIG. 6 will be more fully explained. The details of decoder 212, display and alarm circuit 214, display A 226, and alarm relays 230 are omitted for clarity since they are not critical to the invention and should be apparent to those skilled in the art.

Time slot counter 236 in FIG. 7 serves to count out the number of the time slot whose control word is presently controlling the MUX. It increments once for every time slot by sensing the conditions on PCM clock and timing bus 146. Its output is coupled to one input of comparator 238 via bus 242.

Comparator 238 in FIG. 7 has its other input coupled via bus 242 to the output of time slot register 244. This register has it data input coupled to data main bus 32 and it is addressed and controlled by signals on control and address bus A and decoded address line 220 from address decoder 212 in FIG. 6. This register serves to store the number of the time slot assigned for a particular self-test transfer to be detected so that this time slot number can be compared by comparator 238 to the time slot the MUX is in currently.

Bit seven from time slot register 244 on line 246 is coupled to the from/to CODEC control circuit 248. This circuit is also coupled to the output of comparator 238 via line 292, and receives control input signals from the PCM clock and timing bus A 146 from MUX 42 (in FIG. 1). From/to CODEC control circuit 248, under the control of bit seven from the controller, controls whether the detector is loading data from the PCM main bus 28 during the read cycle or the write cycle of the time slot stored in time slot register 244. This control is asserted through output line 252 which controls the time when flip-flop 254 is loaded from the PCM bus.

Flip-flop 254 loads only the sign bit of the PCM bus 28. The sign bit is the most-significant bit (MSB) of the eight-bit word which describes the amplitude of the test sinusoid at any particular time. As seen generally at 234 in FIG. 6, it is zero for the first half of the cycle, i.e., the first four words, and one for the last four words. Thus, the sign bit is a logic one exactly once during every cycle and will be high one-thousand times per second. The output of flip-flop 254 is coupled to the input of detector circuit 256 by line 258. The detector 256 senses whether there is a one-thousand hertz cycle of pulses on line 258 and indicates yes or no to the controller via line 260.

Turning now to the more detailed schematic of the one-kilohertz detector circuit 218, shown in FIGS. 8a and 8b, the time slot register 244 is comprised of octal flip-flop 262 having its data inputs coupled to the eight bits of data main bus 32. In the preferred embodiment, octal flip-flop 262 is a Motorola TM MM 74C 374. The low-order six bits at the output of time slot register chip 262 on bus 240 are applied to one compare input of comparator 238 which is comprised of comparator chips 262 and 264. In the preferred embodiment, these chips are Motorola TM MC 14585 B. Bit seven of the output from time slot counter 236 is applied via line 246 to FROM/TO CODEC control circuit 248.

The other side of comparator 238 is coupled via line 242 to the output of time slot counter 236. This counter has its count and reset inputs coupled to the main PCM clock and timing bus 146. Specifically, the count input which advances the counter on a high to low transition is coupled to the output of NAND gate 264. This gate has its inputs coupled to the PCM load I/O signal and the PCM R/W signal which are both signals in the PCM bus clock and timing bus 146. The PCM load I/O and PCM R/W signals are such that they are both high at the inputs of NAND gate 264 only once during each internal MUX time slot. This causes a high to low transition at the output of NAND gate 264. The A MSI signal from the PCM bus clock and timing lines 146 is normally low, and it resets the counter when it goes high at the end of every frame. The counter output is latched on bus 266 into hex flip-flop 268. The six outputs from latch 268 are the outputs of the counter on bus 242. Latch 268 is reset by the A MSI signal on line 270 rippling through inverter 272 and line 274 coupled ti its reset input. Latch 268 is loaded once per internal MUX time slot by the PCM R/W signal of the PCM bus clock and timing lines 146 through line 276, inverter 278, and line 280 coupled to its clock input. In the preferred embodiment, counter chip 282 is a Motorola TM MC 14024 B seven-stage, ripple counter, and latch 268 is a Motorola TM MC 14174 B.

FROM/TO CODEC control 248 inclues exclusive-OR gate 284, inverter 286, and NAND gate 288. The output of NAND gate 288 is coupled to the C input of flip-flop 254. One input of NAND gate 288 is coupled to the A=B output of comparator 238 by line 250. Another input is coupled to the output of inverter 286 by line 294. A third input is coupled to the PCM load I/O signal by line 295. The input of inverter 286 is coupled to the output of exclusive-OR gate 284 by line 298. This gate has a first input coupled to bit seven on line 246 and a second input coupled to the PCM R/W signal via line 300. Thus, the output on line 298 of exclusive-OR gate 284 will be high whenever line 246 or line 300 is high but not when both are high. PCM R/W is generated by control timing 184 in FIG. 5 to be high during the write cycle half of each internal MUX time slot. Line 246 is high whenever controller A 36 sets it high. Thus, line 298 will go high and line 294 will go low during the write cycle of each MUX time slot unless controller 36 makes line 298 go high during the read cycle of the time slot. If the latter occurs, detector 218 will be caused to load the sign bits from PCM main bus 28 during the read cycle instead of the write cycle.

The output of comparator 238 on line 250 goes high when the output of time slot counter 236 equals the time slot stored in time slot register 244. Flip-flop 254 only loads the sign bits on PCM bus 28 when its clock input coupled to line 252 is high. In the preferred embodiment, flip-flop 254 is a Motorola TM MC 14013 B. The output of NAND gate 288 is high at all times except when all its inputs are high. Thus, when the desired time slot occurs and PCM load I/O indicates that loading on the PCM main bus 28 is occurring, the PCM R/W signal on line 300 will cause line 294 to go low either during the read cycle or the write cycle of the MUX time slot depending upon whether the bit seven signal on line 246 is high or low. When line 294 goes low, line 252 goes high and flip-flop 254 starts loading sign bits.

Time slot register 244 is loaded from data main bus 32 when the signal on line 304 from the output of NAND gate 306 goes high. One input of NAND gate 306 is coupled to the signal CPU I/O WRITE on line 308. Another input is coupled to the signal 1-kHz DETECT ENABLE on line 220. The signal on line 304 is high when either of lines 308 or 220 are low. The signal on line 220 is high whenever the detector 218 is enabled by address decoder 212 in FIG. 6. CPU I/O WRITE is active low, i.e., the controller asserts this signal low when it wants to write on data main bus 32. When this signal goes low, line 304 goes high and the time slot data on the data bus 32 is latched into octal flip-flop 262.

Because flip-flop 254 is latching sign bits at a one-kilohertz rate, its Q output coupled to line 258 will be changing at a one-kilohertz rate also. Level changing voltage divider resistors 314 and 316 condition the signal on line 312 for input to detector chip 256. The output node 320 of the divider is coupled to two 0.01-microfarad capacitors 332 and 334. The output of one of these capacitors is coupled to pin 1 of the detector chip 256, and the output of the other is coupled to pin 6 of the detector. A 316-kilohm resistor 336 is coupled from pin 1 to pin 6. Pin 8 of the detector circuit 256 is coupled to ground through a one-microfarad capacitor 338 and pin 4 is coupled to line 260 which is the detector status bit which indicates whether a tone was detected or not.

FIG. 9 shows the structure of detector chip 256 in FIGS. 7 and 8. Turning to FIG. 9, the detector chip 256 will be described in more detail. This is a custom designed chip, but the circuitry other than as described here is not critical to the invention. Pin 1 is the input and is coupled to the negative input of differential amplifier 322. The positive input of this amplifier is coupled to a fixed voltage reference soujce 324 by line 326. This voltage is fixed at $-3.8$ volts above the supply voltage V− on pin 2. The output of differential amplifier 322, line 328, is coupled to pin 6 and to the input of unity gain amplifier 330. Capacitors 332 and 334 and resistor 336 in FIG. 8a coupling pin 6 to pin 1 of chip 318 form an active filter. Unity gain amplifier 330 is a buffer and has its output coupled to pin 8 which is coupled to ground by capacitor 338 in FIG. 8a. Capacitor 338 serves as a holding capacitor to form a peak detector. The voltage level at pin 8 is coupled to the positive input of comparator 340 which tests it against the fixed reference voltage 324 which is coupled to its negative input by line 326. The output of comparator 340 is coupled to pin 4 and line 260 in FIG. 8a.

Returning to FIG. 8b, the structure and operation of the tone generator 222 will be described. In the preferred embodiment, counter 342 is a Motorola ™ MC 14520 dual, BCD, up-counter with its clock input and its reset input grounded. The enable input is coupled to the A MSI signal by line 270. The counter will increment on every downward transition of the A MSI signal, which occurs every frame, i.e., every one-hundred-and-twenty-five microseconds. Bits Q0 and Q1 are coupled to two inputs of exclusive-OR gate 344 which has its output on line 346 coupled to the input of latch 348. In the preferred embodiment, this latch is a Motorola ™ TM 74C 374. The Q2 bit of counter 342 is coupled by line 349 to another input of latch 348.

The L1 and L2 signals on lines 346 and 349 comprise the only bits which are changing of the bits in the eight digital words depicted in FIG. 6 at 234. That is, a close study of this pattern reveals that bits two and four are always high or logic one and bits six and seven are always low or logic zero. Bit eight is the sign bit and is not involved. Bit five is the inverse of bit one which meansonly bit five and bit three need be generated.

This generation of bits five and three is done by counter 342 and exclusive-OR gate 344. During the first frame, word one at 264 in FIG. 6 will be generated. The outputs of counter 342 will be such that exclusive-OR gate 344 generates one of the two bits necessary on line 356 which is applied to pin three of latch 348 and the inverse to pins thirteen and seven. Bit Q2 of the counter will be the other bit on line 348 and is applied to pin eighteen of latch 348. All the other necessary bits are generated by connecting pins four and eight of latch 348 to a positive voltage source and pins fourteen and seventeen to ground. The next A MSI signal on line 270 to the counter 342 and to the latch clock input 348 will increment the counter and load the latch for the next frame. The outputs of the latch are coupled to the PCM main bus 28.

Latch 348 is enabled by the signal on line 350 from the output of NAND gate 352. This gate has one of its inputs coupled via line 280 to the output of inverter 278 in FIG. 8A which is inverting the PCM R/W signal. Two other inputs of NAND gate 352 are coupled to the Q output of flip-flop 354. This flip-flop has its C input coupled to line 280 and its D input coupled to the output of inverter 356. This inverter has it input coupled to the output of NAND gate 358. This gate has three of its inputs coupled to two bits of the PCM address bus 60 and a third coupled to the PCM maintenance card select signal on line 360 forming part of the PCM clock and timing bus 146. Flip-flop 354 also has its set and reset inputs grounded. In this configuration, the output of NAND gate 352 will go low enabling latch 348 during the read cycle of any time slot when the maintenance card is selected by a high on line 360 and when the tone generator 222 is addressed by MUX 42 by highs on PCM AD 1 and AD 2 lines. This would cause a low on line 362 and a high at the D input of flip-flop 354 which sees a high at its C input during the read cycle of the assigned time slot. Thus, the Q output is set and latch 348 is enabled.

DESCRIPTION OF THE RING SCHEDULING SYSTEM

FIG. 10 shows the structure of ring scheduling card 88 in FIG. 1. Turning now to FIG. 10, a more detailed description of the operation of ring generating card 88 in FIG. 1 will be given. Ring scheduling circuitry is necessary both to accommodate the different ringing systems employed by the Bell Telephone System versus independent telephone companies, and to accommodate the fairly limited amount of power available in remote terminals for ringing telephones by limiting peak ringing signal power consumption. Generally, a ringing telephone requires about one watt to ring the bell. If a large number of telephones are all ringing simultaneously, the power supply may be inadequate, leading to system failure.

The Bell System ringing scheme for party lines differs from the ringing scheme used by independent telephone companies. That is, on the Bell System party line up to four subscribers may be simultaneously attached to one line. Each telephone line is comprised of a tip line and a ring line. The ringing signals on any one party line can thus be directed to the proper phone being called by making the four individual telephones on the line each responsive to a different type ringing signal. That is, one phone may be made responsive to a ring signal having a first characteristic such as a 20-hertz ringing signal superimposed upon a positive 48-volt DC level on the tip line. A second phone may be made responsive to a ring signal having a second characteristic such as a twenty-hertz tone superimposed upon a negative 48-volt DC signal on the tip line. A third phone may be made responsive to a twenty-hertz ringing signal superimposed on a positive 48-volt DC signal on the ring line. Finally, the fourth phone may be made responsive to a twenty-hertz ringing signal superimposed on a negative 48-volt DC signal imposed upon the ring line.

A different ringing scheme is utilized by the independent telephone companies for party lines in that the independents use different frequencies. That is, up to five phones may be simultaneously connected to a particular party line. Each phone on the line may be made responsive to a ringing signal of a different frequency, such as by band pass filtering. A duty cycle of one second on and four seconds off is imposed by the software on the ring generator shown in FIG. 10 for independent ringing. That is, all five telephones on a particular party line may be rung during a five-second inteval, by imposing a different frequency ringing signal on the line during each one-second interval of the five total seconds in the duty cycle. This can be understood more clearly by imagining that all five telephones connected to a particular party line were in a particular house. If all five phones were called simultaneously, the ringer scheduling circuitry disclosed herein would generate a different frequency ringing signal during each second of the five total seconds of the duty cycle. Thus, the phones would all be ringing, but the actual ring portion of the familiar on-off ringing would not occur in more than one phone at any particular instance in time. If all five phones were lined up in a row, phone 1 would ring during the first second, phone 2 would ring during the second second, phone 3 would ring during the third second, and so on, until all five phones had rung their first ring.

The Bell System requirements impose a different duty cycle on the ring generator for Bell System party lines. On Bell System party lines having four subscribers connected to each party line, only three of the telephones connected to each party line will be rung during any six-second interval. The software employed by the digital multiplexing system disclosed herein establishes a two-second on and a four-second off duty cycle when a switch on the CO controller card indicates the system is installed in a Bell System link. During the two seconds "on" of the duty cycle, only one of the aforementioned four combinations of DC polarity and tip or ring selection will exist on the tip and ring pair of the party line. That is, if for the first two seconds of the total of six seconds of the duty cycle, a twenty-hertz ringing signal is superimposed upon a 48-volt positive DC level imposed upon the tip line, then none of the other three conditions will be imposed upon that particular party line during those two seconds as that would cause a conflict in voltages on the line. Thus, during the first two seconds, only the telephone which is responsive to the positive 48-volt DC level on the tip line will ring. However, during the next two seconds of the duty cycle, a negative 48-volt DC level with the ring signal superimposed can be placed on the tip line or ring line. Of course the digital multiplexed telephone system disclosed herein is not designed to ring more than one phone on a party line at any one time since as soon as that phone is picked up, the other phones on the line cannot be used because the tip and ring pair can carry only one conversation at a time.

The same concept holds true however for any two-second portion of the duty cycle of the ring generator. Since the ring generator serves all the line cards which are coupled to all the telephone lines in the system, during any two-second portion of the Bell System duty cycle, or during any one-second portion of the independent telephone company duty cycle, the ring generator can put out only one type of ringing signal. That is, for the Bell System-type ringing, the ring signal can only be superimposed on a +48 volt DC level or a −48 volt DC level. For independent ringing, the ring generator can generate only one frequency at a time. Because power is limited in the remote terminals, only a predetermined number of subscribers, three in the preferred embodiment, can be rung during any particular 2-second portion of the Bell System duty cycle. That is, the remote terminal is programmed to determine all the subscribers who are supposed to be ringing at any particular moment in time and schedule them into groups of up to three subscribers for each two-second portion of the six-second duty cycle. The controller is programmed to arrange these groups such that all three subscribers' lines assigned to a particular two-second portion of the duty cycle have similar ringing conditions, i.e., each of the three telephones assigned to a particular two-second group must be voltage compatible with the other two such that all respond to a +48 volt DC on either the tip or ring line or all respond to a −48 volt DC on either the tip or ring line. Only the polarity need be compatible since the line cards receive ring codes which deterine whether the ring signal is applied to the tip or ring line.

Likewise, for the independent telephone company ringing scheme, the remote terminal controller is programmed to organize a schedule of all the telephone lines which are ringing at the central office at a particular time. The RT controller then assembles groups of up to three frequency compatible subscribers on separate party lines for each one-second portion of the five-second duty cycle. The screening for compatibility and scheduling of individual subscriber lines for which ringing is desired into groups is done by the controller under software control.

When the central office terminal controller detects ringing on a particular line, it sends a supervisory message to the remote terminal controller over the supervisory time slot which indicates which subscriber is being called and the particular ring code assigned to that subscriber's telephone. The messages are accumulated by the remote terminal controller in memory and organized into a table from which the ring scheduling is done by the ring scheduling subroutine of the program stored in the ROM in the controller. Once the sorting is accomplished by the remote terminal controller, the hardware of the ring scheduling system functions as follows.

Referring to FIG. 10, after sorting, the controller 36 in the remote terminal generates address and control signals for the ring generator on its control and address bus 46. These signals include the card select signal on line 364 and the $\overline{\text{WRITE I/O}}$ signal on line 390 which enable decoder 374. The controller 36 then will take the results from its sort and determine for the first group and first portion of the duty cycle what frequency of ring signal is required and the polarity of D.C. voltage upon which the A.C. component is to be superimposed. The result of this decision, of course, depends upon whether the switch on the central office terminal controller indicates that Bell System ringing or independent telephone company ringing is desired.

After enabling decoder 374, the controller 36 writes the proper data on its data bus to select either the positive or negative polarity for the DC voltage to be applied to the DC input of the secondary winding of the transformer. In the preferred embodiment, this code is written on bit D2 of data main bus 32. Bit D2 is coupled through buffer 366 and line 368 to the D input of flip-flop 370. Flip-flop 370 stores the polarity data from the CPU to control relay K1 372.

Controller A, 36 in FIG. 1, loads flip-flop 370 in FIG. 10 by generating the proper address signal on address line ADR 1 and ADR 2 of address and controls bus 46 in FIG. 10. When this address code appears at the input to decoder 374, the output on line 376 coupled to the clock input of flip-flop 370 causes that flip-flop to be loaded. This causes the Q output of flip-flop 370 coupled to line 376 and inverter 378 to place relay K1 in the proper state via line 380 such that contacts 382 assume the desired polarity position. Contacts 382 serve to couple the negative 48-volt DC or positive 48-volt DC outputs of a DC voltage source (not shown in FIG. 10) to the DC input 384 of secondary winding 386 of transformer 388. Decoder 374 is enabled to set this chain of events in action when the $\overline{\text{WRITE I/O}}$ signal on line 390 goes low. This signal is a control signal generated by the controller which indicates, when it goes low, that data is being written onto data main bus 32. The card select signal on line 364 is a high level signal when the ring generation card is selected. Thus, when the signal $\overline{\text{WRITE I/O}}$ goes low, inverter 392 presents a high level signal via line 394 to the input of NAND gate 396 to which it is coupled. NAND gate 396 drives its output line 398 low thereby enabling decoder 374 to decode the address bits on address lines ADR 1 and ADR 2.

Buffer 366 buffers data lines 1–4 so that only one load is seen on these lines by the data outputs of the controller 36 in FIG. 1. If buffer 366 was not present, two of these four data lines would be loaded by two loads instead of one, i.e., latch 400 and flip-flops 370 and 422.

The controller, after loading the polarity data, must load data into latch 400 which will determine the proper frequency of ring signals to be generated. This loading is accomplished by enabling decoder 374 and placing the proper address code on address lines ADR 1 and ADR 2 so as to drive line 402 coupled to the clock input of latch 400 to the proper state to cause latch 400 to load the data from data main bus 32 and latch it on its output bus 404.

The digital data latched on bus 404 causes divider 406 to divide the incoming clock signal on line 408 by a factor N, which factor is determined by the digital data comprising the control word on bus 404. For example, if the control word indicates that factor N is to be eight, the output signal from divider 406 on line 410 will be a pulse train having a frequency of 1,000 hertz where the incoming clock signal on line 408 is 8,000 hertz.

The output signal on line 410 is coupled to the input of square wave generator 412 which converts the irregularly-shaped pulses on line 410 to a square wave on output line 414.

Power down circuit 416 couples the output of square wave generator 412 to optical couplers 418 by line 420. Power down circuit 416 will disable the ring generator if the CPU valid signals on bus 421 indicate that both controllers 36 and 38 in the remote terminal have failed. The power down circuit can also disable the ring generator upon command of the controller 36. This is accomplished by the controller by enabling decoder 374 and writing the proper address code on address lines ADR 1 and ADR 2 so as to drive line 420 coupled to the clock input of flip-flop 422 to a state such as to cause loading of the flip-flop. The data input of this flip-flop is coupled to data bit D3 of data main bus 32 by line 482. Thus, the controller 36 can enable or disable the ring generator by setting bit D3 of the data main bus 32 either to one or zero and addressing flip-flop 422.

Optical couplers 418 couple the square wave ring signal on line 420 to the input of push-pull drivers 424 and 426 by lines 429 and 430, respectively. Optical coupler 418 isolates the logic on its input side from the telephone line driving circuitry on its output side. Thus, if lightning strikes a particular telephone line and a voltage surge is coupled back along the line to optical coupler 418, there will be no direct electrical connection for this voltage surge into the CMOS logic circuitry on the input side of optical coupler 418.

Drivers 424 and 426 are darlington pair amplifiers having outputs coupled via lines 600 and 624 to primary windings 432 and 434 of transformer 388. Secondary winding 386 has one end coupled to line 384 which end is designated the DC input. The other end is coupled to line 90 through the relay contacts of relay K2 579 and is designated the ring signal output. Line 384 can be coupled by relay contact 382 of relay K1 to either the −48 volt DC output or the +48 volt DC output of the DC supply (not shown). The ring signal on line 90 may be coupled to either the line cards coupled to the A side ring generator or the line cards coupled to the B side ring generator by K2 relay contact 579. These contacts are controlled by cross-over relay circuit K2 578 which receives its input from bus 421. The cross-over relay circuit causes the ring signal for one side of the ring generator card to be crossed over and utilized by the other side of the system if the ring generator on that side fails, as indicated by the A and B CPU valid signals on bus 422.

In the preferred embodiment, the ring generator also includes an alarm sense circuit 428 which senses when the ring voltage generated by the ring generator circuitry is too low and also senses when there has been a failure to generate any ring voltage at all, such as where an open circuit in the transformer 388 occurs. Sensing of an open circuit or other failure to produce a ring signal voltage is accomplished by testing the voltage level on line 90 via line 431 coupling line 90 to an input of alarm sense circuit 428. A low voltage ring signal condition is sensed by line 433 which couples alarm sense winding 435 to an input of alarm sense circuit 428. The other end of winding 434 is coupled to a negative 48-volt DC voltage source (not shown). When the controller desires to test the status of the alarm sense circuit 428, it enables tri-state gate 436 via line 438. Tri-state gate 436 has its input coupled via line 440 to the output of alarm sense circuit 428. The output of tri-state gate 436 is coupled to bit D1 of data main bus 32. The signals on line 440 are not coupled to the output on line 442 unless the enabling signal on line 438 is present. Line 438 is coupled to the output of NAND gate 444 which has its inputs coupled to the card select signal on line 364 and the $\overline{\text{READ I/O}}$ signal on line 446 through inverter 448 and line 450. Thus, tri-state gate 436 is enabled whenever the ring generator card is selected by line 364 and the $\overline{\text{READ I/O}}$ signal goes low, indicating that the data main bus 32 is being read by the controller.

Figure 11:
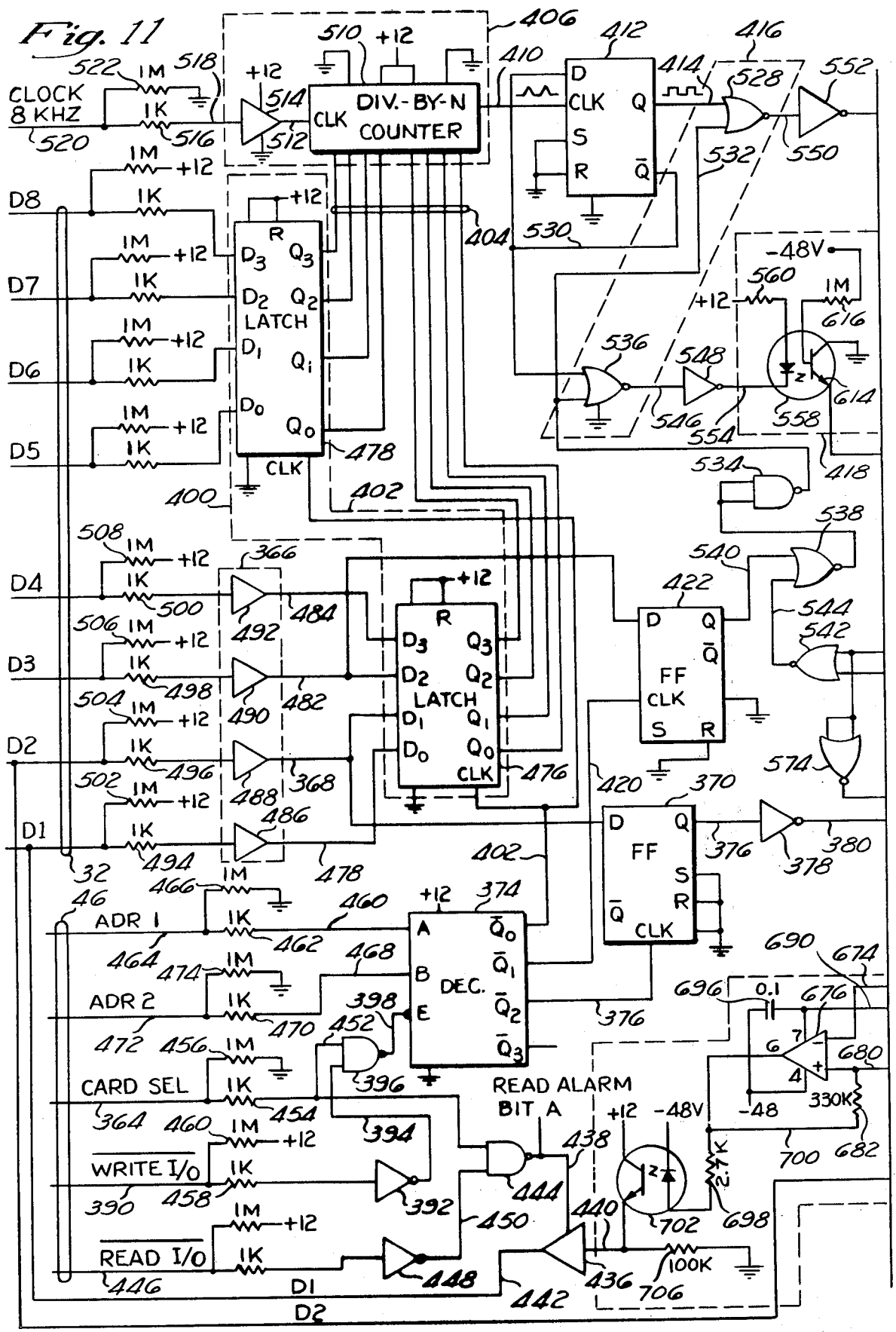
FIGS. 11 and 12 are a logic diagram of the circuitry of the ring generator.
Figure 12:
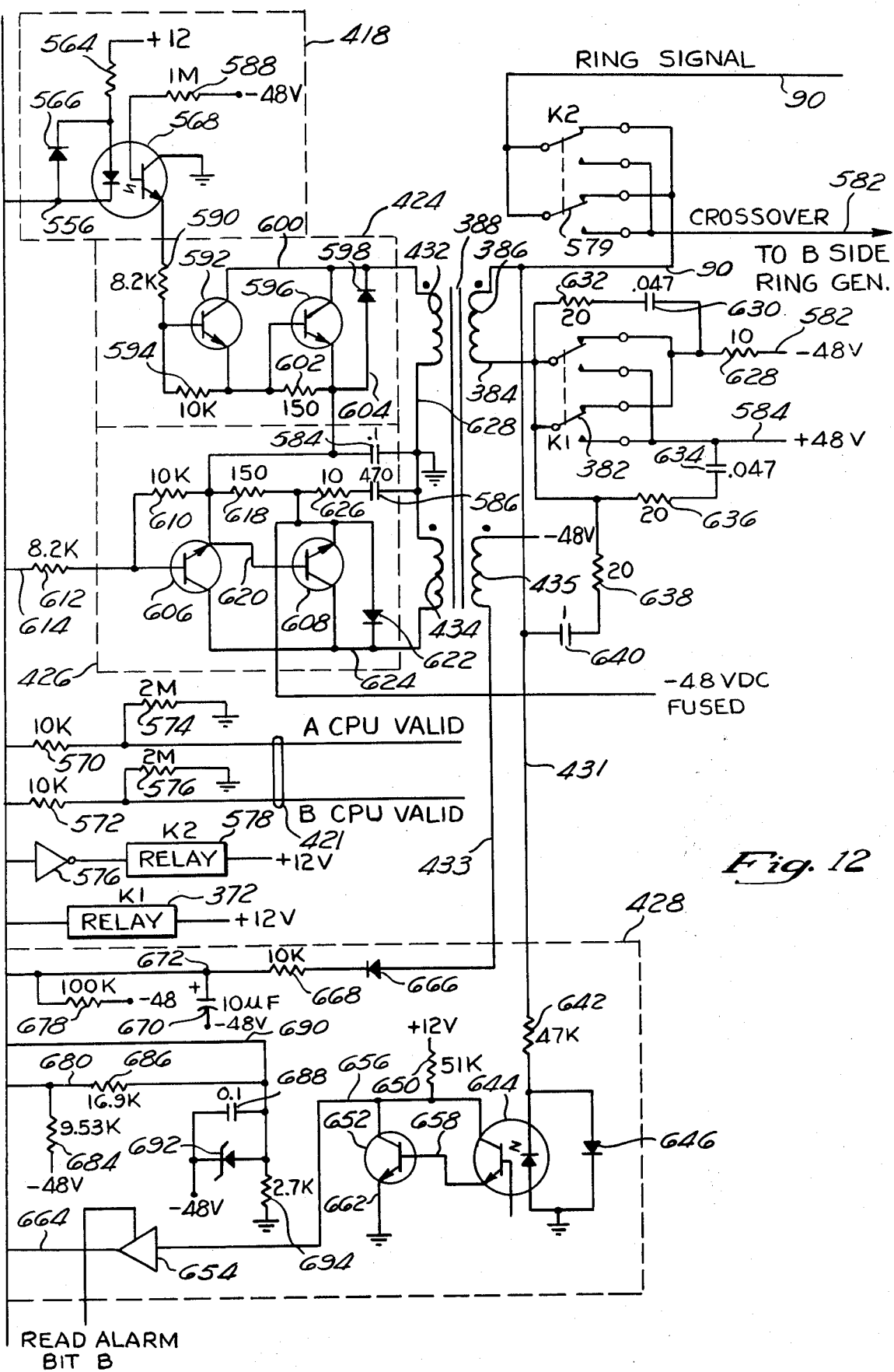

FIGS. 11 and 12 show a logic diagram of the ring generator card 88 in FIG. 1 when placed side by side. Turning now to FIGS. 11 and 12, a more detailed description of the structure of the system disclosed in FIG. 10 will be given. Decoder 374 will be found in the lower middle of FIG. 11. In the preferred embodiment, this chip is a Motorola ™ MC 14556 B CMOS dual, binary, one-of-four decoder/demultiplexers. Its enable input is coupled via line 398 to the output of NAND gate 396. This NAND gate has its input coupled via line 394 to the output of inverter 392. The other input of NAND gate 396 is coupled via line 452 to 1K resistor 454. The other end of this 1K resistor is coupled to the card select line 364. Line 364 is also coupled to ground through 1-meg resistor 456. The purpose of the network formed by resistors 456 and 454 is to hold card select line 354 firmly at ground potential during periods of inactivity on that line. The inputs of NAND gate 392 are coupled to 1K resistor 458. The other end of this resistor is coupled to the signal $\overline{\text{WRITE I/O}}$ on line 390. Line 390 is also coupled by resistor 460 to a positive 12-volt DC voltage source. The purpose of the network formed by resistors 460 and 458 is to hold line 390 firmly at a logic one state when the signal $\overline{\text{WRITE I/O}}$ is not being asserted low.

The A input of decoder 374 is coupled by line 460 to 1-kilohm resistor 462. The other end of this resistor is coupled by line 464 to the ADR 1 address line generated by controller 36 in FIG. 1. Line 464 is also coupled to a ground potential by one-megohm resistor 466. The B input of decoder 374 is coupled via line 468 to one-kilohm resistor 470. The other end of resistor 470 is coupled to the ADR 2 line from controller 36 in FIG. 1. This line, 472, is coupled to ground potential by one-megohm resistor 474.

The $\overline{Q_0}$ is coupled via line 402 to the clock input of latch chips 476 and 478 of latch 400. In the preferred embodiment, these chips are Motorola ™ MC 14175 B quad-type D flip-flops. The D0 input of latch chip 476 is coupled to the output of buffer amplifier 486 by line 478. The D1 input of latch chip 476 is coupled to the output of buffer amplifier 488 by line 368. The D2 and D3 inputs of this latch are coupled to buffer amplifiers 490 and 492 by lines 482 and 484, respectively. The inputs of buffer amplifiers 486 through 492 are coupled to 1-kilohm resistors 494 through 500, respectively. The other sides of these 1-kilohm resistors are coupled to data bits D1 through D4 of data bus 32 from controller 36. Data lines D1 through D4 are respectively coupled to a +12 volt DC potential by 1-megohm resistors 502 through 508.

The purpose of 1-megohm resistors 502-508 and 1-kilohm resistors 494-500 is to form individual networks on each of data lines 1-4 to hold them firmly at a logic one level when there is no activity on the data lines.

The purpose of buffer amplifiers 486-492 is to prevent excessive capacitive loading on data lines D2 and D3 which, if buffer amplifiers 488 and 490 were not present, would be coupled to two inputs, each representing one logic load. The structure of the data bus and controller is such that excessive capacitive loading on the data lines can result in slowness in data transfers or failures of the system to function properly.

Data lines D5 through D8 are similarly connected to data inputs D0–D3 of latch chip 478 utilizing identical 1-megohm and 1-kilohm resistor networks to hold these data lines at a logic one level during periods of inactivity. No buffer amplifiers are present between these resistive networks and chip 478 because none of the data lines D5–D8 is connected to any other load other than inputs of latch chip 478. The Q0 through Q3 outputs of both latch chips 476 and 478 are coupled to the digital data input of divide-by-N counter 510 by bus 404.

In the preferred embodiment, divide-by-N counter 510 is a Motorola ™ MC 14569 BCP CMOS high-speed programmable divide-by-N, dual, 4-bit BCD/binary counter. The data bits for programming the counter enter the control word input of the chip on bus 404. The clock signal enters the chip on line 512 from the output of buffer 514. The input of buffer 514 is coupled to 1-kilohm resistor 516 by line 518. The other end of 1-kilohm resistor 516 is coupled to an 8-kilohertz clock signal on line 520. Line 520 is also coupled to ground through 1-megohm resistor 522 forming a network with resistor 516 to condition the clock signal for buffer 514.

The purpose of buffer 514 is to give the clock signal on line 520 better definition and amplitude with less noise and to prevent capacitive loading of the clock line 520.

The output of divide-by-N counter 510 is coupled via line 410 to the clock input of flip-flop 412. This flip-flop serves as a square wave generator to transform the pulses on line 410 into a square wave pattern of one-half the frequency line line 414.

Line 414 couples the Q output of flip-flop 412 to one input of NOR gate 528. The $\overline{Q}$ output of flip-flop 412 is coupled by line 530 to the D input of the same flip-flop, thereby forming a divide-by-two circuit. The set and reset inputs of flip-flop 412 are coupled to ground. In the preferred embodiment, flip-flop 412 is a Motorola ™ MC 14013 BCP CMOS, dual, D-type flip-flop. The other input of NOR gate 528 is coupled via line 532 to the output of inverter 534. It is also coupled to one input of NOR gate 536. The other input of this NOR gate is coupled via line 530 to the D input and $\overline{Q}$ output of flip-flop 412. Together, NOR gates 528 and 536 form power down circuit 416, shown in FIG. 10. The inputs of inverter 534 are coupled to the output of NOR gate 538. This gate has one input coupled to the Q output of latch 422 via line 540, and the other input coupled to the output of NOR gate 542 by line 544.

Latch chip 422 serves as the on/off bit store allowing the controller 36 to power down the ring generator circuit of FIGS. 11 and 12 on command, as explained in the earlier discussion of FIG. 10. The D input of flip-flop 422 is coupled via line 482 to the output of amplifier buffer 490 which has its input coupled to data bit D3 of the controller data bus. The clock input of flip-flop 422 is coupled via line 420 to the $\overline{Q1}$ output of decoder 374. The reset input of the latch chip 422 is grounded. In the preferred embodiment, flip-flop 422 is a Motorola ™ MC 14013 B CMOS dual D flip-flop. Controller 36 loads flip-flop 422 via the ADR 1 and 2 lines, the card select line 364 and the $\overline{\text{WRITE I/O}}$ signal on line 390. The controller can load a logic 1 or 0 via bit D3 of its data bus thereby setting or resetting the Q output on line 540. This signal ripples through NOR gate 538, inverter 534, and power down NOR gate 536 to ultimately emerge on line 546 coupled to the input of inverter 548. In the preferred embodiment, inverter 548 is a Motorola ™ MC 1416 P open collector-type inverter.

Likewise, the signal at the Q output of latch chip 422 on line 540 ripples through NOR gate 538, inverter 534, and NOR gate 528 to emerge on line 550 coupled to the input of open collector inverter 552.

The output of open collector inverter 548 is coupled via line 554 to the negative end of the light emitting diode in optical coupler 558. The positive end of the light emitting diode is coupled through resistor 560 to a positive 12-volt DC supply.

An identical circuit is coupled to the output of open collector inverter 552 for driving the LED of optical coupler 568 in FIG. 12.

From the foregoing, it is seen that by setting or resetting the D3 bit of the data bus, the controller can control these signals at the input of open collector inverters 548 and 552. In one input condition, these inverters will sink current to ground through their outputs. In the other condition, they will refuse to sink current. Thus, the controller has complete control over the current flowing through the light emitting diodes in optical couplers 558 and 568 and thus it has control over the base current of the input transistors of drivers 424 and 426. The lowered light emission from the LEDs causes the transistors in the optical couplers to have a lower emitter current. The controller can therefore shut down current flowing in drivers 424 and 426 to save power.

This shut-down feature is also actuated automatically in the eventuality that both controllers fail. In such a case, the A CPU VALID and B CPU VALID signals on bus 421 in FIG. 12 will assume a logic state which causes the output signal of NOR gate 542 on line 544 to ripple through NOR gate 538, inverter 534, and NOR gates 536 and 528 so as to cause open collector inverters 548 and 552 to shut down the light emitting diodes in the optical couplers. The inputs of NOR gate 542 are coupled to the A CPU VALID and B CPU VALID signals through 10K resistors 570 and 572. Both the A CPU and the B CPU VALID signals are coupled to ground through two megohm resistors 574 and 576. These resistors insure that the A CPU and B CPU VALID lines are firmly held at ground potential during periods of inactivity on these lines.

The digital multiplex system disclosed herein utilizes dual ring generators for reliability purposes. Should one ring generator fail, a cross-over circuit will detect the signal indicating that a controller has detected a failure in one of the ring generating cards. This cross-over circuit will cause the still-operating ring generator to switch over to supply a ring signal to the side which has failed. This cross-over circuitry is comprised of inverter 574, open collector inverter 576, and relay K2 578. The inputs of inverter 574 are coupled to the A CPU VALID signal, but, on the other side, the inputs would be coupled to the B CPU VALID signal. The output of inverter 574 is coupled to the input of open collector inverter 576 which has its output coupled to the coil of relay K2 578. The other end of the coil of K2 is coupled to the positive 12-volt DC supply. When a logic one appears at the input of open circuit inverter 576, the inverter output goes to logic zero and sinks current through the relay coil of K2, thereby energizing the relay. This causes relay contacts 428 in the upper-center portion of FIG. 12 to operate so as to connect the ring signal on line 90 to the cross-over line 582 coupled to the other ring generator as opposed to the normal ring signal line 90.

Flip-flop 370 in FIG. 11 is the plus or minus polarity bit memory. Its data input is coupled by line 368 to the output of buffer amplifier 488 which in turn is coupled to the D2 bit of data main bus 32. The clock input of this chip is coupled via line 376 to the $\overline{Q2}$ output of decoder 374. The set and reset inputs of flip-flop 370 are grounded. In the preferred embodiment, this flip-flop is a Motorola TM MC 14013 BCP. Controller 36 in FIG. 1 can control the polarity of the DC voltage applied to the DC input 384 of secondary winding 386 of the transformer 388 in FIG. 12. Controller 36 exercises this control by setting or resetting bit D2 of its data bus after addressing latch 370 via the ADR 1 and 2 lines and the ring generator card select line 364 in address and control bus 46. The Q output of flip-flop 370 is coupled to the input of open circuit inverter 378 by line 376. The output of this inverter is coupled by line 380 to the coil of relay K1 372. The other end of this coil is connected to a positive 12-volt DC supply. Thus, controller 36 can control the energization state of relay K1 through bit D2 of its data bus, flip-flop 370, and inverter 378. Relay contacts K1, 382 in the upper-mid-portion of FIG. 12, then connect either the −48 volt supply, coupled to line 582, or the +48 volt DC supply, coupled to line 584, to the DC input 384 of secondary winding 386. This causes either a positive or negative 48-volt DC level to appear on line 90. The square wave ring signal is superimposed upon this DC level by the operation of optical couplers 418 driving push-pull drivers 424 and 426 to drive current alternately through primary windings 432 and 434 of transformer 388 in FIG. 12.

The operation of Darlington pair 424 is conventional and apparent to those skilled in the art. Likewise, for darlington pair 426. Capacitors 584 and 586 function in a noise suppression capacity.

The transistor in optical coupler 568 has its base coupled to a 1-megohm resistor 588, the other end of which is coupled to a −48 volt DC supply. The collector of this transistor is grounded, and the emitter is coupled to an 8.2-kilohm resistor 590. The other end of this resistor is coupled to the base of transistor 592. The base of transistor 592 is also coupled by a 10-kilohm resistor 594 to the emitter of transistor 592. The emitter of transistor 592 is coupled to the base of transistor 596. The collector of transistor 592 is coupled to the collector of transistor 596 and to the negative end of diode 598 and to one end of primary winding 432 by line 600. The base of transistor 596 is coupled by 150-ohm resistor 602 to the emitter of transistor 596. The emitter of transistor 596 is coupled to the positive end of diode 598 and to the ungrounded end of capacitor 584 by line 604. Line 604 is also coupled to the emitter of transistor 606. The emitter of transistor 606 is coupled to the base of transistor 606 by 10K resistor 610. The base of transistor 606 is also coupled through 8.2K resistor 612 to the emitter of the transistor in optical coupler 558 by line 614. The base of the transistor in optical coupler 558 is coupled through 1-megohm resistor 616 to a −48 volt DC supply. The collector of the transistor in optical coupler 558 is grounded.

Returning to Darlington pair 426, the emitter of transmitter 606 is also coupled to the emitter of transistor 608 by 150-ohm resistor 618. The emitter of transistor 606 is also coupled to the base of transistor 608 by line 620. The collector of transistor 608 is coupled to the collector of transistor 606 and to the negative end of diode 622 and to one end of primary winding 434 by line 624. The emitter of transistor 608 is also coupled via 10-ohm resistor 626 to the ungrounded end of capacitor 586. The two ends of primary windings 432 and 434, not already mentioned, are coupled to ground by line 628. The ends of capacitors 584 and 586 not already mentioned are coupled to ground via line 628.

The −48 volt DC supply on line 582 is coupled by 10-ohm resistor 628 to 0.047-microfarad capacitor 630. Relay contacts 382 are bypassed by 0.047-microfarad capacitor 630 and 20-ohm resistor 632 for spark suppression purposes. The positive 48-volt DC supply coupled to line 584 is also coupled to 0.047-microfarad capacitor 634 and 20-ohm resistor 636 which bypass the second set of ganged contacts 382 for spark suppression purposes.

The 20-ohm resistor 638 and 1-microfarad capacitor 640 coupled from DC input 384 to line 431 serve to shunt off any high voltage peaks which occur in secondary winding 386 due to switching action by the relay contact. This is necessary to prevent the peaks from destroying any CMOS logic.

Line 431 coupling the output of secondary winding 386 to the input of alarm sensor 428 provides the information necessary for the alarm sensor 428 to determine whether there has been an open circuit in the transformer or a failure to generate any ring signal voltage on line 90. Line 431 is coupled to a 47K resistor 642 which has its opposite end coupled to the negative end of a light emitting diode in optical coupler 644. The positive end of the light emitting diode is grounded. Diode 646 bypasses the LED for protection purposes having its positive end coupled to the negative end of the LED and vice versa. The base of the transistor in optical coupler 644 is left open. The collector of this transistor is coupled to the 12-volt supply by 51K resistor 650. The collector is also coupled to the collector of transistor 652 and the input of tri-state gate 654 by line 656. The emitter of the transistor in optical coupler 644 is coupled to the base of transistor 652 by line 658. The emitter of transistor 652 is coupled to ground through line 662. The output of tri-state gate 654 is coupled to bit D2 of data main bus 32 by line 664.

Line 433 couples secondary winding 435 of transformer 388 to the positive end of diode 666. The other end of secondary winding 435 is coupled to the −48 volt DC supply. The negative end of diode 666 is coupled through 10K resistor 668 to the positive end of electrolitic 10-microfarad capacitor 670. The other end of this capacitor is coupled to the negative 48-volt supply. Diode 666, resistor 668, and capacitor 670 form a detector circuit which detects the signal voltage appearing on secondary winding 435. Thus, the output voltage at node 672 is indicative of the amplitude of the ring signal waveform generated by drivers 424 and 426. This signal voltage is coupled by line 674 to the negative input of comparator 676. Node 672 is also coupled to the 48-volt negative DC supply by 100K resistor 678. The positive input of comparator 676 is coupled via line 680 to 330K resistor 682. Line 680 is also coupled to the negative 48-volt supply through 9.53K resistor 684. Line 680 is also coupled to 16.9K resistor 686, the other end of which is coupled to one end of 0.1-microfarad capacitor 688. The other end of this capacitor is coupled to the negative 48-volt DC supply. Line 690 couples the node between resistor 686 and the first end of capacitor 688, and the positive end of zener diode 692 to ground through 2.7K resistor 694. The other end of zener diode 692 is coupled to the −48 volt supply. Line 690 is also coupled to one end of a 0.1-microfarad capacitor 696 and to pin 7 of comparator 676. In the preferred embodiment, comparator 676 is a generic 741 type manufactured by several sources. The other end of capacitor 696 is coupled to the −48 volt DC supply and to pin 4 of comparator 676. The output of comparator 676 is coupled to 2.7K resistor 698 and to the other end of 330K resistor 682 via line 700. The other end of resistor 698 is coupled to the positive end of the light emitting diode in optical coupler 702. The negative end of this light emitting diode is coupled to the negative 48-volt DC supply. The transistor of this optical coupler 702 has its collector coupled to the positive 12-volt DC supply and its emitter coupled via line 440 to the input of tri-state gate 436. The emitter of the transistor is also coupled through a 100K resistor 706 to ground.

When the controller wishes to read alarm bit A, it selects the ring generator and card using the CARD SELECT signal on line 364 and enters a read cycle. This causes the $\overline{\text{READ I/O}}$ on line 446 to go low. This in turn causes inverter 448 to raise its output on line 450 which causes NAND gate 444 to lower its output line 438 thereby enabling tri-state gate 436 and coupling line 440 to bit D1 of the controller data bus via line 442. The voltage on node 672 is compared by comparator 676 against a reference voltage established on line 680 by the resistor network coupled thereto. If the voltage peaks on node 672 are reaching above the reference voltage, comparator 676 outputs signals on line 700 which are optically coupled by coupler 702 to the input of tri-state gate 436.

The operation of optical coupler 644 in FIG. 12 and transistor 652 in conjunction with alarm bit B will be apparent to those skilled in the art.

DESCRIPTION OF THE RE-FRAME FIFO BUFFER IN THE MULTIPLEXER

Figure 13A:
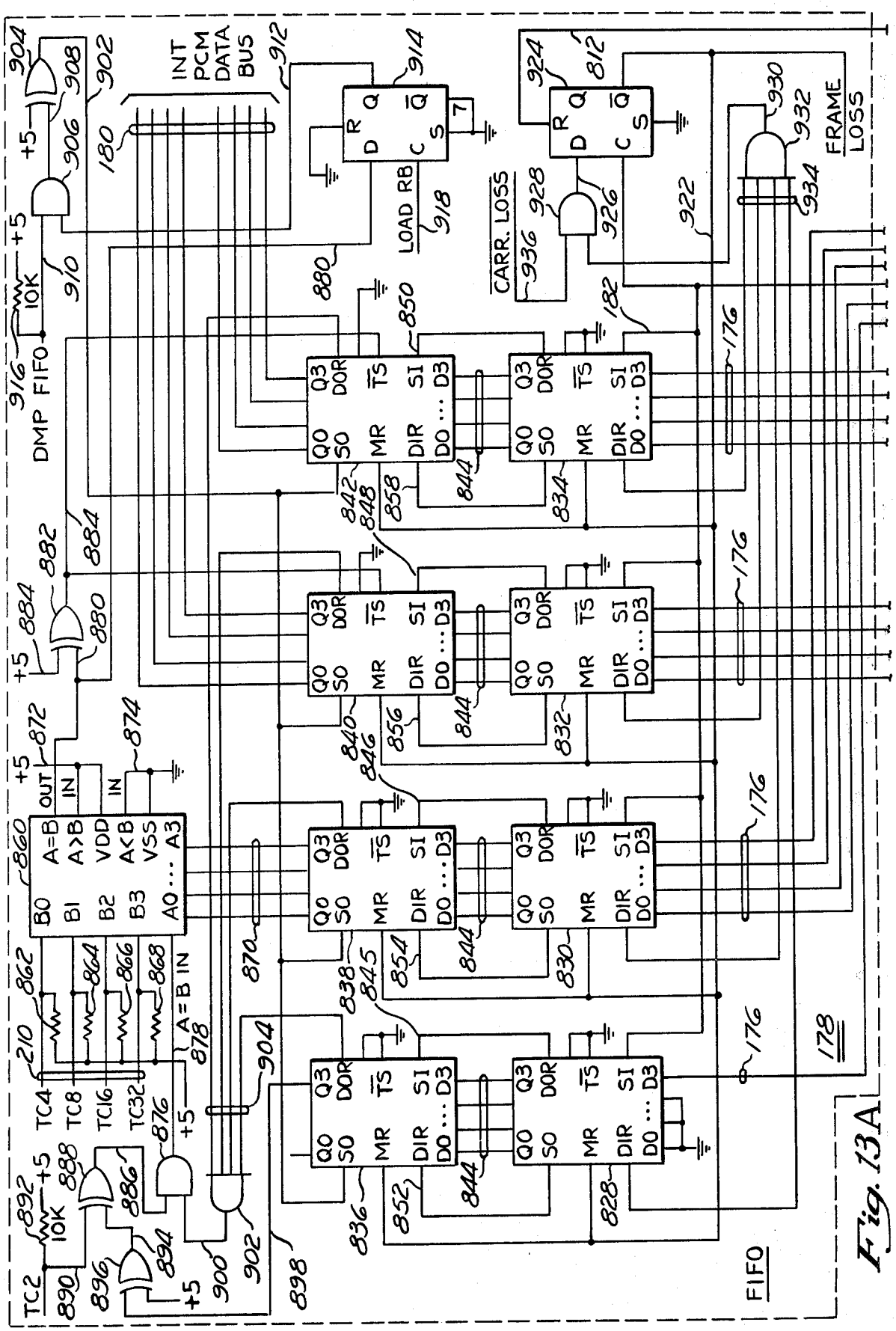
FIGS. 13a and 13b together comprise a logic diagram of the re-frame buffer.
Figure 13B:
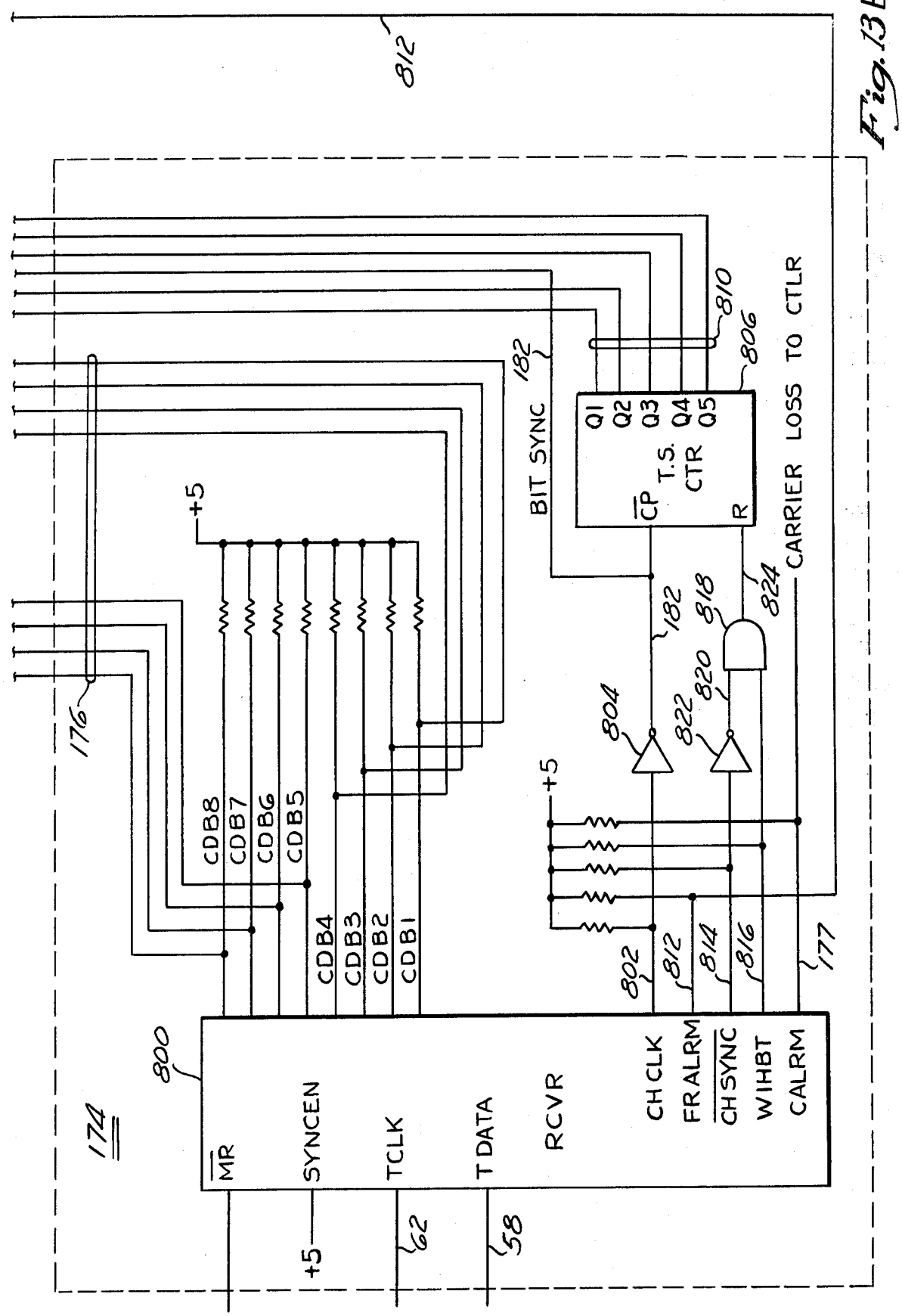

FIGS. 13a and 13b show a logic diagram of the reframe buffer 178. Turning now to FIGS. 13a and 13b, a more detailed explanation of the operation of reframe buffer 178 in FIG. 5 will be given. Line receiver chip 800 in FIG. 13b receives the NRZ, i.e., unipolar, data on line 58, from span line terminating card 54 in FIG. 1. Line receiver chip 800 also receives a clock input signal on line 62 also from span terminating card 54 in FIG. 1. This clock signal has a frequency of 1.544 megahertz, and is synchronized with the occurrence of each bit in the serial bit stream on line 58. In the preferred embodiment, line receiver chip 800 is a Rockwell TM R8060.

The line receiver chip converts the serial data at its input to parallel output data on lines CDB 1-8. It also generates a channel clock signal on line 802 which marks each time slot. That is, the channel clock signal on line 802 goes high once for each time slot. Line 802 is coupled to the input of inverter 804 which has its output coupled via line 182 to the $\overline{\text{CP}}$ or count input of counter chip 806. The signals on line 182 serve to increment counter 806 such that the output data on bus 176 indicate the binary number representing the number of the time slot which is currently being received by line receiver 800.

Line receiver 800 also generates a frame alarm signal on line 812 which goes high when there is a loss of frame synchronization with the input data. That is, when line receiver 800 fails a predetermined number of times to detect the frame bit in the input data at the end of all twenty-four time slots in a frame, it will set the frame alarm signal on line 812. Line receiver 800 also generates a channel synchronization signal on line 814 and a write inhibit signal on line 816. The channel synchronization signal is a low-going pulse which occurs at the end of each frame. The write inhibit signal indicates when it is impermissible to write new data to the input of line receiver 800. This signal goes high for a portion of each time slot. The write inhibit signal on line 816 is coupled to the input of AND gate 818, the other input of which is coupled via line 820 to the output of inverter 822. This inverter has its input coupled to the channel synchronization signal on line 814. The output of AND gate 818 is coupled to the reset input of counter 806 by line 824. The output of AND gate 818 on line 824 goes high at the end of every frame for a portion of a time slot. This resets time slot counter 806 so that it may begin counting the time slots of the next frame.

Line receiver chip 800 also generates a carrier loss alarm on line 177 which is coupled to controller 36 in FIG. 1 through the status register in the multiplexer, as shown in FIG. 5, to indicate that no serial data is being received from the span line.

The outputs of time slot counter 806 on bus 176 are coupled to the data inputs of FIFO buffer chips 828 and 830. The data outputs of line receiver chip 800 are coupled to the data inputs of FIFO buffer chips 832 and 834 by bus 176. Another layer of FIFO buffer memory is provided by FIFO buffer chips 836, 838, 840 and 842.

FIFO buffer chips 828 through 842 are RCA TM 40105B chips in the preferred embodiment. These chips work as follows. Data presented at data inputs D0-D3 is loaded into the first level of the stack when the shift input signal, marked SI, goes high. Each time the shift input signal goes high, the data present at a D0, D1, D2, and D3 input is loaded into the next level down in the stack. The DIR output signal indicates by one binary state that the FIFO memory chip is ready to accept new data. The other binary state indicates that the FIFO memory chip is not ready to store new data. The master reset input, marked MR, clears the entire stack when it is driven to a high level.

Each of FIFO memory chips 828-842 contains a stack of sixteen 4-bit words. The outputs of the first level of the stack from FIFO chips 828, 830, 832, and 834 on bus 844 are coupled to the input bits D0, D1, D2, and D3 of the second level of the FIFO stack comprised of chips 836, 838, 840, and 842. Therefore, the overall re-frame FIFO buffer is thirty-two levels deep and sixteen bits wide. This comprises approximately a frame-and-a-half of serial input data.

When the DOR signal of each FIFO buffer chip is high, data is present and ready to be read from outputs Q0 through Q3 so long as the tri-state input, marked $\overline{TS}$, is held low. It should be noted for FIFO chips 828, 830, 832, 834, 836 and 838 that the tri-state input is perpetually grounded. Therefore, these chips can be read as soon as the data output ready signal, DOR, goes high.

The shift-out input, marked SO, causes, when it is driven high, the next level down in the stack to be moved to the output bits Q0–Q3.

The purpose of the FIFO stack is to hold the 8-bit parallel digital data for each time slot together with its time slot count until this time slot count comes up again on the internal data bus of the multiplexer. The re-frame buffer then releases it to the internal PCM data bus 180 for transfer to various locations in the multiplexer. This is accomplished as follows. During time slot zero, the serial data coming into line receiver chip 800 is converted to parallel data on lines CDB1 through CDB8 and coupled to the data inputs of FIFO chips 832 and 834 by bus 176. At the same time, the binary information on output bits Q1–Q5 of time slot counter 806 representing time slot zero is coupled via bus 176 to the data input of FIFO buffers 828 and 830. This data is loaded into the first level of the stack and appears on data outputs Q0 through Q3 of FIFO buffer chips 828, 830, 832, and 834. The appearance of this data at the outputs is marked by the transition of the DOR signal of FIFO buffers 828-834 from a low to a high level. These transitions are coupled to the shift in input pins of FIFO buffers 836, 838, 840, and 842 by lines 845, 846, 848, and 850, respectively. This causes the data at the outputs of buffer chips 828, 830, 832, and 834 to be loaded into the first level of the stack comprised of buffers 836-842 via bus 844. This data is then presented at outputs Q0–Q3 of buffer chips 836, 838, 840, and 842 which appearance is marked by a low to high transition of the DOR outputs of these buffer chips.

As soon as buffer chips 836-842 are ready to receive another data word, the DIR signal output goes high. These transitions are coupled to the shift out inputs of buffers 828-834 via lines 852, 854, 856, and 858, respectively. This low to high transition causes buffers 828 through 834 to shift the next level down in the stack to their outputs. Prior to that time, the next level down in the stack comprised of buffers 828-834 had been filled by the parallel data of time slot one. This data was loaded at the end of time slot one when the channel clock signal on line 802 from line receiver 800 changed state so as to indicate that the data on lines CDB 1–8 was then the data for time slot one. This change of state of the channel clock signal was coupled through inverter 804 to time slot counter 806 incrementing it to indicate that time slot one was then being received. This change of state on line 182 was also coupled to the shift-in input, SI, of buffer chips 828-834. This caused these chips to load the data at their inputs into the next empty level of the stack. This data was then transferred to the outputs of buffers 836-842 in a similar fashion as was the data for time slot zero.

As the time slot count for the multiplexer internal bus 180 matches the time slot count stored in FIFO buffers 836 and 838, the data residing at the top of the FIFO stacks in buffers 840 and 842 is loaded onto internal PCM data bus 180. Therefore, the FIFO stack acts as an elastic buffer to temporarily store incoming data until its time slot, as determined by the internal time slot counter in control timing 184 in FIG. 5, comes up whereupon it is transferred via the internal PCM data bus to wherever it happens to be going as determined by controller 36. In this fashion, any variable delays in transmission over the span line will not cause multiplexer 42 to get out of synchronization with the multiplexer in the terminal at the other end of the span line.

More specifically, loading of the data from FIFO buffers 840 and 842 onto internal PCM data bus 180 is accomplished by comparing the stored time slot count at the top of the FIFO stack in chips 836 and 838 with the time slot count as determined by control timing 184 in FIG. 5. This comparison is done by comparator 860. The B side of this comparator, inputs B0, B1, B2, and B3, are coupled via bus 210 to the outputs of the time slot counter in control timing 184, i.e., bits TC4, TC8, TC16, and TC32. Resistors 862, 864, 866, and 868 are all 10K resistors and couple these bits to a positive level supply to hold them affirmatively at a logic one level unless they are being asserted at a logic zero level by the time slot counter. In a preferred embodiment, comparator 860 is a Motorola ™ MC 14585 BCP.

The four outputs from FIFO buffer 838 are coupled to the A side inputs of comparator 860, bits A0–A3, by bus 870. The A Greater Than B and VDD inputs are coupled to the positive 5-volt supply by line 872. The A Less Than B and VSS inputs are coupled to ground by line 874. The A Equals B input is coupled to the output of AND gate 876 by line 878. In this configuration, when line 878 is a logic one, the A Equals B output on line 880 will be a logic one if A0 equals B0, A1 equals B1, A2 equals B2, and A3 equals B3.

Line 880 is coupled to one input of exclusive-OR gate 882 which has its other input coupled by line 884 to the +5 volts supply. In this configuration, exclusive-OR gate 882 is functioning as an inverter and, indeed, a simple inverter would serve the purpose. The output of inverter 882 is coupled via line 884 to the tri-state inputs, $\overline{TS}$, of FIFO buffers 840 and 842.

Comparator 860 is enabled through the following network. One input of AND gate 876 is coupled by line 886 to the output of exclusive-OR gate 888. One input of this exclusive-OR gate is coupled by line 890 to the TC2 bit from the time slot counter in control timing 184 of FIG. 5. Line 890 is also coupled via 10K resistor 892 to the +5 volts supply to hold this line firmly at a logic one when TC2 is not being affirmatively asserted low. The other input of exclusive-OR gate 888 is coupled via line 894 to the output of inverter 896. This inverter has its input coupled via line 898 to the Q3 output of FIFO buffer 836. The other input of AND gate 876 is coupled via line 900 to the output of AND gate 902. This AND gate has its inputs coupled to the data output ready outputs, DOR, of FIFO buffers 836, 838, 840, and 842 via bus 904. Therefore, if any of buffers 836-842 do not have data ready on their outputs, one of the lines in bus 904 will be at a logic zero level. This will cause line 900 to be at a logic zero level. Thus, line 900 will be a logic one only if all four FIFO buffers 836-842 have data ready at their output.

Exclusive-OR gate 888 in the configuration shown in FIG. 13A acts as a two-bit comparator comparing the Q3 output bit of FIFO buffer 836 to the TC2 output bit from the time slot counter in control timing 184 of FIG. 5. The Q3 bit if FIFO buffer 836 holds the data which was loaded into the D3 input of FIFO buffer 828 from the Q1 output of time slot counter 806 via bus 176. By inverting the Q3 bit in inverter 896, exclusive-OR gate 888 generates a logic one on its output line 886 when the signals on line 890 and Q3 from FIFO buffer 836 are at the same logic level. When line 886 is high and line 900 indicates that all of buffers 836 through 842 have data ready at their outputs, line 878 is raised to a logic one level, thereby enabling comparator 860 which makes the comparison. If the time slot counter bits TC4, TC8, TC16, and TC32 are the same as the output bits Q0-Q3 of FIFO buffer 838, a logic one appears at the A Equals B output on line 880. This is inverted in inverter 882 and coupled via line 884 to the tri-state inputs of FIFO buffers 840 and 842. The logic zero on line 884 enables FIFO buffers 840 and 842 to drive the internal PCM data bus 180.

The shift-out inputs of FIFO buffers 836 through 842 are coupled via line 902 to the output of inverter 904. This inverter has its input coupled to the output of AND gate 906 by line 908. This AND gate has one input coupled to the dump FIFO signal on line 910 and the other input coupled via line 912 to the Q output of latch 914. Line 910 is also coupled via 10K resistor 916 to the positive five-volt supply such that line 910 will be affirmatively held at logic one when the dump FIFO signal is not being asserted low.

The reset input of latch 914 is grounded and the clock input is coupled to the LOAD RB signal on line 918. The D input of latch 914 is coupled via line 880 to the A Equals B output of comparator 860. Latch 914 also has its set input and pin 7 coupled to ground. In the preferred embodiment, this latch is a generic type 4013B flip-flop. Likewise, time slot counter 806 is a generic 4024B.

The signal LOAD RB is a positive going pulse that occurs during every other write cycle of the signal $\overline{R/W}$ generated by control timing 184 in FIG. 5. It should be noted at this point that control timing 184 is coupled as needed to all the blocks shown in FIG. 5 with various signals from the PCM bus clock and timing bus 146. The signal $\overline{R/W}$ controls the read and write cycle for each MUX internal time slot on internal PCM data bus 180.

The signal DMP FIFO is a positive going pulse during every other read cycle of the signal $\overline{R/W}$ from control timimg 184. Thus, the signal on line 910 is a logic one during every other read cycle of the multiplexer and the signal on line 918 is a logic one during every other write cycle of the multiplexer. The circuitry for generating the signals dump FIFO and load RB is not shown in FIG. 13 but will be apparent to those skilled in the art.

Because multiplexers 42 and 44 each have two internal time slots for every one time slot on the span line, and because each internal multiplexer time slot is comprised of one read cycle and one write cycle, the signal LOAD RB on line 918 will load latch 914 only once during ever time slot of the span line. Because its data input is coupled via line 880 to the A Equals B output of comparator 860, latch 914 will load a logic one only when the time slot of the span currently being processed by the multiplexers, as indicated by the TC2, 4, 8, 16, and 32 bits on the B input of comparator 860 equals the time slot count indicated at the output of FIFO buffers 836 and 838. When latch 914 loads a logic one, its Q output on line 912 will go to a logic one level. Thus, line 908 at the output of AND gate 906 will go to a logic one level only when the time slot counts are equal and the read cycle of an internal MUX time slot is occurring. The signal on line 908 is inverted in inverter 904 and applied via line 902 to the shift-out inputs of buffers 836 through 842. This will cause the next words down in the stack to be shifted to the outputs and held there. The data previously on these outputs will have been read from the internal PCM data bus 180 during the previous internal MUX read cycle with the same time slot on the span line.

The master reset of FIFO buffer 828 through 842 are all coupled via line 922 to the $\overline{Q}$ output of latch 924. The clock input of latch 924 is coupled via line 182 to the output of inverter 804 which has its input coupled to the channel clock signal, CHCLK, on line 802. The data input of latch 924 is coupled via line 926 to the output of AND gate 928. This AND gate has one input coupled to the signal $\overline{CARR. LOSS}$, and the other input coupled via line 930 to the output of AND gate 932. The inputs of AND gate 932 are coupled to the data input ready outputs of FIFO buffers 828 through 834 via bus 934. The output of AND gate 932 on line 930 thus will be a one only when all of FIFO buffers 828-834 are ready to receive additional data on their data inputs D0-D3. Assuming that no loss of carrier is indicated by the signal CALRM on line 177 from line receiver 800, the signal $\overline{CARR. LOSS}$ on line 936 will always be a logic one. Therefore, as long as the signals on bus 934 all indicate readiness to receive additional data at the end of each time slot, as marked by the signal on line 182, latch 824 will continue to load logic ones via line 926. However, as soon as any one of FIFO buffer chips 928-834 fills up all sixteen of its 4-bit words, one of the signals on bus 934 will go to a logic zero level and be in that state at the end of a time slot. When this occurs, line 930 goes to a logic zero level causing line 926 to go to a logic zero level, thereby loading a zero into latch 924 at the end of one time slot. This sets the $\overline{Q}$ output on line 922 at a logic one level which signals the master resets of FIFO buffer chips 828-842 to clear the entire contents of the FIFO buffer. The logic one level on line 922 also constitutes the signal FRAME LOSS which is coupled to the controllers indicating that a frame of data has been lost due to overflow of the FIFO buffer.

There is disclosed below the programs for the controllers in the system. Appendix I is the program for the remote terminal controllers and Appendix II is the program for the central office terminal controllers. These programs are not critical to the invention, and any other programs which accomplish the same functions are intended to be included within the scope of the claims appended hereto. Likewise, any hardware implementations of the circuitry disclosed herein which accomplishes the functions as disclosed herein is also intended to be included within the scope of the claims.

APPENDIX I

RT Controller

| | | | | | | | | | | | | | | | | | | | |
|---|---|---|---|---|---|---|---|---|---|---|---|---|---|---|---|---|---|---|---|
| C3 | 64 | D4 | 98 | 1B | B2 | 40 | 64 | 40 | 7F | 7F | 53 | E7 | E7 | D2 | A9 | 24 | BF | EA | 84 | 08 |
| D0 | 51 | F6 | E5 | F4 | E1 | F4 | F6 | 3F | 0D | 9D | B7 | 02 | 0C | 1A | 55 | D0 | 1E | AC | 3F | FA |
| FB | 37 | 7E | F7 | FF | 2D | C3 | 44 | D4 | 48 | 9D | 75 | 41 | 79 | 3B | 87 | 2D | 1A | A8 | 8E | ED |
| E6 | AF | 10 | 4B | 0D | 79 | 0D | CB | 1F | AF | 53 | FE | CB | FB | 65 | AD | 37 | 51 | 18 | D2 | 11 |
| DA | DF | CB | 73 | E6 | AA | 6B | 61 | 0D | 57 | AF | A3 | 50 | 91 | 23 | 80 | 0A | C6 | C3 | 0B | D4 |
| 8E | 7F | A4 | 43 | 1E | 4B | FD | 20 | 76 | E9 | 48 | 21 | E8 | 32 | FA | 54 | 24 | 05 | 67 | D4 | EF |
| C6 | 89 | F3 | 31 | 00 | 48 | 3E | 01 | D3 | C8 | 32 | 0D | 40 | 21 | FF | FF | 01 | FF | FF | CD | 09 |
| 05 | DD | 21 | 00 | 00 | 01 | 00 | 28 | D9 | 21 | FF | FF | D3 | D8 | 11 | 21 | 10 | DD | 46 | 00 | DD |
| 23 | 0E | 08 | 29 | 1F | A8 | E6 | 80 | 28 | 06 | 7C | FE | 47 | 7D | AB | 6F | 78 | 07 | 47 | 0D | 20 |
| ED | D9 | 0B | 78 | B1 | D9 | 20 | DA | 7D | B4 | CA | D7 | 00 | 21 | 07 | 00 | 06 | 02 | 0E | 01 | CD |
| 09 | 05 | C3 | D4 | 00 | 21 | 00 | 40 | 06 | 03 | D3 | D8 | 70 | 04 | 20 | 02 | 06 | 03 | 23 | 7C | FE |
| 48 | 20 | F2 | 26 | 40 | 06 | 03 | D3 | D8 | 7E | B8 | C2 | 27 | 01 | 04 | 20 | 02 | 06 | 03 | 23 | 7C |
| FE | 48 | 20 | EE | 40 | D3 | D8 | 7E | 77 | 23 | 7C | FE | 48 | 20 | F5 | 26 | 40 | 06 | 03 |
| D3 | D8 | 7E | 2F | B8 | C2 | 27 | 01 | 04 | 20 | 02 | 06 | 03 | 23 | 7C | FE | 48 | 20 | ED | C3 | 34 |
| 01 | 21 | 07 | 00 | 06 | 02 | 0E | 00 | CD | 09 | 05 | C3 | 31 | 01 | CD | A8 | 01 | CD | 49 | 01 | CD |
| D3 | 02 | CD | 87 | 03 | CD | 35 | 04 | CD | BD | 03 | C3 | 26 | 05 | DB | E1 | 32 | 0B | 40 | DB | E0 |
| 32 | 0A | 40 | CB | 07 | E6 | 03 | 32 | 00 | 40 | 3A | 0A | 40 | 1F | 1F | 1F | E6 | 03 |
| 32 | BF | 40 | 3A | 0B | 40 | CB | 4F | 20 | 04 | 3E | 02 | 18 | 02 | 3E | 08 | 32 | 0E | 40 | 3A | 0A |
| 40 | 21 | 09 | 00 | 01 | 34 | 00 | CB | 4F | 28 | 06 | 21 | 34 | 00 | 01 | 08 | 02 | 22 | 5D | 45 | ED |
| 43 | 5F | 45 | ED | 43 | 55 | 45 | ED | 43 | 57 | 45 | 3E | 00 | 32 | 59 | 45 | 32 | 5B | 45 | 3E | 0A |
| 32 | 09 | 40 | C9 | 16 | 00 | 21 | 00 | 40 | 01 | FC | 07 | 72 | 23 | 0B | 78 | B1 | 20 | F9 | 3E | 04 |
| 32 | 06 | 40 | 3E | 14 | 32 | 66 | 45 | D3 | D8 | 01 | 32 | 00 | 21 | 21 | 40 | CD | FE | 04 | 21 | 23 |
| 40 | 22 | 21 | 40 | 01 | 26 | 00 | 21 | 53 | 40 | CD | FE | 04 | 21 | 55 | 40 | 22 | 53 | 40 | 01 | 32 |
| 00 | 21 | 79 | 40 | CD | FE | 04 | 3E | 42 | 32 | 81 | 40 | 32 | 8B | 40 | 32 | 95 | 40 | 32 | 9F | 40 |
| 32 | A9 | 40 | 3E | 00 | 32 | 82 | 40 | 32 | 8C | 40 | 32 | 96 | 40 | 32 | A0 | 40 | 32 | AA | 40 | 01 |
| 12 | 00 | 21 | AB | 40 | CD | FE | 04 | 21 | 00 | 00 | 22 | BD | 40 | 3E | 01 | 32 | C0 | 40 | 32 | C5 |
| 40 | 3E | 00 | 32 | C6 | 40 | 3E | 02 | 32 | C7 | 40 | 21 | 79 | 40 | 22 | C3 | 40 | 3E | FF | 0E | 0F |
| 06 | 80 | 21 | C9 | 40 | 11 | 04 | 00 | 71 | 23 | 77 | 19 | 10 | FA | D3 | D8 | 01 | BC | 00 | 21 | 49 |
| 43 | CD | FE | 04 | 21 | 4D | 43 | 22 | 4B | 43 | 21 | 00 | 00 | 22 | 49 | 43 | 21 | 05 | 44 | 22 | 43 |
| 44 | 21 | 24 | 44 | 22 | 45 | 44 | 01 | B7 | 00 | 21 | 94 | 44 | 3E | 05 | 77 | 23 | 0B | 79 | B0 | C2 |
| 6E | 02 | 21 | 96 | 44 | 22 | 94 | 44 | 3E | FA | 32 | 4F | 45 | 3E | 01 | 32 | 4E | 45 | 21 | 01 | 01 |
| 22 | 2C | 45 | 22 | 2E | 45 | 3E | 05 | 2F | 32 | 30 | 45 | 21 | 31 | 45 | 06 | 19 | AF | 57 | 15 | 72 |
| 82 | 23 | 10 | FA | 2F | 77 | DB | FE | E6 | 10 | 0F | 32 | 4B | 45 | D3 | D8 | 3E | 01 | 32 | 18 | 40 |
| 3E | 14 | 32 | 17 | 40 | 21 | 0F | 40 | 22 | 1B | 40 | 21 | 43 | 1D | 22 | 1D | 40 | 21 | 4A | 44 | 22 |
| 48 | 44 | 01 | 36 | 00 | CD | FE | 04 | C9 | D3 | D8 | 3E | 00 | 2F | D3 | 88 | 3E | 18 | 32 | 07 | 40 |
| 2F | D3 | 88 | 3E | 00 | 2F | D3 | 8B | CD | 05 | 14 | 3E | BC | 2F | D3 | 8A | 3E | BF | 2F | D3 | 89 |
| 06 | 2E | CD | 13 | 03 | CD | 05 | 14 | 3E | BF | 2F | D3 | 8A | 3E | 7F | ED | 3E | 89 | 06 | 2F | CD |
| 13 | 03 | 21 | 02 | 40 | CB | E6 | C3 | 24 | 03 | D3 | D8 | C5 | CD | 05 | 14 | C1 | 78 | 2F | D3 | 8B |
| 05 | 05 | F2 | 13 | 03 | C9 | 3E | FE | 2F | D3 | 80 | CD | 05 | 14 | 3E | BC | 2F | D3 | 8A | 3E | C0 |
| 2F | D3 | 89 | 3E | 00 | 2F | D3 | 8B | 3E | 01 | 32 | 08 | 40 | 2F | D3 | 80 | D3 | 80 | D3 | D8 | 3E |
| 00 | 2F | D3 | 9E | 3E | 04 | 2F | D3 | 91 | 3E | 00 | 2F | D3 | 92 | 3E | 31 | D3 | C8 | 3E | 35 | 32 |
| 0D | 40 | D3 | C8 | DB | C0 | CB | 47 | 28 | 18 | 21 | 4A | 44 | 06 | 0F | 0E | C0 | ED | B3 | DB | C0 |
| CB | 47 | 28 | 0E | 7E | ED | 79 | DB | C0 | CB | 47 | 28 | 05 | 21 | 11 | 40 | CB | F6 | DB | E8 | C9 |
| ED | 5E | 3E | 00 | ED | 47 | 3E | 40 | 0E | D0 | ED | 79 | 3E | C7 | ED | 79 | 3E | 01 | ED | 79 | 0E |
| D1 | 3E | A7 | ED | 79 | 3E | 4E | ED | 79 | 0E | D2 | 3E | A7 | ED | 79 | 3E | C3 | ED | 79 | 0E | D3 |
| 3E | C7 | ED | 79 | 3E | 01 | ED | 79 | FB | D3 | D8 | C9 | 21 | 12 | 40 | CB | C6 | DB | F8 | CB | 67 |
| 28 | 08 | CD | 57 | 07 | CB | CE | C3 | DD | 03 | 3A | 0A | 40 | CB | 47 | CA | DD | 03 | CB | D6 | CD |
| 5B | 07 | 3A | 67 | 45 | CB | 5F | CA | 19 | 04 | 06 | 05 | CD | 42 | 1F | 21 | 12 | 40 | CB | C6 | CD |
| 57 | 07 | CD | 57 | 07 | CD | 57 | 07 | 21 | 80 | 44 | CB | 46 | C2 | 19 | 04 | CB | 4E | C2 | 12 | 04 |
| 21 | 02 | 00 | 06 | 02 | 0E | 00 | CD | 09 | 05 | C3 | 0F | 04 | 21 | 02 | 40 | CB | FE | 18 | 11 | F3 |
| 3E | 04 | 32 | 0D | 40 | D3 | C8 | CD | EE | 04 | 21 | 12 | 40 | CB | 86 | FB | 3E | 03 | 2F | D3 | 9E |
| 21 | 01 | 40 | CB | C6 | C9 | 21 | 15 | 40 | CB | FE | 16 | 02 | 3A | 08 | 40 | CB | D7 | 2F | D3 | 80 |
| 2F | CB | 97 | 2F | D3 | 80 | D3 | 80 | DB | 80 | 2F | CB | 4F | 28 | 05 | 0E | 01 | C3 | E1 | 04 | 21 |
| 2C | 45 | 06 | 20 | 0E | 82 | ED | B3 | DB | 80 | 2F | CB | 4F | 28 | 08 | 15 | 20 | D1 | 0E | 02 | C3 |
| E1 | 04 | CD | 05 | 14 | 3E | BD | 2F | D3 | 8A | 3E | 40 | F6 | 2F | D3 | 89 | 3E | 2E | 2F | D3 |
| 8B | CD | 5B | 07 | 21 | 01 | 40 | CB | D6 | CD | 05 | 14 | 3E | BE | 2F | D3 | 8A | 3E | C0 | F6 | 2F |
| 2F | D3 | 89 | 3E | 2F | 2F | D3 | 8B | 01 | 00 | 01 | 3A | 15 | 40 | CB | 7F | 28 | 0A | 0B | 78 | B1 |
| 20 | F4 | 0E | 0E | C3 | E1 | 04 | 21 | 01 | 40 | CB | 96 | DC | 05 | 14 | 3E | BD | D3 | D3 | 8A | 3E |
| C0 | F6 | 2E | 2F | D3 | 89 | 3E | 2E | 2F | D3 | 8B | 3A | 0F | 40 | CB | 57 | 20 | 01 | C9 | F3 | 21 |
| 02 | 00 | 01 | 00 | 05 | CD | 09 | 05 | 18 | F4 | F3 | 21 | 02 | 00 | 06 | 03 | CD | 09 | 05 | C3 | E1 |
| 04 | C9 | D3 | D8 | 0E | 7F | 3E | 00 | 2F | ED | 79 | 0D | F2 | F5 | 04 | D3 | D8 | C9 | 3E | FF | 77 |
| 23 | 0B | A0 | B1 | C2 | FE | 04 | C9 | 3A | 40 | D3 | C8 | F7 | D3 | C8 | 7C | 2F | D3 | 9A | 7D | 2F |
| D3 | 9B | 78 | 2F | D3 | 9C | 79 | 2F | D3 | 9D | 3A | 0D | 40 | D3 | C8 | C9 | CD | 57 | 07 | 21 | 02 |
| 40 | CB | DE | CD | 04 | 07 | CD | 62 | 06 | CD | D7 | 06 | CD | 4B | 05 | CD | 7B | 0F | CD | 1A | 0F |
| CD | 19 | 1D | CD | B0 | 1D | CD | 24 | 07 | 18 | E3 | 3A | 03 | 40 | CD | 30 | 0B | DB | 99 | CB | 7F |
| C8 | FD | CB | 00 | 46 | CA | 49 | 06 | FD | CB | 01 | 6E | 20 | 49 | 06 | FD | CB | 04 | 7E | C2 | 49 |
| 06 | 21 | 15 | 40 | CB | 9E | 21 | 14 | 40 | CB | 86 | FD | CB | 04 | EE | F3 | CD | 05 | 14 | 3A | 13 |
| 40 | CB | 57 | C2 | A0 | 05 | 3A | 03 | 40 | 2F | D3 | 8A | 3E | 00 | 2F | D3 | 89 | 3E | 03 | 2F | D3 |
| 8B | CD | 05 | 14 | 3A | 13 | 40 | CB | 57 | CA | A4 | 05 | FB | C3 | 40 | 06 | 3E | FF | 2F | D3 | 8A |
| 3E | 00 | 2F | D3 | 89 | 3E | 01 | 2F | D3 | 8B | 3A | 03 | 40 | 2F | 4F | 3E | 02 | 2F | ED | 79 | 3E |
| 03 | 2F | D3 | 9F | CD | 57 | 07 | DB | 99 | 2F | CB | 47 | CA | E6 | 05 | FD | CB | 04 | 76 | CA | 40 |
| 06 | 06 | 10 | 3E | 08 | CD | 44 | 14 | FD | CB | 04 | B6 | 21 | 19 | 40 | 35 | C3 | 40 | 06 | 3E | 01 |
| 2F | D3 | 9F | CD | 5B | 07 | DB | 99 | 2F | CB | 47 | C2 | FE | 05 | 21 | 14 | 40 | CB | C6 | C3 | 40 |
| 06 | 3E | 43 | 2F | D3 | 8B | CD | 5B | 07 | DB | 99 | 2F | CB | 47 | C2 | 16 | 06 | 21 | 15 | 40 | CB |
| DE | C3 | 40 | 06 | FD | CB | 00 | 46 | CA | 40 | 06 | CB | 01 | 6E | C2 | 40 | 06 | FD | CB | 04 |
| 7E | C2 | 49 | 06 | FD | CB | 04 | 76 | 20 | 0F | 06 | 20 | 3E | 08 | CD | 44 | 14 | FD | CB | 04 | F6 |
| 21 | 19 | 40 | 34 | 3A | 03 | 40 | 4F | 3E | 00 | 2F | ED | 79 | FD | CB | 04 | AE | 3E | 00 | 32 | 04 |
| 40 | 3A | 03 | 40 | 3C | 32 | 03 | 40 | FE | 80 | C0 | 3E | 00 | 32 | 03 | 40 | C9 | 21 | 02 | 40 | CB |

APPENDIX I-continued

RT Controller

| | | | | | | | | | | | | | | | |
|---|---|---|---|---|---|---|---|---|---|---|---|---|---|---|---|
| 6E | C8 | CB | AE | F3 | 3E | 80 | 21 | C8 | 40 | 36 | 00 | 23 | 36 | 0F | 23 | 36 | FF | 23 | 36 | 00 |
| 23 | 36 | 00 | 23 | 3D | C2 | 70 | 06 | FB | F3 | 01 | BC | 00 | 21 | 49 | 43 | CD | FE | 04 | 21 | 4D |
| 43 | 22 | 4B | 43 | 21 | 00 | 00 | 22 | 49 | 43 | FB | 21 | 01 | 40 | CB | FE | 21 | 13 | 40 | CB | BE |
| 21 | 01 | 40 | CB | A6 | 21 | 0F | 40 | 16 | 00 | 3E | 08 | CD | 9C | 1D | 21 | 10 | 40 | 16 | 01 | 3E |
| 08 | CD | 9C | 1D | 21 | 11 | 40 | 16 | 02 | 3E | 08 | CD | 9C | 1D | 06 | 06 | 3A | 01 | 40 | 4F | CD |
| 42 | 1F | 3E | FA | 32 | 09 | 40 | C9 | 3A | 0D | 40 | CB | 47 | 28 | 0A | 3A | 67 | 45 | CB | 5F | 20 |
| 03 | C3 | 80 | 00 | 21 | 05 | 40 | CB | 46 | C2 | 80 | 00 | 21 | 80 | 44 | CB | 46 | 28 | 0C | 3A | 0D |
| 40 | CB | 87 | D3 | C8 | 32 | 0D | 40 | CB | 86 | C9 | 3A | 80 | 44 | CB | 4F | C8 | E5 | 3A | 1A | 40 |
| A7 | 20 | 11 | 3E | 14 | 32 | 1A | 40 | 21 | 13 | 40 | CB | 7E | 20 | 05 | 06 | 02 | CD | 42 | 1F | E1 |
| C9 | 3A | 01 | 40 | CB | 6F | C0 | 21 | 13 | 40 | CB | 5E | 28 | 0B | 3A | 0A | 40 | E6 | 09 | FE | 08 |
| C0 | CB | 66 | C0 | 3A | 07 | 40 | CB | EF | 32 | 07 | 40 | 2F | D3 | 88 | 21 | 01 | 40 | CB | EE | 3E |
| 00 | 32 | 69 | 45 | 21 | 13 | 40 | CB | AE | C9 | 3E | 29 | 18 | 06 | 3E | 06 | 18 | 02 | 3E | 02 | 32 |
| 6B | 45 | 3A | 6B | 45 | A7 | 20 | FA | C9 | DD | 21 | C8 | 40 | CB | 46 | A7 | 21 | 00 | 46 | A7 | ED | 72 |
| FA | 80 | 07 | 21 | 47 | 44 | CB | CF | C9 | 21 | 47 | 44 | CB | 8E | 3A | 47 | 44 | A7 | C0 | DD | 35 |
| 03 | 20 | 04 | DD | CB | 00 | F6 | DD | CB | 00 | 6E | CA | B7 | 07 | DD | CB | 00 | 76 | CA | E3 | 0A |
| DD | CB | 04 | 5E | 20 | 10 | 3E | 00 | 2F | ED | 79 | DD | CB | 01 | B6 | DD | CB | 04 | DE | C3 | E3 |
| 0A | C3 | 10 | 08 | DD | CB | 01 | 66 | CA | 10 | 08 | DD | CB | 04 | 46 | C2 | E9 | 07 | DD | CB | 00 |
| 76 | CA | E3 | 0A | DD | 7E | 04 | E6 | 03 | CA | 09 | 08 | 3D | DD | B6 | 04 | DD | 77 | 04 | DD | CB |
| 04 | C6 | 3E | 00 | ED | 79 | C3 | E3 | 0A | DD | CB | 04 | 9E | DD | CB | 00 | B6 | 3E | 02 | DD | 77 |
| 03 | DD | CB | 01 | 76 | CA | 01 | 08 | 3E | 07 | 18 | 02 | 3E | 06 | 2F | ED | 79 | C3 | E3 | 0A | DD |
| CB | 01 | A6 | C3 | 0A | DD | CB | 00 | 56 | CA | 22 | 08 | 79 | CD | 1B | 0D | FD | CB | 07 | 6E |
| C2 | E3 | 0A | ED | 78 | 2F | E6 | 0F | 5F | DD | 7E | 02 | CB | 2F | CB | 2F | CB | 2F | CB | 2F | E6 |
| 0F | 57 | 32 | 48 | 43 | DD | 7E | 02 | E6 | 0F | BA | CA | 7A | 08 | 7B | BA | C2 | 53 | 08 | DD | 7E |
| 02 | E6 | F0 | B3 | DD | 77 | 02 | C3 | 7A | 08 | 53 | DD | CB | 00 | AE | DD | CB | 01 | BE | DD | CB |
| 04 | 9E | 3E | 00 | 2F | ED | 79 | DD | CB | 00 | A6 | 3A | 48 | 43 | E6 | 0F | FE | 0F | CC | A3 | 0A |
| FD | 21 | 10 | 0B | C3 | 7E | 08 | FD | 21 | F0 | 0A | DD | 7E | 02 | CB | 27 | CB | 27 | CB |
| 27 | B3 | DD | 77 | 02 | C5 | 4A | 06 | 00 | CB | 21 | CB | 10 | FD | 09 | FD | 66 | 00 | FD | 6E | 01 |
| C1 | E9 | DD | CB | 00 | 6E | C2 | B7 | 08 | DD | CB | 00 | 66 | CA | E5 | 08 | DD | CB | 00 | 76 | C2 |
| C9 | 08 | C5 | E3 | 0A | DD | CB | 01 | 7E | C2 | C5 | 08 | DD | CB | 01 | FE | C3 | E3 | 0A | DD | CB |
| 04 | 9E | 3E | 01 | 2F | ED | 79 | DD | 36 | 03 | 0A | DD | CB | 00 | EE | DD | CB | 00 | A6 | DD | CB |
| 00 | B6 | DD | CB | 01 | BE | C3 | E3 | 0A | DD | 7E | 00 | E6 | 48 | FE | 40 | C2 | E3 | 0A | DD | CB |
| 00 | 4E | C2 | 0C | 09 | DD | CB | 00 | E6 | 3E | 03 | 2F | ED | 79 | DD | 36 | 03 | FA | DD | CB | 00 |
| B6 | 3E | 07 | CD | 3E | 14 | 79 | CD | 1B | 0D | FE | 00 | 28 | 07 | CD | C2 | 0C | DD | CB | 00 | 96 |
| C3 | E3 | 0A | DD | CB | 00 | 7E | CA | 61 | 09 | DD | CB | 00 | 76 | CA | 61 | 09 | 79 | CD | 1B | 0D |
| FE | 00 | CA | 4C | 09 | 3A | 02 | 40 | CB | 77 | 28 | 09 | 3A | 0E | 40 | DD | 77 | 03 | C3 | 61 | 09 |
| CD | C2 | 0C | DD | CB | 00 | 96 | 3E | 01 | CD | 3E | 14 | DD | 36 | 00 | 01 | DD | 36 | 04 | 10 | DD |
| 7E | 01 | E6 | 0F | DD | 77 | 01 | C3 | E3 | 0A | 3E | 0C | 47 | 3E | 03 | CD | 3E | 14 | DD | CB | 01 |
| F6 | C3 | D7 | 0A | 3E | 0A | 47 | 3E | 03 | CD | 3E | 14 | C3 | D7 | 0A | DD | C8 | 01 | EE | DD | CB |
| 00 | 7E | CA | EB | 09 | 79 | CD | 1B | 0D | FE | 00 | CA | 9A | 09 | 3A | 02 | 40 | CB | 77 | C2 | E3 |
| 0A | 3A | 0B | 40 | CB | 4F | CA | E3 | 0A | 3A | 09 | 40 | DD | 77 | 03 | DD | CB | 00 | BE | DD | CB |
| 00 | B6 | DD | CB | 00 | 66 | CA | BF | 09 | 3E | 03 | 2F | ED | 79 | C3 | E3 | 0A | 3E | 09 | CD | 3E |
| 14 | 79 | CD | 1B | 0D | A7 | C2 | DA | 09 | CD | 44 | 0B | A7 | 20 | 08 | DD | CB | 00 | D6 | FD | CB |
| 07 | F6 | DD | CB | 01 | CE | 3A | 09 | 40 | DD | 77 | 03 | DD | CB | 00 | B6 | C3 | E3 | 0A | DD | CB |
| 01 | EE | F3 | 2A | 53 | 40 | 71 | 23 | 22 | 53 | 40 | FB | DD | 7E | 02 | E6 | 0F | 2F | 47 | 3E | 00 |
| CD | 3E | 14 | 3A | 09 | 40 | DD | 77 | 03 | DD | CB | 00 | B6 | 79 | CD | 1B | 0D | A7 | 20 | 0B | CD |
| 44 | 0B | A7 | C2 | 2D | 0A | DD | CB | 00 | D6 | 3A | 48 | 43 | FE | 0F | C2 | D7 | 0A | FD | CB | 07 |
| F6 | DD | CB | 00 | CE | C3 | D7 | 0A | DD | CB | 01 | EE | DD | 7E | 01 | E6 | 0F | FE | 0A | CA | 47 |
| 0A | FE | 0B | C2 | D7 | 0A | 2F | 47 | 3E | 03 | CD | 3E | 14 | C3 | 7E | 09 | DD | CB | 00 | FE | 3A |
| 0E | 40 | DD | 77 | 03 | DD | CB | 00 | B6 | C3 | D7 | 0A | 3E | 01 | 47 | 3E | 06 | CD | 3E | 14 | 79 |
| CD | 1B | 0D | A7 | 28 | 07 | CD | C2 | 0C | DD | CB | 00 | 96 | DD | CB | 00 | 5E | 28 | 08 | 2A | 53 |
| 40 | 71 | 23 | 22 | 53 | 40 | DD | CB | 04 | 76 | 28 | 04 | 21 | 19 | 40 | 35 | DD | 36 | 00 | 00 | DD |
| 36 | 01 | 0F | DD | 36 | 02 | FF | DD | 36 | 04 | 10 | C3 | D7 | 0A | DD | 7E | 04 | CB | 4F | 20 | 15 |
| 3E | 06 | 47 | 3E | 06 | CD | 3E | 14 | D1 | 3E | FF | DD | 77 | 02 | DD | CB | 04 | CE | C3 | E3 | 0A |
| 3E | 00 | DD | 77 | 00 | DD | CB | 00 | C6 | DD | 36 | 01 | 0F | DD | 77 | 02 | DD | 77 | 03 | DD | 36 |
| 04 | 10 | C9 | DD | 7E | 01 | E6 | F0 | 21 | 48 | 43 | B6 | DD | 77 | 01 | 11 | 05 | 00 | DD | 19 | 0C |
| 79 | FE | 80 | C2 | 71 | 07 | C9 | 09 | 1E | 0A | E3 | 0A | E3 | 0A | E3 | 0A | E3 | 0A | E3 | 0A | E3 |
| 0A | E3 | 08 | 9F | 08 | 9F | 08 | 9F | 08 | 9F | 08 | 9F | 0A | E3 | 0A | E3 | 0A | E3 | 0A | 51 | 0A |
| E3 | 0A | E3 | 0A | E3 | 0A | E3 | 0A | E3 | 0A | E3 | 09 | 7E | 09 | 7E | 09 | 7E | 09 | 7E |
| 09 | 7E | 0A | E3 | 0A | E3 | 0A | 62 | D5 | 5F | 16 | 00 | FD | 21 | CB | 40 | FD | 19 | CB | 23 | CB |
| 23 | CB | 12 | FD | 19 | D1 | C9 | C5 | 21 | 4D | 43 | 06 | 0A | 7E | FE | FF | CA | 5A | 0B | 05 | CA |
| A6 | 0B | 11 | 08 | 00 | 19 | 18 | F0 | C1 | E5 | FD | E1 | FD | 71 | 00 | FD | 36 | 01 | FF | FD | 36 |
| 02 | 00 | FD | 36 | 03 | 00 | FD | 36 | 04 | FF | FD | 36 | 05 | 00 | FD | 36 | 06 | 00 | FD | 36 | 07 |
| 00 | 2A | 49 | 43 | 7C | B5 | 20 | 0B | FD | 22 | 4B | 43 | FD | 22 | 49 | 43 | C3 | AA | 0B | DD | E5 |
| DD | 2A | 4B | 43 | FD | E5 | E1 | 75 | 05 | DD | 74 | 06 | DD | E1 | FD | 2B | 43 | 18 | 04 |
| C1 | 3E | FF | C9 | 3E | 00 | C9 | C5 | 47 | F6 | 01 | 78 | C1 | C9 | 3A | 47 | 44 | CB | 4F | C0 | 2A |
| 49 | 43 | 7C | B5 | CA | C1 | 0C | DD | 2A | 49 | 43 | DD | 4E | 00 | ED | 78 | 2F | 57 | DD | CB | 01 |
| 26 | CB | 5A | CA | DA | 0B | DD | CB | 01 | C6 | DD | 35 | 03 | DD | CB | 07 | 76 | C2 | 21 | 0C | DD |
| 7E | 04 | FE | CA | 21 | 0C | 2F | D3 | 98 | DB | 99 | 2F | 57 | DD | 7E | 07 | CB | 27 | CB | 27 | CB |
| 4A | CA | FF | 0B | CB | C7 | E6 | 1F | FE | 1F | C2 | 17 | 0C | DD | 7E | 00 | CD | 30 | 0B | FD | CB | 00 |
| CE | DD | CB | 07 | F6 | C3 | 21 | 0C | 57 | DD | 7E | 07 | E6 | E0 | B2 | DD | 77 | 07 | DD | 7E | 01 |
| E6 | 07 | FE | 03 | CA | 6D | 0C | FA | 98 | 0C | FE | 04 | CA | 8C | 0C | DD | 7E | 07 | 6E | CA | A9 |
| 0C | DD | 7E | 03 | FE | 00 | C2 | A9 | 0C | DD | 7E | 02 | 47 | DD | 7E | 00 | CD | 4F | 3E | CD | 44 |
| 14 | DD | CB | 07 | AE | 3E | 00 | DD | 77 | 02 | DD | 7E | 00 | CD | 30 | 0B | FD | CB | 00 | CE | DD |
| CB | 07 | F6 | 3E | FA | FD | 77 | 03 | 18 | 3C | DD | CB | 07 | 6E | CA | A9 | 0C | DD | 7E | 03 | FE |
| 04 | F2 | 84 | 0C | FE | 00 | FA | 84 | 0C | DD | 34 | 02 | 3E | 0A | DD | 77 | 03 | C3 | A9 | 0C | 3E | 00 |
| 08 | DD | 77 | 03 | DD | CB | 07 | EE | C3 | A9 | 0C | DD | 7E | 07 | F2 | A9 | 0C | 3E | 00 |
| DD | 77 | 02 | DD | CB | 07 | AE | DD | 6E | 05 | DD | 66 | 06 | 11 | 00 | 00 | A7 | ED | 52 | DD | 6E |
| 05 | DD | 66 | 06 | E5 | DD | E1 | C2 | C6 | 0B | C9 | 3E | FF | FD | 77 | 00 | FD | 36 | 04 | FF | E5 |
| FD | E5 | E1 | ED | 5B | 49 | 43 | A7 | ED | 52 | E1 | CA | 0A | 0D | DD | E5 | E1 | FD | 7E | 05 | DD | 77 | 05 |
| 43 | A7 | ED | 52 | E1 | CA | 0A | 0D | DD | E5 | E5 | DD | E1 | FD | 7E | 05 | DD | 77 | 05 | FD | 7E |
| 06 | DD | 77 | 06 | DD | E1 | C9 | FD | 7E | 05 | 32 | 49 | 43 | FD | 7E | 06 | 32 | 4A | 43 | C9 | 3E |

APPENDIX I-continued

RT Controller

| | | | | | | | | | | | | | | | | | | |
|---|---|---|---|---|---|---|---|---|---|---|---|---|---|---|---|---|---|---|
| ØØ | E5 | FD | E3 | FD | 77 | Ø5 | FD | 77 | Ø6 | 33 | 33 | 22 | 4B | 43 | C9 | 2A | 49 | 43 | FD | 21 |
| ØØ | ØØ | 11 | ØØ | ØØ | A7 | ED | 52 | CA | 44 | ØD | FD | E5 | E5 | FD | E1 | FD | BE | ØØ | CA | 4Ø |
| ØD | E1 | FD | 6E | Ø5 | FD | 66 | Ø6 | C3 | 22 | ØD | E1 | 3E | FF | C9 | 3E | ØØ | C9 | 42 | 43 | Ø1 |
| Ø2 | F5 | C5 | D5 | DD | E5 | FD | E5 | C5 | D3 | D8 | D8 | E8 | 32 | 67 | 45 | CD | 84 | Ø8 | CD | DA |
| ØD | CD | A4 | ØE | 3A | 6B | 45 | A7 | CA | 6E | ØD | 3D | 32 | 6B | 45 | E1 | FD | E1 | DD | E1 | D1 |
| C1 | F1 | FB | ED | 4D | F5 | C5 | D5 | DD | E5 | FD | E5 | E5 | 21 | Ø6 | 4Ø | 35 | C2 | CF | ØD | FB |
| 36 | Ø4 | DB | F8 | 32 | 68 | 45 | CD | E1 | 14 | CD | 1Ø | 18 | CD | 54 | 19 | CD | E6 | ØF | CD | 5A |
| 1F | 3E | ØØ | 32 | ØC | 4Ø | 3A | 1A | 4Ø | A7 | CA | AF | ØD | 3D | 32 | 1A | 4Ø | 21 | Ø1 | 4Ø | CB |
| 46 | CA | CF | ØD | CD | 35 | 1D | CD | 12 | 1Ø | CD | 6B | Ø7 | CD | C5 | ØE | CD | Ø4 | ØF | E1 | FD |
| E1 | DD | E1 | D1 | C1 | F1 | C9 | E1 | FD | E1 | DD | E1 | D1 | C1 | F1 | FB | ED | 4D | 2A | 59 | 45 |
| 22 | 61 | 45 | 2A | 55 | 45 | 22 | 63 | 45 | 3A | 67 | 45 | CD | 6Ø | ØE | FE | Ø2 | 28 | ØB | 21 | 13 |
| 4Ø | CB | 9E | FE | ØØ | 28 | Ø2 | CB | DE | 2A | 61 | 45 | 22 | 59 | 45 | 2A | 63 | 45 | 22 | 55 | 45 |
| 3A | 68 | 45 | CB | 5F | CA | 2Ø | ØE | 3A | ØD | 4Ø | CB | DF | 32 | ØD | 4Ø | D3 | C8 | 21 | 13 | 4Ø |
| CB | DE | 18 | ØA | 3A | ØD | 4Ø | CB | 9F | 32 | ØD | 4Ø | D3 | C8 | 3A | ØA | 4Ø | CB | 5F | C8 | 2A |
| 5B | 45 | 22 | 61 | 45 | 2A | 57 | 45 | 22 | 63 | 45 | 3A | 67 | 45 | CB | 3F | CD | 6Ø | ØE | FE | Ø2 |
| 28 | ØB | 21 | 13 | 4Ø | CB | A6 | FE | ØØ | 28 | Ø2 | CB | E6 | 2A | 61 | 45 | 22 | 5B | 45 | 2A | 63 |
| 45 | 22 | 57 | 45 | C9 | CB | 47 | 28 | Ø7 | 2A | 61 | 45 | 23 | 22 | 61 | 45 | 2A | 63 | 45 | 2B | 22 |
| 63 | 45 | 7C | B5 | C2 | A1 | ØE | 2A | 61 | 45 | Ø1 | Ø9 | ØØ | A7 | ED | 42 | F2 | 92 | ØE | 2A | 5D |
| 45 | 22 | 63 | 45 | 21 | ØØ | ØØ | 22 | 61 | 45 | 3E | ØØ | C9 | 2A | 5F | 45 | 22 | 63 | 45 | 21 | ØØ |
| ØØ | 22 | 61 | 45 | 3E | Ø1 | C9 | 3E | Ø2 | C9 | 3A | Ø3 | 4Ø | 4F | ED | 78 | 2F | E6 | ØF | FE | Ø8 |
| CØ | F3 | CD | Ø5 | 14 | 3E | 7F | 2F | D3 | 89 | 3E | BF | 2F | D3 | 8A | 3E | Ø3 | 2F | D3 | 8B | FB |
| C9 | 3A | ØC | 4Ø | A7 | CØ | 3C | 32 | ØC | 4Ø | DB | 88 | 2F | CB | 4F | CA | F1 | ØE | 3A | Ø7 | 4Ø |
| 2F | D3 | 88 | 3A | 69 | 45 | A7 | C2 | EA | ØE | 3E | Ø5 | 32 | 69 | 45 | 18 | 19 | 21 | 13 | 4Ø | CB |
| EE | 18 | F2 | 3A | 69 | 45 | A7 | CA | FE | ØE | 3D | 32 | 69 | 45 | 18 | 19 | 21 | 13 | 4Ø | CB | AE |
| C9 | 21 | 13 | 4Ø | CB | B6 | DB | 88 | 2F | CB | 57 | CA | 13 | ØF | CB | F6 | 3A | Ø7 | 4Ø | 2F | D3 |
| 88 | C9 | 3A | 67 | 45 | CB | 57 | CA | 2D | ØF | 21 | 14 | 4Ø | CB | FE | 21 | Ø1 | 4Ø | CB | F6 | C9 |
| 21 | 14 | 4Ø | CB | 8E | 3A | ØA | 4Ø | CB | 47 | CA | 44 | ØF | 3A | 67 | 45 | CB | 5F | C2 | 44 | ØF |
| CB | CE | 3A | ØA | 4Ø | CB | 47 | 28 | 15 | 21 | 1F | 4Ø | CB | 26 | DB | 8Ø | 2F | CB | 5F | CA | 6Ø |
| ØF | CB | C6 | 3A | Ø8 | 4Ø | 2F | D3 | 8Ø | 7E | E6 | Ø7 | FE | Ø7 | 21 | 14 | 4Ø | C2 | 73 | ØF | CB |
| D6 | 21 | Ø1 | 4Ø | CB | DE | C9 | CB | 96 | 21 | Ø1 | 4Ø | CB | 9E | C9 | 3A | ØB | 4Ø | CB | 47 | CA |
| A6 | ØF | 21 | 14 | 4Ø | CB | AE | 21 | 2Ø | 4Ø | CB | 26 | DB | 9Ø | 2F | CB | 57 | 28 | Ø2 | CB | C6 |
| 7E | E6 | Ø7 | FE | Ø7 | C2 | A6 | ØF | 21 | 14 | 4Ø | CB | EE | CD | 8C | 1D | 21 | 15 | 4Ø | CB | 86 |
| 3A | 68 | 45 | CB | 47 | CA | B5 | ØF | CB | C6 | CB | 8E | 3A | 68 | 45 | CB | 4F | CA | C1 | ØF | CB |
| CE | 3A | ØA | 4Ø | CB | 57 | 2Ø | ØE | 21 | 15 | 4Ø | 7E | E6 | Ø3 | FE | Ø3 | 28 | Ø4 | CB | 8E | CB |
| 86 | 21 | 14 | 4Ø | CB | B6 | 3A | 68 | 45 | CB | 57 | CA | E5 | ØF | CB | F6 | C9 | 21 | 4E | 45 | 35 |
| C2 | F7 | ØF | 3E | Ø1 | 77 | 21 | 13 | 4Ø | CB | FE | 18 | Ø5 | 21 | 13 | 4Ø | CB | BE | 21 | 4F | 45 |
| 35 | C2 | ØC | 1Ø | 3E | Ø1 | 77 | 21 | Ø1 | 4Ø | CB | E6 | C9 | 21 | Ø1 | 4Ø | CB | A6 | C9 | 3A | Ø1 |
| 4Ø | CB | 67 | 2Ø | 2F | 3A | Ø2 | 4Ø | CB | 5F | C8 | 3A | 13 | 4Ø | 21 | Ø1 | 4Ø | CB | 77 | 2Ø | 18 |
| CB | 6F | 2Ø | 14 | CB | 4E | 28 | Ø1 | 1F | CB | 5F | 2Ø | ØB | CB | B6 | 3E | ØØ | 32 | 66 | 45 | 32 |
| 54 | 45 | C9 | 3A | Ø2 | 4Ø | CB | 4F | 28 | 11 | CB | 9F | 1Ø | A7 | 2Ø | 4B | 3A | 54 | 45 | FE | Ø2 |
| CA | 99 | 1Ø | C3 | 6Ø | 1Ø | CB | B6 | CD | 9F | 1Ø | A7 | CØ | 3A | 66 | 45 | A7 | 28 | Ø5 | 3D | 32 |
| 66 | 45 | C9 | 3E | 14 | 32 | 66 | 45 | CB | 4E | 2Ø | Ø9 | CB | CE | 3A | Ø7 | 4Ø | CB | 9F | 18 | Ø7 |
| C8 | 8E | 3A | Ø7 | 4Ø | CB | DF | 32 | Ø7 | 4Ø | 2F | D3 | 88 | D3 | 88 | 3A | 54 | 45 | 3C | 32 | 54 |
| 45 | 21 | ØF | 4Ø | CB | EE | C9 | 3E | Ø1 | 32 | Ø5 | 4Ø | C9 | 3A | ØA | 4Ø | CB | 47 | CØ | CB | 5F |
| 2F | C8 | 3E | ØØ | C9 | 29 | Ø1 | Ø2 | Ø8 | D9 | DD | E5 | FD | E5 | 2A | 45 | 44 | ED | 5B | 43 | 44 |
| ED | 53 | 45 | 44 | 22 | 43 | 44 | 11 | 19 | ØØ | 19 | 22 | 4C | 45 | ØE | 81 | Ø6 | 1F | 2A | 43 | 44 |
| ED | B2 | CD | A6 | 14 | Ø6 | 18 | 2A | 43 | 44 | 7E | 23 | 86 | 1Ø | FC | 2F | E6 | ØF | 23 | 96 | C2 |
| 7B | 12 | 3A | 15 | 4Ø | CB | BF | 32 | 15 | 4Ø | CB | Ø1 | 4Ø | CB | 57 | C2 | 7B | 12 | 3E | ØA | 32 |
| 4E | 45 | 23 | 3A | 4B | 45 | BE | C2 | 7B | 12 | 3E | ØA | 32 | 4F | 45 | 21 | Ø1 | 4Ø | CB | A6 | 21 |
| Ø2 | 4Ø | CB | 66 | CA | 1D | 11 | CD | B7 | 14 | C3 | 7B | 12 | 2A | 43 | 44 | 7E | E6 | ØF | FE | Ø4 |
| CA | 32 | 11 | FE | ØB | CA | 32 | 11 | FE | ØC | C2 | 53 | 11 | E5 | FD | E1 | 3A | ØØ | 4Ø | FD | BE |
| Ø4 | C2 | 7B | 12 | FD | 7E | ØØ | FE | Ø4 | C2 | 86 | 11 | FD | 7E | Ø3 | E6 | ØF | FE | ØØ | CA | 86 |
| 11 | C3 | FE | 11 | 2A | 43 | 44 | CD | F4 | 13 | 7B | CD | 3Ø | ØB | FD | CB | Ø4 | 66 | CA | 7B | 12 |
| 3A | 1E | 44 | 21 | 3D | 44 | 96 | C2 | 86 | 11 | 21 | Ø5 | 44 | Ø1 | 1A | ØØ | 11 | 24 | 44 | 1A | ED |
| A1 | C2 | 86 | 11 | E2 | 83 | 11 | 13 | 1B | F4 | C3 | FE | 11 | 2A | 43 | 44 | 22 | 5Ø | 45 | 4E | CD |
| F4 | 13 | 21 | 84 | 12 | Ø9 | Ø9 | 4B | 42 | 5E | 23 | 56 | EB | E9 | 2A | 5Ø | 45 | Ø1 | Ø5 | ØØ | Ø9 |
| 22 | 5Ø | 45 | EB | 2A | 4C | 45 | A7 | ED | 52 | EB | 2Ø | DC | 21 | 96 | 44 | 11 | 31 | 45 | Ø1 | 19 |
| ØØ | 3E | ØØ | 86 | ED | AØ | E2 | C3 | 11 | 18 | F8 | 2F | E6 | ØF | 32 | 4A | 45 | 11 | 96 | 44 | 21 |
| AF | 44 | 7E | FE | Ø5 | CA | DD | 11 | Ø1 | Ø5 | ØØ | BØ | C3 | CF | 11 | ED | BØ | 21 | 53 | 94 | 3A |
| 47 | 44 | CB | 87 | 32 | 47 | 44 | E5 | E5 | 21 | DC | 14 | Ø1 | Ø5 | ØØ | ED | BØ | E1 | A7 | ED | 52 |
| E1 | C2 | E9 | 11 | C3 | ØC | 12 | 2A | 45 | 44 | E5 | 2A | 43 | 44 | 22 | 45 | 44 | E1 | 22 | 43 | 44 |
| 3A | Ø8 | 4Ø | 2F | D3 | 8Ø | DB | 8Ø | 2F | CB | 4F | CA | 35 | 12 | 3A | Ø8 | 4Ø | CB | D7 | 2F | D3 |
| 8Ø | 2F | CB | 97 | 2F | D3 | 8Ø | D3 | 88 | 21 | 13 | 4Ø | CB | C6 | CD | 83 | 1D | C3 | 7B | 12 | 21 |
| 13 | 4Ø | CB | 86 | CD | Ø5 | 14 | 3E | BF | 2F | D3 | 8A | 3E | 7F | 2F | D3 | 89 | 3E | 2F | 2F | D3 |
| 8B | CD | Ø5 | 14 | 21 | 2C | 45 | Ø6 | 2Ø | ØE | 82 | ED | B3 | DB | 8Ø | 2F | CB | 4F | 2Ø | ØB | 15 |
| 2Ø | D3 | 21 | 13 | 4Ø | CB | CE | CD | 83 | 1D | 3E | BE | 2F | D3 | 8A | 3E | CØ | F6 | 2F | 2F | D3 |
| 89 | 3E | 2F | 2F | D3 | 8B | D9 | FD | E1 | DD | E1 | FB | ED | 4D | A4 | 12 | D9 | 12 | 17 | 13 |
| 35 | 13 | 7D | 13 | 51 | 13 | 71 | 13 | A3 | 13 | B1 | 13 | A6 | 13 | D5 | 13 | E9 | 13 | F1 |
| 13 | 9C | 11 | 9C | 11 | 79 | CD | 3Ø | ØB | FD | CB | Ø4 | FE | FD | CB | ØØ | 56 | 28 | Ø9 | CD | 1B |
| ØD | A7 | 28 | Ø3 | FD | 7Ø | Ø4 | CD | Ø5 | 14 | 79 | 2F | D3 | 8A | CB | 4Ø | C2 | CC | 12 | 3E | CØ |
| C3 | CE | 12 | 3E | 8Ø | BØ | 2F | D3 | 89 | 78 | 2F | D3 | 88 | C3 | 9C | 11 | 2A | 21 | 4Ø | 11 | 51 |
| 4Ø | A7 | ED | 52 | CA | ØC | 13 | 79 | CD | 3Ø | ØB | FD | CB | ØØ | 66 | C2 | ØF | 13 | FD | CB | ØØ |
| 6E | C2 | ØF | 13 | 2A | 21 | 4Ø | 71 | 23 | 7Ø | 23 | 22 | 21 | 4Ø | FD | CB | Ø4 | FE | FD | CB | ØØ |
| DE | C3 | 9C | 11 | C3 | 9C | 11 | 3E | Ø7 | CD | 44 | 14 | C3 | 9C | 11 | 2A | 53 | 4Ø | 11 | 78 | 4Ø |
| A7 | ED | 52 | CA | 32 | 13 | 2A | 53 | 4Ø | 71 | 23 | 22 | 53 | 4Ø | CD | 3Ø | ØB | FD | CB | ØØ | 9E |
| C3 | 9C | 11 | 79 | CD | 3Ø | ØB | FD | CB | Ø4 | BE | CD | Ø5 | 14 | 3E | BF | 2F | D3 | 8A | 3E | 7F |
| 2F | D3 | 89 | 78 | 2F | D3 | 8B | C3 | 9C | 11 | CD | 3Ø | ØB | FD | CB | Ø1 | B6 | 3E | Ø6 | ED | 79 |
| FD | CB | Ø1 | E6 | 3A | Ø2 | ØØ | FD | 77 | Ø3 | FD | 7E | Ø4 | F6 | Ø2 | FD | 77 | Ø4 | C3 | 9C | 11 |
| CD | 3Ø | ØB | FD | CB | Ø1 | F6 | 3E | Ø7 | C3 | 5A | 13 | 3A | Ø2 | 4Ø | CB | 4F | C2 | 9D | 13 | CB |
| CF | 32 | Ø2 | 4Ø | DB | F8 | ØE | ØØ | CB | 67 | 28 | Ø2 | ØE | 1Ø | 3A | ØØ | 4Ø | B1 | 3E | ØB | CD |
| 52 | 14 | C3 | 9C | 11 | C3 | 9C | 11 | C3 | 9C | 11 | 79 | CD | 3Ø | ØB | FD | CB | Ø4 | A6 | C3 | 9C |

APPENDIX I-continued

RT Controller

| | | | | | | | | | | | | | | | | | | | |
|---|---|---|---|---|---|---|---|---|---|---|---|---|---|---|---|---|---|---|---|
| 11 | 3E | 03 | 2F | ED | 79 | FD | CB | 00 | E6 | FD | CB | 00 | B6 | FD | 36 | 03 | FA | FD | CB | 00 |
| 96 | 79 | CD | 1B | 0D | FE | 00 | CA | 9C | 11 | CD | C2 | 0C | C3 | 9C | 11 | C5 | 06 | 04 | CD | 42 |
| 1F | C1 | CB | 40 | CA | 9C | 11 | 21 | 05 | 40 | CB | C6 | C3 | 9C | 11 | 21 | 02 | 40 | CB | EE | C3 |
| 9C | 11 | C3 | 9C | 11 | 06 | 02 | 23 | 56 | 23 | 7E | 07 | 17 | 17 | 17 | B2 | 57 | 05 | C8 | 5F | 18 |
| F1 | C5 | 21 | 13 | 40 | CB | 96 | 06 | 0D | 2E | 02 | DB | 88 | 2F | CB | 47 | CA | 3C | 14 | 10 | F6 |
| 3E | FF | 2F | D3 | 8B | 3E | BD | 2F | D3 | 8A | 3E | C0 | F6 | 2E | 2F | D3 | 89 | 3E | 2E | 2F | D3 |
| 8B | 06 | 0D | 2D | 20 | DB | 21 | 13 | 40 | CB | D6 | CD | 83 | 1D | C1 | C9 | F3 | CD | 44 | 14 | FB |
| C9 | C5 | E5 | 21 | 01 | 40 | CB | 7E | E1 | E5 | CA | A3 | 14 | 18 | 02 | C5 | E5 | 2A | 94 | 44 | 11 |
| 2C | 45 | A7 | ED | 52 | FA | 68 | 14 | 21 | 15 | 40 | CB | EE | C3 | A3 | 14 | 2A | 94 | 44 | 77 | 79 |
| E6 | 0F | 23 | 77 | CB | 39 | CB | 39 | CB | 39 | CB | 39 | 23 | 71 | 78 | E6 | 0F | 23 | 77 | CB | 38 |
| CB | 38 | CB | 38 | CB | 38 | 23 | 70 | 23 | 22 | 94 | 44 | 11 | 13 | 45 | A7 | ED | 52 | FA | 9B | 14 |
| 3E | 01 | 18 | 05 | 3A | 47 | 44 | CB | 87 | 32 | 47 | 44 | E1 | C1 | C9 | 3A | 08 | 40 | CB | EF | 2F |
| D3 | 80 | 3A | 08 | 40 | 2F | D3 | 80 | D3 | 80 | C9 | 21 | 02 | 40 | CB | A6 | CD | 05 | 14 | 3E | BF |
| 2F | D3 | 8A | 3E | 7F | 2F | D3 | 89 | 06 | 2C | CD | 13 | 03 | 3A | 08 | 40 | CB | 87 | 32 | 08 | 40 |
| 2F | D3 | 80 | D3 | 80 | C9 | 05 | 01 | 02 | 03 | 04 | F3 | 2A | 21 | 40 | 11 | 23 | 40 | A7 | ED | 52 |
| CA | B0 | 17 | DD | 21 | 21 | 40 | DD | 23 | DD | 23 | DD | 7E | 01 | FE | FF | CA | B0 | 17 | DD | 7E |
| 00 | CD | 30 | 0B | FD | CB | 01 | 6E | 28 | 07 | FD | CB | 00 | DE | C3 | 9D | 16 | FD | 7E | 01 | CB |
| 6F | C2 | A8 | 16 | DD | 7E | 00 | FD | 21 | 79 | 40 | FD | BE | 00 | CA | 9D | 16 | FD | BE | 02 | CA |
| 9D | 16 | FD | BE | 04 | CA | 9D | 16 | 21 | A1 | 40 | FD | E5 | D1 | A7 | ED | 52 | CA | 46 | 15 | 11 |
| 0A | 00 | FD | 19 | C3 | 20 | 15 | 21 | AB | 40 | DD | 7E | 00 | 01 | 12 | 00 | ED | B1 | CA | 9D | 16 |
| 06 | 01 | FD | 21 | 79 | 40 | 3A | BE | 40 | CB | 4F | 20 | 0B | 3A | BD | 40 | CB | 47 | 20 | 04 | FD |
| 2A | C3 | 40 | FD | 7E | 08 | CB | 4F | CA | 89 | 15 | DD | 7E | 00 | FD | 77 | 00 | DD | 7E | 01 | E6 |
| 0F | FD | 77 | 01 | FD | CB | 08 | 8E | C3 | E7 | 15 | FD | 7E | 01 | FE | FF | 20 | 19 | 3E | 01 | CD |
| B8 | 17 | CA | 1C | 16 | DD | 7E | 01 | E6 | 0F | FD | 77 | 01 | DD | 7E | 00 | FD | 77 | 00 | C3 | E7 |
| 15 | FD | 7E | 03 | FE | FF | 20 | 19 | 3E | 02 | CD | B8 | 17 | CA | 1C | 16 | DD | 7E | 01 | E6 | 0F |
| FD | 77 | 03 | DD | 7E | 00 | FD | 77 | 02 | C3 | E7 | 15 | FD | 7E | 05 | FE | FF | C2 | 1C | 16 | 3E |
| 04 | CD | B8 | 17 | CA | 1C | 16 | DD | 7E | 01 | E6 | 0F | FD | 77 | 05 | DD | 7E | 00 | FD | 77 | 04 |
| 78 | FE | 01 | C2 | 86 | 16 | DD | 7E | 00 | 4F | 3A | BF | 40 | FE | 00 | 3E | 00 | C2 | FE | 15 | DD |
| 7E | 01 | C6 | 05 | 2F | ED | 79 | FD | CB | 08 | 4E | C2 | 86 | 16 | DD | 7E | 01 | CD | D9 | 1C | 3E |
| 00 | 2F | D3 | 91 | FD | CB | 08 | 8E | C3 | 86 | 16 | 3A | BF | 40 | FE | 00 | 3E | 05 | 20 | 00 | 3E |
| 03 | B8 | CA | 53 | 16 | 3A | BF | 40 | FE | 00 | 28 | 05 | 21 | A1 | 40 | 18 | 03 | 21 | 8D | 40 | FD |
| E5 | D1 | A7 | ED | 52 | CA | 4B | 16 | 11 | 0A | 00 | FD | 19 | C3 | 4F | 16 | FD | 21 | 79 | 40 | 04 |
| C3 | 6C | 15 | DD | CB | 01 | 66 | CA | 93 | 16 | 21 | AB | 40 | 3E | FF | 01 | 12 | 00 | ED | B1 | C2 |
| 9D | 16 | 2B | DD | 7E | 00 | 77 | C5 | E1 | 06 | 40 | 11 | 03 | 00 | A7 | ED | 52 | FA | 7D | 16 | CB |
| 38 | 18 | F6 | 3A | BD | 40 | B0 | CB | C7 | 32 | BD | 40 | DD | 7E | 00 | CD | 30 | 0B | FD | CB | 00 |
| DE | C3 | 9D | 16 | 3E | 07 | DD | 4E | 00 | 06 | 00 | CD | 44 | 14 | DD | 36 | 00 | FF | DD | 36 | 01 |
| FF | C3 | F2 | 14 | 21 | 79 | 40 | 01 | 09 | 00 | 3A | BF | 40 | FE | 00 | 28 | 03 | 01 | 0F | 00 | DD |
| 7E | 00 | ED | A1 | CA | D5 | 16 | 23 | ED | A1 | CA | DD | 16 | 23 | ED | A1 | CA | E7 | 16 | 11 | 05 |
| 00 | 19 | E2 | 9D | 16 | 18 | E6 | 2B | E5 | FD | E1 | 1E | 01 | 18 | 15 | 2B | 2B | 2B | E5 | FD | E1 |
| 1E | 02 | 18 | 0B | 11 | 05 | 00 | A7 | ED | 52 | E5 | FD | E1 | 1E | 04 | 16 | 04 | ED | 4B | C3 | 40 |
| A7 | ED | 42 | C2 | 00 | 17 | 16 | 80 | CB | 7A | 20 | 12 | FD | E5 | FD | 2A | C3 | 40 | FD | 7E | 06 |
| FD | E1 | FE | FF | C2 | 9D | 16 | 18 | 08 | FD | 7E | 06 | FE | FF | C2 | 9D | 16 | CB | 43 | CA | 38 |
| 17 | FD | CB | 09 | 46 | C2 | 67 | 17 | FD | 7E | 08 | B2 | FD | 77 | 08 | FD | CB | 08 | DE | C3 | 9F |
| 17 | CB | 4B | CA | 52 | 17 | FD | CB | 09 | 4E | C2 | 67 | 17 | FD | 7E | 08 | B2 | FD | 77 | 08 | FD |
| CB | 08 | E6 | C3 | 9F | 17 | CB | 7A | C2 | 82 | 17 | FD | 2A | C3 | 40 | 2A | 53 | 40 | DD | 7E | 00 |
| 77 | 23 | 22 | 53 | 40 | FD | CB | 08 | C6 | C3 | 9F | 17 | FD | CB | 08 | C6 | CB | 43 | 28 | 06 | FD |
| CB | 08 | DE | 18 | 0F | CB | 4B | CA | 9B | 17 | FD | CB | 08 | E6 | 18 | 04 | FD | CB | 08 | EE | DD |
| 7E | 00 | FD | 77 | 06 | DD | 7E | 01 | E6 | 0F | FD | 77 | 07 | C3 | 9D | 16 | 21 | 23 | 40 | 22 | 21 |
| 40 | FB | C9 | 57 | CB | 47 | C2 | C6 | 17 | FD | 7E | 01 | FE | FF | C2 | E5 | 17 | 7A | CB | 4F | C2 |
| D4 | 17 | FD | 7E | 03 | FE | FF | C2 | E5 | 17 | 7A | CB | 57 | C2 | E2 | 17 | FD | 7E | 05 | FE | FF |
| C2 | E5 | 17 | 18 | 03 | 0C | 18 | 5F | DD | 7E | 01 | E6 | 0F | BB | CA | 08 | 18 | 3A | BF | 40 | FE | 00 |
| C2 | 0C | 18 | 21 | 05 | 1D | 16 | 00 | ED | 5A | 56 | DD | 7E | 01 | E6 | 0F | BA | C2 | 0C | 18 | 3E |
| FF | 18 | 02 | 3E | 00 | A7 | C9 | F3 | 2A | 53 | 40 | 11 | 55 | 40 | A7 | ED | 52 | CA | 39 | 19 | DD |
| 21 | 54 | 40 | DD | 23 | DD | 7E | 00 | FE | FF | CA | 39 | 19 | CD | 30 | 0B | FD | CB | 04 | BE | FD |
| 21 | 79 | 40 | 11 | 00 | 00 | FD | 7E | 00 | DD | BE | 00 | 20 | 04 | CB | C3 | 18 | 35 | FD | 7E | 02 |
| DD | BE | 00 | 20 | 04 | CB | CB | 18 | 29 | FD | 7E | 04 | DD | BE | 00 | 20 | 04 | CB | D3 | 18 | 1D |
| 21 | 8D | 40 | 3A | BF | 40 | FE | 00 | 28 | 03 | 21 | A1 | 40 | FD | E5 | C1 | A7 | ED | 42 | CA | DD |
| 18 | 01 | 0A | 00 | FD | 09 | 18 | BC | FD | E5 | C1 | 2A | C3 | 40 | A7 | ED | 42 | 20 | 12 | 7B | E6 |
| 07 | CB | 27 | CB | 27 | CB | 27 | FD | B6 | 08 | FD | 77 | 08 | C3 | 32 | 19 | CB | 43 | CA | A7 | 18 |
| 3E | FF | FD | 77 | 00 | FD | 77 | 01 | C3 | BF | 18 | CB | 4B | CA | B7 | 18 | 3E | FF | FD | 77 | 02 |
| FD | 77 | 03 | C3 | BF | 18 | 3E | FF | FD | 77 | 04 | FD | 77 | 05 | FD | 7E | 09 | AB | FD | 77 | 09 |
| FD | 46 | 00 | FD | 4E | 02 | FD | 7E | 04 | A0 | A1 | FE | FF | C2 | 32 | 19 | FD | CB | 08 | CE | C3 |
| 32 | 19 | 3A | BD | 40 | CB | 47 | CA | 19 | 01 | 12 | 00 | DD | 7E | 00 | 21 | AB | 40 | ED | B1 |
| C2 | 32 | 19 | 2B | 36 | FF | C5 | E1 | FD | 21 | BA | 40 | 06 | 40 | 11 | 03 | 00 | A7 | ED | 52 | FA |
| 11 | 19 | CB | 38 | FD | 2B | FD | 2B | FD | 2B | 18 | F0 | FD | 7E | 00 | FD | 56 | 01 | FD | 5E | 02 |
| A2 | A3 | FE | FF | C2 | 2F | 19 | 3A | BD | 40 | A8 | FE | 01 | C2 | 2C | 19 | 3E | 00 | 32 | BD | 40 |
| CD | 41 | 19 | DD | 36 | 00 | FF | C3 | 21 | 18 | 21 | 55 | 40 | 22 | 53 | 40 | FB | C9 | D5 | 3E | 00 |
| CD | AD | 0B | C2 | 4C | 19 | 3E | 08 | DD | 4E | 00 | 2F | ED | 79 | D1 | C9 | 3A | BE | 40 | CB | 47 |
| C2 | 11 | 1B | CB | 4F | CA | 22 | 1A | 3A | BD | 40 | CB | 47 | CA | 12 | 1A | DD | 2A | C3 | 40 | 16 |
| C8 | 3A | BF | 40 | FE | 02 | 20 | 02 | 16 | F0 | 7A | 2F | D3 | 90 | CD | 70 | 1C | 3A | C7 | 40 | 47 |
| 3A | BD | 40 | A0 | 28 | 5A | 16 | 03 | 21 | BE | 40 | CB | 96 | DD | 7E | 00 | FE | FF | CA | AA | 19 |
| 3E | 05 | DD | 4E | 00 | CD | AD | 0B | C2 | A5 | 19 | 3E | 07 | 2F | ED | 79 | CB | D6 | DD | 23 | 15 |
| C2 | 90 | 19 | 3A | BE | 40 | CB | 57 | C2 | CA | 19 | 3A | BD | 40 | 06 | C7 | A8 | FE | 01 | 20 | 02 |
| 3E | 00 | 32 | BD | 40 | C3 | 12 | 1A | 3E | 09 | 32 | C5 | 40 | 3E | 00 | 0E | 91 | 2F | ED | 79 | 3A |
| BE | 40 | CB | C7 | CB | 8F | 32 | BE | 40 | C3 | 6F | 1C | 3A | C7 | 40 | 57 | FE | 40 | CA | 1A | 1A |
| 2A | C3 | 40 | 23 | 23 | 23 | 22 | C3 | 40 | 3A | C7 | 40 | CB | 27 | 32 | C7 | 40 | 3A | BD | 40 | A2 |
| C2 | 6F | 1C | DD | 2A | C3 | 40 | C3 | 7F | 19 | 3E | 02 | 32 | BE | 40 | 18 | D1 | 3E | 02 | 32 | C7 |
| 40 | 21 | 79 | 40 | 22 | C3 | 40 | 3E | 00 | 32 | BE | 40 | DD | 2A | C3 | 40 | DD | CB | 08 | 76 | CA |
| 11 | 1B | 3A | C0 | 40 | CB | 47 | CA | 3F | 1C | DD | CB | 08 | 46 | CA | 5D | 1A | DD | CB | 08 | 86 |
| DD | CB | 09 | DE | 3E | 04 | 32 | C5 | 40 | DD | 7E | 07 | CD | D9 | 1C | DD | 4E | 06 | DD | 7E | 07 |

APPENDIX I-continued

RT Controller

| | | | | | | | | | | | | | | | | | | | |
|---|---|---|---|---|---|---|---|---|---|---|---|---|---|---|---|---|---|---|---|
| C6 | 05 | 2F | ED | 79 | C3 | E5 | 1A | 3A | BF | 40 | FE | 00 | CA | 69 | 1A | 3E | 09 | 18 | 02 | 3E |
| 13 | 32 | C5 | 40 | DD | CB | 08 | 4E | C2 | EF | 1A | 16 | 00 | 06 | 03 | DD | E5 | DD | 7E | 01 | FE |
| FF | C2 | 92 | 1A | DD | 23 | DD | 23 | 10 | F2 | DD | E1 | DD | CB | 08 | CE | C3 | 06 | 1B | DD | E1 |
| CD | D9 | 1C | 16 | 03 | 06 | 01 | FD | E5 | DD | E5 | DD | E5 | FD | E1 | DD | 7E | 00 | FE | FF | 28 |
| 2D | 78 | FD | B6 | 09 | FD | 77 | 09 | DD | 4E | 00 | 3A | BF | 40 | FE | 00 | 20 | 08 | DD | 7E | 01 |
| CD | 9A | 1C | 18 | 04 | 3E | 00 | 18 | 0B | DD | 7E | 01 | CD | AD | 0B | C2 | D2 | 1A | 3E | 02 | C6 |
| 05 | 2F | ED | 79 | DD | 23 | DD | 23 | CB | 20 | 15 | C2 | A3 | 1A | DD | E1 | FD | E1 | 3E | 00 | 0E |
| 91 | 2F | ED | 79 | C3 | 06 | 1B | 2A | C1 | 40 | 7C | B5 | 28 | 07 | 2B | 22 | C1 | 40 | C2 | 06 | 1B |
| CD | AA | 1C | 21 | 05 | 00 | 22 | C1 | 40 | DD | 7E | 08 | CB | B7 | DD | 77 | 08 | C3 | 6F | 1C | 3A |
| C5 | 40 | 3D | 32 | C5 | 40 | FE | 00 | C2 | 6F | 1C | DD | 2A | C3 | 40 | 3A | BE | 40 | CB | 47 | C2 |
| 37 | 1B | DD | CB | 08 | 4E | CA | 37 | 1B | DD | CB | 09 | 5E | CA | 73 | 1B | 3E | 04 | 0E | 91 | 2F |
| ED | 79 | DD | E5 | 16 | 03 | DD | 7E | 00 | FE | FF | CA | 59 | 1B | 3E | 00 | CD | AD | 0B | 20 | 02 |
| 3E | 08 | DD | 4E | 00 | 2F | ED | 79 | DD | 23 | 3A | BE | 40 | CB | 47 | C2 | 65 | 1B | DD | 23 | 15 |
| C2 | 42 | 1B | DD | E1 | 3A | BE | 40 | CB | 47 | C2 | 0B | 1A | 21 | C0 | 40 | CB | 56 | C4 | B7 | 1C |
| DD | CB | 09 | 5E | CA | 8E | 1B | DD | CB | 09 | 9E | 3E | FF | DD | 77 | 06 | DD | 77 | 07 | DD | CB |
| 08 | 7E | CA | A0 | 1B | DD | CB | 08 | BE | DD | CB | 08 | D6 | C3 | EF | 1B | DD | 7E | 08 | CB | 57 |
| 28 | 0B | DD | CB | 08 | 96 | DD | CB | 08 | C6 | C3 | 27 | 1C | CB | 5F | CA | BD | 1B | DD | 7E | 00 |
| CD | DB | 1B | CB | 67 | CA | C8 | 1B | DD | 7E | 02 | CD | DB | 1B | CB | 6F | CA | D3 | 1B | DD | 7E |
| 04 | CD | DB | 1B | E6 | C7 | DD | 77 | 08 | C3 | E7 | 1B | 2A | 53 | 40 | 77 | 23 | 22 | 53 | 40 | DD |
| 7E | 08 | C9 | DD | 7E | 08 | CB | 47 | C2 | 27 | 1C | 2A | C3 | 40 | 11 | 0A | 00 | A7 | ED | 5A | E5 |
| 3A | BF | 40 | FE | 00 | 28 | 05 | 11 | AB | 40 | 18 | 03 | 11 | 97 | 40 | A7 | ED | 52 | 20 | 16 | E1 |
| 21 | AB | 40 | 3A | BE | 40 | CB | CF | 32 | BE | 40 | 22 | C3 | 40 | DD | 21 | 79 | 40 | C3 | 2B | 1C |
| E1 | 22 | C3 | 40 | DD | 2A | C3 | 40 | DD | CB | 08 | F6 | 3E | 00 | 32 | C6 | 40 | 3A | C0 | 40 | CB |
| 87 | 32 | C0 | 40 | C3 | 6F | 1C | 21 | 14 | 40 | CB | A6 | CD | 70 | 1C | 0E | 90 | ED | 78 | 2F | CB |
| 4F | CA | 64 | 1C | 3A | C6 | 40 | 3C | 32 | C6 | 40 | FE | 05 | 20 | 13 | 21 | 14 | 40 | CB | E6 | CD |
| 8C | 1D | 21 | C0 | 40 | CB | C6 | 3A | C0 | 40 | C3 | 35 | 1A | C9 | F5 | 3A | C0 | 40 | CB | 4F | CA |
| 83 | 1C | CB | 8F | 32 | C0 | 40 | 3E | 00 | 2F | D3 | 92 | F1 | C9 | F5 | 3A | C0 | 40 | CB | 4F | C2 |
| 98 | 1C | CB | CF | 32 | C0 | 40 | 3E | 02 | 2F | D3 | 92 | F1 | C9 | F5 | FE | 02 | FA | A5 | 1C | CD |
| 85 | 1C | 18 | 03 | CD | 70 | 1C | F1 | C9 | 3E | 00 | 0E | 91 | 2F | ED | 79 | 21 | C0 | 40 | CB | D6 |
| C9 | CB | 96 | 21 | 14 | 40 | CB | 9E | 0E | 90 | ED | 78 | 2F | CB | 47 | C2 | D0 | 1C | 3E | 04 | 0E |
| 91 | 2F | ED | 79 | C9 | 21 | 14 | 40 | CB | DE | CD | 8C | 1D | C9 | F5 | 3A | BF | 40 | A7 | C2 | E9 |
| 1C | F1 | CD | 9A | 1C | 3E | C8 | 18 | 18 | CD | 70 | 1C | 11 | 05 | 00 | 3D | 47 | 21 | 05 | 1D | A7 |
| ED | 5A | 10 | FB | F1 | A7 | 1E | 00 | 57 | ED | 5A | 7E | 2F | ED | 79 | C9 | 01 | 00 | 03 | 02 | 08 |
| C8 | 85 | 64 | 50 | 43 | F0 | A0 | 78 | 50 | 3C | C8 | 85 | 5F | 4A | 3D | CD | 1D | 1D | C9 | 16 | 00 |
| 01 | 0F | 40 | 21 | 13 | 40 | 0A | BE | C4 | 9C | 1D | 7E | 02 | 3E | 02 | BA | C8 | 14 | 23 | 03 | 18 |
| F0 | 3A | 17 | 40 | A7 | CA | 40 | 1D | 3D | 32 | 17 | 40 | FB | ED | 4D | 02 | 03 | 02 | 06 | 02 | 07 |
| 02 | 05 | 02 | 04 | 02 | 50 | 02 | 32 | 02 | 50 | 04 | 03 | 13 | 03 | 72 | 04 | 71 | 04 | 00 | 05 |
| 32 | 05 | 00 | 05 | 41 | 02 | 30 | 02 | 20 | 07 | 00 | 05 | 42 | 02 | 51 | 03 | 05 | 03 | 61 | 03 | 60 |
| 88 | 88 | 88 | 88 | 88 | 88 | 88 | 88 | 88 | 08 | 0B | 08 | 0A | 08 | 00 | 3A | 01 | 40 | CB | 7F |
| C8 | C3 | 80 | 00 | 3A | 0A | 40 | CB | 47 | C8 | DB | 90 | 2F | CB | 5F | C0 | CD | 83 | 1D | C9 | D5 |
| C5 | 4E | 3A | 00 | 40 | CB | 27 | CB | 27 | B2 | 47 | 3E | 08 | CD | 3E | 14 | C1 | D1 | C9 | 3A | 01 |
| 40 | CB | 7F | 20 | 0C | 3A | 02 | 40 | CB | 7F | 20 | 05 | 3E | 03 | C3 | DB | 1D | 3A | 19 | 40 | CB |
| 47 | C2 | E0 | 1D | 3A | 0F | 40 | 21 | 10 | 40 | B6 | 21 | 11 | 40 | B6 | C2 | E0 | 1D | 3E | 00 | 2F |
| D3 | 9E | 18 | 05 | 3E | 02 | 2F | D3 | 9E | 3A | 17 | 40 | A7 | C0 | 3A | 16 | 40 | A7 | F2 | 59 | 1E |
| 3A | 18 | 40 | FE | 81 | CC | 0A | 1F | DD | 2A | 1B | 40 | DD | CB | 04 | 76 | C2 | 09 | 1E | CD | F5 |
| 1E | 18 | E8 | F5 | DB | F8 | CB | 67 | 28 | 07 | F1 | 3D | EE | 3C | 3C | 18 | 01 | F1 | 1E | 00 | 47 |
| 16 | 64 | 92 | FA | 23 | 1E | 47 | 1C | F3 | 3A | 0D | 40 | CB | F7 | D3 | C8 | 7B | 2F | D3 | 9B | 1E |
| 00 | 16 | 0A | 78 | 1C | 92 | F2 | 34 | 1E | 1D | 82 | 2F | D3 | 9D | 7B | 2F | D3 | 9C | 3A | 00 | 40 |
| C6 | 0A | 2F | D3 | 9A | 3A | 0D | 40 | D3 | C8 | FB | 3E | 14 | 32 | 17 | 40 | CD | F5 | 1E | C9 | 2A |
| 1B | 40 | 5E | 3A | 18 | 40 | CB | 3B | 3D | 20 | FB | DA | 6E | 1E | CD | B4 | 1E | C3 | EA | 1D | 3A |
| 18 | 40 | 57 | 3E | 08 | 92 | CB | 27 | 16 | 00 | 5F | 2A | 1D | 40 | 19 | F3 | 3A | 0D | 40 | CB | F7 |
| D3 | C8 | 7E | 2F | D3 | 9B | 3A | 00 | 40 | C6 | 0A | 2F | D3 | 9A | 23 | 7E | E6 | 0F | 2F | D3 | 9D |
| 7E | CB | 2F | CB | 2F | CB | 2F | CB | 2F | CB | 2F | 2F | D3 | 9C | 3A | 0D | 40 | CB | 08 | 3E | 14 | 32 |
| 17 | 40 | CD | B4 | 1E | C9 | 2A | 1B | 40 | 3A | 18 | 40 | FE | 08 | 20 | 07 | 3E | 01 | 32 | 18 | 40 |
| 18 | 05 | 3C | 32 | 18 | 40 | C9 | 11 | 12 | 40 | A7 | ED | 52 | 20 | 11 | 3E | 01 | 32 | 18 | 40 | 3E |
| FF | 32 | 16 | 40 | 21 | C8 | 40 | 22 | 1B | 40 | C9 | 2A | 1B | 40 | 23 | 22 | 1B | 40 | 2A | 1D | 40 |
| 11 | 10 | 00 | 19 | 22 | 1D | 40 | C9 | DD | 2A | 1B | 40 | 11 | 05 | 00 | DD | 19 | 3A | 18 | 40 | 3C |
| 32 | 18 | 40 | DD | 22 | 1B | 40 | C9 | 21 | 0F | 40 | 22 | 1B | 40 | 21 | 43 | 1D | 22 | 1D | 40 | 3E |
| 01 | 32 | 18 | 40 | 32 | 16 | 40 | F3 | 3A | 0D | 40 | CB | F7 | D3 | C8 | 3E | 00 | 2F | D3 | 9A | D3 |
| 9B | D3 | 9C | D3 | 9D | 3A | 0D | 40 | D3 | C8 | FB | 3E | 14 | 32 | 17 | 40 | 33 | 33 | C9 | 22 | C3 |
| FD | D5 | 2A | 48 | 44 | 11 | 80 | 44 | EB | A7 | ED | D1 | C8 | 70 | 23 | 73 | 23 | 71 | 23 |
| 22 | 48 | 44 | C9 | DB | C0 | CB | 47 | 28 | 59 | 21 | 15 | 40 | CB | B6 | 2A | 48 | 44 | 11 | 4A | 44 |
| A7 | ED | 52 | C8 | 21 | 4A | 44 | 06 | 0F | 3E | 00 | 86 | 23 | 10 | FC | 57 | 0E | C0 | 21 | 4A | 44 |
| 06 | 0F | ED | B3 | ED | 51 | DB | C0 | CB | 47 | 20 | 39 | 3A | 0D | 40 | CB | CF | D3 | C8 | CB | 8F |
| D3 | C8 | EB | 2A | 48 | 44 | 3E | FF | 06 | 0F | 77 | 23 | 10 | FC | C9 | 3A | 0D | 40 | CB | CF | D3 |
| C8 | CB | 8F | D3 | C8 | C9 | 21 | 15 | 40 | CB | F6 | C9 | F5 | C5 | D5 | E5 | DD | E5 | 21 | 11 | 40 |
| CB | BE | DB | C0 | CB | 4F | 28 | 55 | 0E | A0 | 06 | 10 | 21 | 83 | 44 | ED | B2 | 21 | 83 | 44 | 06 |
| 0F | 3E | 00 | 86 | 23 | 10 | FC | 96 | 20 | 43 | 3E | FF | 32 | 92 | 44 | 21 | 83 | 44 | 22 | 81 | 44 |
| 7E | FE | | | | | | | | | | | | | | | | | | | |

APPENDIX II

COT Controller

| | | | | | | | | | | | | | | | | | | | |
|---|---|---|---|---|---|---|---|---|---|---|---|---|---|---|---|---|---|---|---|
| C3 | 80 | 00 | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | D1 | 08 | 10 | 0C | 2A | 0E | 00 | 13 | 64 | F4 | 01 | 32 | FA | 00 | 21 | A5 | 00 | 19 | 7D | 00 |
| FF | FF | FF | FF | FF | FF | FF | FF | FF | FF | FF | FF | FF | FF | FF | FF | FF | FF | FF | FF | FF |

APPENDIX II-continued

COT Controller

| | | | | | | | | | | | | | | | | | | | |
|---|---|---|---|---|---|---|---|---|---|---|---|---|---|---|---|---|---|---|---|
| FF | FF | FF | FF | FF | FF | FF | FF | FF | FF | FF | FF | FF | FF | FF | FF | FF | FF | FF | FF |
| FF | FF | F3 | 31 | ØØ | 48 | DB | F8 | E6 | Ø8 | 47 | 3E | Ø1 | BØ | 32 | 5E | 41 | F6 | 4Ø | D3 | C8 |
| 3E | ØF | 2F | D3 | 9A | D3 | 9B | D3 | 9C | D3 | 9D | 3A | 5E | 41 | D3 | C8 | 21 | ØØ | ØØ | Ø1 | ØØ |
| 2Ø | C5 | 11 | FF | FF | D5 | D3 | D8 | 11 | 21 | 1Ø | 46 | 23 | ØE | Ø8 | E3 | 29 | 1F | A8 | E6 | 8Ø |
| 28 | Ø6 | 7C | AA | 67 | 7D | AB | 6F | 78 | Ø7 | 47 | ØD | 2Ø | ED | D1 | C1 | ØB | 78 | B1 | C5 | E5 |
| EB | 2Ø | D9 | E1 | C1 | 7D | B4 | CA | FF | ØØ | 3A | 5E | 41 | F6 | 4Ø | D3 | C8 | 3E | ØE | 2F | D3 |
| 9A | 3E | Ø7 | 2F | D3 | 9B | 3E | Ø2 | 2F | D3 | 9C | 3E | Ø1 | 2F | D3 | 9D | 3A | 5E | 41 | D3 | C8 |
| C3 | FF | ØØ | 21 | ØØ | 4Ø | Ø6 | Ø3 | D3 | D8 | 7Ø | Ø4 | 2Ø | Ø2 | Ø6 | Ø3 | 23 | 7C | FE | 48 | 2Ø |
| F2 | 26 | 4Ø | Ø6 | Ø3 | D3 | D8 | 7E | B8 | C2 | 4F | Ø1 | Ø4 | 2Ø | Ø2 | Ø6 | Ø3 | 23 | 7C | FE | 48 |
| 2Ø | EE | 26 | 4Ø | D3 | D8 | 7E | 2F | 77 | 23 | 7C | FE | 48 | 2Ø | F5 | 26 | 4Ø | Ø6 | Ø3 | D3 | D8 |
| 7E | 2F | B8 | C2 | 4F | Ø1 | Ø4 | 2Ø | Ø2 | Ø6 | Ø3 | 23 | 7C | FE | 48 | 2Ø | ED | C3 | 71 | Ø1 | 3A |
| 5E | 41 | F6 | 4Ø | D3 | C8 | 3E | ØE | 2F | D3 | 9A | 3E | Ø7 | 2F | D3 | 9B | 3E | Ø2 | 2F | D3 | 9C |
| 3E | ØØ | 2F | D3 | 9D | 3A | 5E | 41 | D3 | C8 | 18 | DE | CD | 83 | Ø1 | CD | 9Ø | Ø2 | CD | C6 | Ø2 |
| CD | 82 | Ø4 | CD | D7 | 14 | C3 | DB | Ø4 | 16 | ØØ | 21 | ØØ | 4Ø | Ø1 | FE | Ø7 | 72 | 23 | ØB | 78 |
| B1 | 2Ø | F9 | D3 | D8 | 3E | FF | 21 | EØ | 46 | Ø6 | 2E | CD | 8B | Ø2 | 21 | 1C | 41 | Ø6 | 4Ø | CD |
| 8B | Ø2 | 21 | 45 | 46 | 22 | 43 | 46 | 3E | 19 | 47 | Ø7 | 8Ø | 47 | 3E | FF | CD | 8B | Ø2 | ØE | 18 |
| 16 | ØF | 21 | 63 | 41 | Ø6 | 8Ø | 71 | 23 | 77 | 23 | 72 | 23 | 72 | 23 | 77 | 23 | 1Ø | F4 | 3E | Ø1 |
| 32 | 1B | 41 | 32 | DB | 46 | 32 | 14 | 4Ø | 32 | 17 | 4Ø | 32 | 6Ø | 41 | 3E | ØA | 32 | 94 | 47 | DB |
| F8 | E6 | 1Ø | ØF | 32 | AF | 47 | 21 | Ø1 | Ø1 | 22 | 9Ø | 47 | 22 | 92 | 47 | 3E | 8Ø | 32 | 5C | 41 |
| 3E | F8 | 32 | D8 | 46 | 3E | Ø5 | 32 | EC | 43 | DB | EØ | 32 | FE | 4Ø | CB | Ø7 | CB | Ø7 | E6 | Ø3 |
| 32 | 9F | 46 | 3A | FE | 4Ø | 21 | Ø9 | ØØ | Ø1 | 34 | ØØ | CB | 4F | 28 | Ø6 | 21 | 34 | ØØ | Ø1 | 8Ø |
| Ø2 | 22 | BB | 46 | ED | 43 | BD | 46 | ED | 43 | A7 | 46 | ED | 43 | A9 | 46 | 3A | 9F | 46 | 4F | Ø6 |
| ØØ | 21 | 48 | ØØ | CB | 21 | 81 | 4F | Ø9 | 7E | 32 | E4 | 43 | 23 | 5E | 23 | 56 | ED | 53 | EA | 43 |
| 21 | 47 | 44 | 11 | 49 | 44 | ØE | ØØ | D3 | D8 | 73 | 23 | 72 | 23 | 3A | E4 | 43 | 47 | 1E | Ø4 | 73 |
| 23 | 36 | Ø1 | 23 | 36 | ØØ | 23 | 71 | 23 | 72 | 23 | 1Ø | F1 | 5D | 54 | 13 | ØC | 3A | 9F |
| 46 | 3C | B9 | 2Ø | D9 | 21 | 95 | 47 | Ø6 | 19 | AF | 57 | 15 | 72 | 82 | 23 | 1Ø | FA | 2F | 77 | C9 |
| 77 | 23 | 1Ø | FC | C9 | ED | 5E | 3E | ØØ | ED | 47 | 3E | 4Ø | ØE | DØ | ED | 79 | 3E | C7 | ED | 79 |
| 3E | Ø1 | ED | 79 | ØE | D1 | 3E | A7 | ED | 79 | 3E | 4E | ED | 79 | ØE | D2 | 3E | A7 | ED | 79 | 3E |
| C3 | ED | 79 | ØE | D3 | 3E | C7 | ED | 79 | 3E | Ø1 | ED | 79 | FB | D3 | D8 | C9 | 3E | FF | ED | 79 |
| 8Ø | 3A | 6Ø | 41 | 2F | D3 | 8Ø | D3 | 8Ø | 3E | ØØ | 2F | D3 | 88 | 3E | 38 | 32 | E5 | 43 | 2F | D3 |
| 88 | 3E | ØØ | 2F | D3 | 8B | CD | 9E | 14 | 21 | BF | 7F | 7D | 2F | D3 | 8A | 7C | 2F | D3 | 89 | Ø6 |
| 2F | CD | 4B | Ø3 | 3E | ØØ | 2F | D3 | 9F | CD | 9E | 14 | 3E | FF | 2F | D3 | 8A | 3E | 4Ø | 2F | D3 |
| 89 | Ø6 | 2E | CD | 4B | Ø3 | CD | DB | 14 | DB | 99 | 2F | D3 | 88 | 47 | 2Ø | 19 | Ø6 | 2E |
| ØE | 98 | 21 | DA | 46 | CB | E6 | 78 | 2F | ED | 79 | DB | 99 | 2F | CB | 4F | 28 | Ø5 | Ø5 | 1Ø | F2 |
| CB | A6 | CD | 9E | 14 | 21 | BC | BF | 7D | 2F | D3 | 8A | 7C | 2F | D3 | 89 | Ø6 | 2E | CD | 4B | Ø3 |
| C3 | 5A | Ø3 | C5 | CD | 9E | 14 | C1 | 78 | 2F | D3 | 8B | Ø5 | Ø5 | F2 | 4B | Ø3 | C9 | 3E | 31 | D3 |
| C8 | 3E | 35 | 32 | 5E | 41 | D3 | C8 | DB | CØ | CB | 47 | 28 | 18 | 21 | 45 | 46 | Ø6 | ØF | ØE | CØ |
| ED | B3 | DB | CØ | CB | 47 | 28 | ØE | 7E | ED | 79 | DB | CØ | CB | 47 | 28 | Ø5 | 21 | DA | 46 | CB |
| F6 | DB | E8 | CD | 9E | 14 | 3E | BC | 2F | D3 | 8A | 3E | CØ | 2F | D3 | 89 | 3E | ØØ | 2F | D3 | 8B |
| 16 | Ø2 | 3A | 6Ø | 41 | CB | D7 | 2F | D3 | 8Ø | 2F | CB | 97 | 2F | D3 | 8Ø | D3 | 8Ø | DB | 8Ø | 2F |
| CB | 4F | 28 | Ø5 | 15 | 2Ø | D1 | Ø6 | Ø2 | C3 | 5F | Ø4 | 21 | 9Ø | 47 | 2Ø | ØE | 82 | ED | B3 | DB | 8Ø | 2F |
| CB | 4F | 2Ø | Ø8 | 15 | 2Ø | D1 | Ø6 | Ø2 | C3 | 5F | Ø4 | CD | 9E | 14 | 3E | BD | 2F | D3 | 8A | 3E |
| 4Ø | F6 | 2F | 2F | D3 | 89 | 3E | 2E | 2F | D3 | 8B | CD | DB | 14 | 21 | DC | 46 | CB | CE | CD | 9E |
| 14 | 3E | BE | 2F | D3 | 8A | 3E | CØ | F6 | 2F | 2F | D3 | 89 | 3E | 2F | 2F | D3 | 8B | Ø1 | ØØ | Ø1 |
| 3A | DC | 46 | CB | 7F | 2Ø | ØA | ØB | 78 | B1 | 2Ø | F4 | Ø6 | Ø3 | C3 | 5F | Ø4 | 3E | ØA | 32 | 94 |
| 47 | 3E | ØØ | 32 | DC | 46 | CD | 9E | 14 | 3E | BD | 2F | D3 | 8A | 3E | CØ | F6 | 2E | 2F | D3 | 89 |
| 3E | 2E | 2F | D3 | 8B | 3A | D8 | 46 | CB | 57 | 2Ø | Ø1 | C9 | F3 | 3A | 5E | 41 | F6 | 4Ø | D3 | C8 |
| 3E | ØE | 2F | D3 | 9A | D3 | 9B | 3E | Ø5 | 2F | D3 | 9C | 3E | ØØ | 2F | D3 | 9D | 3E | 3A |
| 5E | 41 | D3 | C8 | 18 | DD | F3 | 3A | 5E | 41 | F6 | 4Ø | D3 | C8 | 3E | ØE | 2F | D3 | 9A | 3E | Ø2 |
| 2F | D3 | 9B | 3E | Ø3 | 2F | D3 | 9C | 78 | 2F | D3 | 9D | 3A | 5E | 41 | D3 | C8 | C3 | 5F | Ø4 | CD |
| DB | 14 | DB | E8 | CB | 5F | CØ | 3A | FE | 4Ø | CB | 47 | 28 | 11 | DB | F8 | CB | 67 | Ø6 | Ø4 | 28 |
| Ø2 | Ø6 | Ø2 | 3A | DB | 46 | BØ | 32 | DB | 46 | Ø6 | Ø3 | 3E | 34 | 32 | 5E | 41 | D3 | C8 | 78 | 2F |
| D3 | 9E | CD | 6E | 15 | DB | F8 | CB | 67 | ØE | Ø2 | 28 | Ø2 | CB | 21 | 3A | 9F | 46 | 3C | 47 | 21 |
| CB | 46 | 11 | Ø4 | ØØ | 7E | B1 | 77 | 19 | 1Ø | FA | 3A | DB | 46 | CB | 87 | 32 | DB | 46 | 21 | DC |
| 46 | CB | C6 | C9 | 3E | ØØ | 32 | DE | 46 | DD | 21 | 63 | 41 | FD | 21 | 1Ø | 47 | DB | 99 | 2F | CB |
| 7F | C2 | 3D | Ø6 | DD | 7E | ØØ | 2F | E6 | 1C | C2 | 3D | Ø6 | FD | 7E | ØØ | E6 | 1F | CA | Ø7 | Ø5 |
| 2F | E6 | ØF | C2 | 3D | Ø6 | 3A | EØ | 46 | 3C | C2 | 3D | Ø6 | 3A | DE | 46 | 32 | DF | 46 | F3 | CD |
| 9E | 14 | 3A | D8 | 46 | CB | 57 | C2 | 3D | Ø6 | 3A | DF | 46 | 2F | D3 | 8A | 3E | 4Ø | 2F | D3 | 89 |
| 3E | ØØ | 2F | D3 | 8B | CD | 9E | 14 | 3A | D8 | 46 | CB | 57 | C2 | 3D | Ø6 | 3E | FF | 2F | D3 | 8A |
| 3E | 4Ø | 2F | D3 | 89 | 3E | Ø3 | 2F | D3 | 8B | 3E | ØØ | 2F | D3 | 9F | DF | 46 | 4F | 3E |
| Ø2 | 2F | ED | 79 | CD | D7 | 14 | DB | 99 | 2F | CB | 47 | CA | 74 | Ø5 | FD | 7E | ØØ | E6 | ØF | EE |
| ØF | C2 | C7 | Ø5 | FD | 77 | ØØ | C3 | C7 | Ø5 | DD | 7E | Ø3 | E6 | ØF | C2 | 3D | Ø6 | FD | 7E | ØØ |
| E6 | 1F | C2 | 3D | Ø6 | 3E | ØØ | CB | F7 | 2F | D3 | 9F | CD | DB | 14 | DB | 99 | 2F | CB | 47 | C2 |
| B8 | Ø5 | 3E | Ø3 | 2F | D3 | 9F | CD | DB | 14 | DB | 99 | 2F | CB | 47 | 28 | ØB | 21 | D9 | 46 | CB |
| 86 | 23 | CB | DE | C3 | 3D | Ø6 | 21 | D9 | 46 | CB | C6 | C3 | 3D | Ø6 | 21 | D9 | 46 | CB | 86 | 23 |
| CB | 9E | FD | 36 | ØØ | ØF | C3 | 3D | Ø6 | 21 | D9 | 46 | CB | 86 | 23 | CB | 9E | CB | 66 | 28 | 6A |
| F3 | 3E | ØØ | 2F | D3 | 98 | DB | 99 | 2F | CB | 4F | FB | 28 | D7 | 3A | DF | 46 | 4F | 3E | Ø4 | 2F |
| ED | 79 | F3 | CD | 9E | 14 | 21 | BF | 7F | 7D | 2F | D3 | 8A | 7C | 2F | D3 | 89 | 3E | Ø3 | 2F | D3 |
| 8B | FB | CD | DF | 14 | DB | 99 | 2F | CB | 4F | CA | 3D | Ø6 | CD | DF | 14 | 2F | CB | 4F | CA | 3D |
| Ø6 | DD | CB | ØØ | 7E | 28 | 24 | C3 | 3D | Ø6 | DD | 7E | ØØ | E6 | Ø3 | 57 | 3A | DF | 46 | 5F | CD |
| 17 | 16 | F2 | 3D | Ø6 | Ø6 | ØØ | CD | CC | 15 | Ø6 | ØD | CD | CC | 15 | Ø6 | ØØ | 21 | Ø2 | 41 | Ø9 |
| 73 | 3A | FF | 4Ø | 2Ø | 1D | CD | BB | Ø6 | 3A | DC | 46 | CB | 47 | CC | 82 | Ø6 | 3A | DC | 46 |
| E6 | 81 | FE | Ø1 | CC | Ø2 | 15 | 3E | 14 | 32 | FF | 4Ø | CD | 32 | Ø8 | F3 | 3A | DE | 46 | 4F | FD |
| 7E | ØØ | E6 | ØF | 2Ø | Ø1 | 2F | ED | 79 | FB | ØC | FA | DB | Ø4 | 79 | 32 | DE | 46 | FD | 23 | 11 |
| Ø5 | ØØ | DD | 19 | C3 | E8 | Ø4 | Ø6 | Ø5 | 3A | D8 | 46 | CB | 7F | 2Ø | Ø2 | Ø6 | Ø2 | CD | 71 | 12 |
| CD | D7 | 14 | 3A | DB | 46 | E6 | Ø6 | C8 | 3A | 5E | 41 | F6 | 4Ø | D3 | C8 | 3E | ØE | 2F | D3 | 9A |
| 3E | Ø2 | 2F | D3 | 9B | 3E | Ø2 | 2F | D3 | 9C | 3E | ØØ | 2F | D3 | 9D | 3A | 5E | 41 | D3 | C8 | 18 |
| DE | 3A | ØØ | 41 | A7 | 2Ø | 1C | 3A | 5E | 41 | F6 | 4Ø | D3 | C8 | AF | 2F | 32 | ØØ | 41 | D3 | 9A |
| D3 | 9B | D3 | 9C | D3 | 9D | 3A | 5E | 41 | D3 | C8 | C3 | 31 | Ø8 | 3C | C2 | 81 | Ø7 | 3A | 19 | 41 |
| 21 | C8 | 46 | 16 | ØØ | 5F | 19 | 3A | 1B | 41 | A6 | C2 | 2Ø | Ø7 | 21 | Ø1 | 41 | 34 | 34 | 34 | 3A |
| 1B | 41 | Ø7 | 32 | 1B | 41 | D2 | E1 | Ø6 | 1C | 7B | 32 | 19 | 41 | E6 | Ø3 | 2Ø | Ø3 | 32 | Ø1 | 41 |

APPENDIX II-continued
COT Controller

| | | | | | | | | | | | | | | | | | | |
|---|---|---|---|---|---|---|---|---|---|---|---|---|---|---|---|---|---|---|
| 7B | FE | 14 | C2 | E1 | 06 | 3E | 00 | 32 | 19 | 41 | 3C | 32 | 00 | 41 | C3 | 81 | 07 | 3A | 5E | 41 |
| F6 | 40 | D3 | C8 | 3A | 19 | 41 | CB | 2F | CB | 2F | C6 | 0A | 2F | D3 | 9A | 3A | 01 | 41 | 21 | 71 |
| 08 | 16 | 00 | 5F | 19 | 7E | 2F | D3 | 9B | 23 | 7E | 2F | D3 | 9C | 23 | 7E | 2F | D3 | 9D | 3A | 5E |
| 41 | D3 | C8 | 21 | 01 | 41 | 34 | 34 | 34 | 3A | 1B | 41 | 07 | 32 | 1B | 41 | D2 | 31 | 08 | 3A | 19 |
| 41 | 3C | 5F | 32 | 19 | 41 | E6 | 03 | 20 | 03 | 32 | 01 | 41 | 7B | FE | 14 | C2 | 31 | 08 | 3E | 00 |
| 32 | 19 | 41 | 3C | 32 | 00 | 41 | C3 | 31 | 08 | 3A | 1A | 41 | A7 | 4F | FA | 9E | 07 | 06 | 00 | 21 |
| 10 | 47 | 09 | 7E | E6 | 0F | EE | 0F | 28 | 32 | 0C | 79 | 32 | 1A | 41 | C3 | 81 | 07 | CB | B9 | 21 |
| 09 | 44 | CB | 29 | CB | 29 | CB | 29 | 06 | 00 | 09 | E6 | 07 | 3C | 47 | 3E | 80 | 07 | 10 | FD | A6 |
| 20 | 10 | 3A | 1A | 41 | 3C | 32 | 1A | 41 | C2 | 81 | 07 | 32 | 00 | 41 | C3 | BB | 06 | 3A | 1A | 41 |
| 4F | A7 | 1E | 0E | F2 | E6 | 07 | E6 | 7F | 4F | 06 | 00 | DD | E5 | CD | 89 | 14 | DD | 7E | 00 | DD |
| E1 | E6 | 03 | C6 | 0A | 5F | 3A | 5E | 41 | F6 | 40 | D3 | C8 | 7B | 2F | D3 | 9A | DB | F8 | CB | 67 |
| 28 | 04 | 3E | 3C | A9 | 4F | 79 | 3C | 1E | 00 | 47 | 16 | 64 | 92 | FA | 08 | 08 | 47 | 1C | 7B | 2F |
| D3 | 9B | 1E | 00 | 16 | 0A | 78 | 1C | 92 | F2 | 11 | 08 | 1D | 82 | 2F | D3 | 9D | 7B | 2F | D3 | 9C |
| 3A | 5E | 41 | D3 | C8 | 3A | 1A | 41 | 3C | 32 | 1A | 41 | C2 | 31 | 08 | 32 | 00 | 41 | C9 | 16 | 00 |
| 21 | 10 | 47 | 06 | 80 | 7E | E6 | 0F | EE | 0F | 20 | 02 | CB | CA | 23 | 10 | F4 | 21 | 09 | 44 | 06 |
| 10 | AF | B6 | 23 | 10 | FC | A7 | 28 | 02 | CB | CA | 3A | DC | 46 | E6 | 60 | 20 | 02 | CB | C2 | 21 |
| C8 | 46 | 06 | 14 | AF | B6 | 23 | 10 | FC | A7 | 28 | 02 | CB | CA | 7A | 2F | D3 | 9E | C9 | 02 | 03 |
| 01 | 02 | 03 | 02 | 02 | 05 | 00 | 02 | 00 | 04 | 02 | 00 | 05 | 02 | 00 | 07 | 02 | 00 | 06 | 02 | 00 |
| 03 | 05 | 04 | 01 | 05 | 00 | 00 | 05 | 03 | 02 | 04 | 00 | 00 | 04 | 07 | 01 | 03 | 07 | 02 | 03 | 01 |
| 03 | 03 | 00 | 04 | 03 | 06 | 00 | 03 | 06 | 01 | 03 | 00 | 05 | 02 | 05 | 01 | 05 | 04 | 02 | 07 | 00 |
| 00 | 02 | 02 | 07 | 02 | 03 | 00 | 08 | 00 | 00 | 08 | 00 | 0A | 08 | 00 | 0B | 02 | 00 | 02 | 02 | 02 |
| 01 | 00 | 00 | 00 | 00 | 00 | 00 | 00 | 00 | 00 | 08 | D9 | DD | E5 | 3A | DC | 46 | E6 | 07 | CA | 60 |
| 09 | 0E | 81 | 06 | 1B | 21 | EE | 43 | ED | B2 | 06 | 18 | 21 | EE | 43 | 7E | 23 | 86 | 10 | FC | 2F |
| E6 | 0F | 23 | 96 | 20 | 69 | 3A | 08 | 44 | 47 | DB | F8 | E6 | 10 | 0F | A8 | 20 | 58 | 3A | DC | 46 |
| CB | 4F | 20 | 07 | 3A | D8 | 46 | E6 | 60 | 20 | 4F | 3A | DC | 46 | CB | 7F | 20 | 0E | 3A | EE | 43 |
| FE | 0F | 20 | 41 | 3A | EF | 43 | FE | 0E | 20 | 3A | AF | 32 | ED | 43 | 21 | EE | 43 | 22 | E8 | 43 |
| 4E | CD | 7A | 15 | 21 | 75 | 09 | 09 | 09 | 4B | CD | 89 | 14 | 42 | 5E | 23 | 56 | EB | 11 | 47 | 09 |
| D5 | E9 | 2A | E8 | 43 | 01 | 05 | 00 | 09 | 22 | E8 | 43 | EB | 21 | 07 | 44 | A7 | ED | 52 | EB | 20 |
| D5 | 21 | D8 | 46 | CB | BE | 3A | 60 | 41 | CB | EF | 2F | D3 | 80 | 2F | CB | AF | 2F | D3 | 80 | D9 |
| DD | E1 | 08 | FB | ED | 4D | 95 | 09 | 01 | 0A | 53 | 0A | 76 | 0A | 16 | 0B | 8E | 0A | 8F | 0A | 17 |
| 0B | 6B | 0B | 4A | 0B | 03 | 0C | 9B | 0B | 8E | 0A | 8E | 0A | 8E | 0A | F4 | 0B | DD | CB | 00 | 7E |
| 28 | 05 | CD | CF | 14 | 20 | 0E | 06 | 09 | 59 | DD | 7E | 00 | E6 | 03 | 57 | CD | CC | 15 | 18 | 52 |
| 21 | 10 | 47 | 78 | E6 | 0F | 5F | 06 | 00 | 09 | 7E | E6 | 10 | B3 | 77 | 2F | E6 | 06 | 28 | 0A | 07 |
| 07 | 07 | 07 | DD | B6 | 00 | DD | 77 | 00 | DD | 7E | 00 | E6 | 1C | 20 | 1F | ED | 59 | 53 | 59 | 4F |
| 21 | 19 | 44 | 09 | 36 | 00 | DD | 7E | 00 | F6 | 04 | DD | 77 | 00 | DD | 36 | 01 | FF | 4A | 06 | 08 |
| CD | 71 | 12 | 18 | 0E | DD | 7E | 00 | E6 | E3 | F6 | 0C | DD | 77 | 00 | DD | 36 | 01 | 01 | C9 | CD |
| CF | 14 | C8 | 58 | 06 | 00 | 21 | 10 | 47 | 09 | 7E | E6 | 30 | 77 | DD | 7E | 04 | FE | FF | 28 | 2D |
| 59 | 4F | CB | 66 | 20 | 0B | DD | 7E | 00 | E6 | 03 | 57 | CD | 8C | 15 | 06 | 00 | 21 | D0 | 40 | 09 |
| 36 | 00 | 21 | 18 | 40 | CB | 21 | CB | 21 | 09 | 06 | 04 | 36 | 00 | 23 | 10 | FB | 0E | 00 | 06 | 08 |
| CD | 71 | 12 | DD | 7E | 00 | F6 | 1C | DD | 77 | 00 | 4B | 3E | 00 | 2F | ED | 79 | C9 | CD | CF | 14 |
| C8 | 58 | 06 | 00 | DD | 4E | 04 | CB | 79 | C2 | 75 | 0A | CB | 21 | CB | 21 | 21 | 18 | 40 | 09 | 3E |
| 00 | 01 | 04 | 00 | ED | B1 | 20 | 02 | 2B | 73 | C9 | CD | CF | 14 | C8 | 78 | 06 | 00 | 21 | 10 | 47 |
| 09 | 77 | ED | 79 | FE | 0C | 20 | 06 | CB | E6 | 59 | CD | 49 | 12 | C9 | 78 | A7 | CA | 06 | 0B | DD |
| 7E | 00 | E6 | 03 | 57 | 59 | 06 | 00 | CB | 29 | CB | 29 | CB | 29 | 21 | 09 | 44 | 09 | 7B | E6 | 07 |
| 3C | 47 | 3E | 80 | 07 | 10 | FD | 2F | A6 | 77 | 4B | 06 | 00 | DD | 7E | 04 | FE | FF | 28 | 3C | 3E |
| 08 | 2F | ED | 79 | 21 | 10 | 47 | 09 | 36 | 00 | DD | 4E | 04 | 21 | 19 | 44 | 09 | 36 | 00 | 21 | D0 |
| 40 | 09 | 36 | 00 | CD | 8C | 15 | 06 | 00 | 21 | 18 | 40 | CB | 21 | CB | 21 | 09 | 06 | 04 | 36 | 00 |
| 23 | 10 | FB | DD | 7E | 00 | E6 | 03 | F6 | 14 | DD | 77 | 00 | DD | 36 | 01 | 02 | 06 | 0A | CD | CC |
| 15 | DD | 7E | 00 | E6 | 7C | 18 | 0C | 3A | A0 | 46 | F6 | 80 | 4F | DD | 7E | 00 | E6 | FC | B1 | DD |
| 77 | 00 | C9 | C9 | CD | CF | 14 | C8 | DD | 7E | 00 | E6 | E3 | F6 | 14 | DD | 77 | 00 | 3E | 08 | 2F |
| ED | 79 | DD | 36 | 01 | 02 | DD | 7E | 04 | FE | FF | CA | 49 | 0B | 59 | 4F | 06 | 00 | 21 | 19 | 44 |
| 09 | 36 | 00 | DD | 7E | 00 | E6 | 03 | 57 | CD | 8C | 15 | C9 | CD | CF | 14 | C8 | DD | 7E | 00 | E6 |
| E3 | F6 | 10 | DD | 77 | 00 | DD | 36 | 01 | 03 | 21 | 10 | 47 | 06 | 00 | 09 | 7E | E6 | F3 | F6 | 08 |
| 77 | ED | 79 | C9 | 78 | E6 | F0 | 20 | 09 | 58 | 16 | 00 | 21 | C8 | 46 | 19 | 71 | C9 | 58 | 79 | 21 |
| 09 | 44 | CB | 29 | CB | 29 | CB | 29 | 06 | 00 | 09 | E6 | 07 | 3C | 47 | 3E | 80 | 07 | 10 | FD | CB |
| 63 | 20 | 03 | B6 | 18 | 02 | 2F | A6 | 77 | C9 | 59 | 79 | CB | 63 | 4F | 21 | A2 | 46 | 09 | 3E | 01 |
| CB | 63 | 28 | 02 | 3E | 02 | 77 | 07 | 2F | CB | 21 | CB | 21 | 21 | CB | 46 | 09 | A6 | 77 | 21 | A2 |
| 46 | 3A | 9F | 46 | 57 | 3C | 47 | 21 | A2 | 46 | DB | F8 | CB | 67 | 3E | 01 | 28 | 02 | 3E | 02 | A6 |
| 23 | 10 | FC | A7 | C8 | 06 | 06 | CD | 71 | 12 | 21 | DC | 46 | CB | F6 | 1E | 00 | 06 | 0C | 4A | CB |
| 21 | CB | 21 | CB | 21 | CB | 21 | CD | CC | 15 | 15 | F2 | E3 | 0B | C9 | 3E | 0A | 2F | 32 | 94 | 47 |
| 21 | DC | 46 | CB | FE | E1 | C3 | 60 | 09 | 3A | A0 | 46 | 4F | 06 | 00 | 21 | A2 | 46 | 09 | CB | D6 |
| C9 | F5 | C5 | D5 | E5 | DD | E5 | D3 | D8 | 3A | 0F | 47 | A7 | 28 | 04 | 3D | 32 | 0F | 47 | CD | 14 |
| 17 | CD | 4D | 18 | 3A | DC | 46 | CB | 47 | CA | 92 | 0D | CB | 4F | C2 | 92 | 0D | CB | 7F | 20 | 1D |
| 2A | 15 | 40 | 2B | 22 | 15 | 40 | 7C | B5 | CA | 80 | 00 | DB | F8 | CB | 5F | C2 | 80 | 00 | 21 | B0 |
| 47 | 35 | C2 | 92 | 0D | C3 | 24 | 0D | 21 | B0 | 47 | 35 | C2 | 92 | 0D | 3A | ED | 43 | A7 | CA | AA |
| 0C | 21 | A1 | 46 | 35 | 28 | 0F | 3A | 95 | 47 | FE | 04 | C2 | 24 | 0D | 21 | 98 | 47 | 34 | C3 | 17 |
| 0D | 3A | C3 | 46 | CB | 5F | C2 | A7 | 0C | 21 | D8 | 46 | 3A | E5 | 43 | E6 | 08 | 20 | 02 | 3E | 10 |
| A6 | 20 | 0C | 3E | 60 | A6 | 28 | 12 | 3A | C7 | 46 | FE | 02 | 28 | 0B | CD | 02 | 15 | 3E | 0A | 32 |
| A1 | 46 | C2 | 92 | 0D | C3 | 80 | 00 | AF | 32 | A0 | 46 | 3A | A0 | 46 | 4F | 3A | 9F | 46 | 91 | 28 |
| 02 | 0C | 79 | 32 | A0 | 46 | 21 | 47 | 44 | ED | 5B | EA | 43 | 3C | A7 | ED | 52 | 19 | 3D | 20 | FC |
| 5E | 23 | 56 | 23 | 22 | C4 | 46 | ED | 53 | E6 | 43 | 11 | 95 | 47 | 01 | 19 | 00 | ED | B0 | EB | 2A |
| E6 | 43 | A7 | ED | 52 | 4D | 44 | EB | ED | 5B | C4 | 46 | FA | F4 | 0C | 28 | 02 | ED | B0 | 2A | C4 |
| 46 | 2B | 72 | 2B | 73 | EB | 3A | A0 | 46 | 1E | 04 | 06 | 05 | 73 | 23 | 36 | 01 | 23 | 36 | 01 | 23 |
| 36 | 00 | 23 | 77 | 23 | 10 | F1 | 3E | 06 | 32 | A1 | 46 | 21 | 95 | 47 | 7E | 06 | 18 | 23 | 86 | 10 |
| FC | 2F | 23 | 77 | CD | 9E | 14 | 21 | BF | 7F | 7D | 2F | D3 | 8A | 7C | 2F | D3 | 89 | 3E | 2F | 2F |
| D3 | 8B | CD | 9E | 14 | 21 | D8 | 46 | CB | 86 | CB | 86 | 16 | 02 | 3A | 60 | 41 | CB | D7 | 2F | D3 |
| 80 | 2F | CB | 97 | 2F | D3 | 80 | D3 | 80 | 2F | CB | 4F | 28 | 07 | 21 | D8 | 46 | CB | C6 |
| 18 | 18 | 21 | 90 | 47 | 06 | 20 | 0E | 82 | ED | B3 | DB | 80 | 2F | CB | 4F | 20 | 08 | 15 | 20 | CF |
| 21 | D8 | 46 | CB | CE | 3E | BE | 2F | D3 | 8A | 3E | C0 | F6 | 2F | 2F | D3 | 89 | 3E | 2F | 2F | D3 |
| 8B | 3E | 05 | 32 | B0 | 47 | 32 | ED | 43 | CD | 9E | 0D | DD | E1 | E1 | D1 | C1 | F1 | FB | ED | 4D |
| 21 | 17 | 40 | 35 | C2 | 29 | 0E | 3A | 01 | 40 | A7 | 36 | 04 | 28 | 02 | 36 | 06 | 2F | 32 | 01 | 40 |

APPENDIX II-continued

COT Controller

| | | | | | | | | | | | | | | | |
|---|---|---|---|---|---|---|---|---|---|---|---|---|---|---|---|
| 11 | ØD | 47 | DD | 21 | FD | 4Ø | 21 | A6 | 46 | 36 | 3E | DD | 7E | ØØ | A7 | 28 | 5B | 4E | ØD | CD |
| 9E | 14 | 21 | BC | BF | CB | 41 | 28 | Ø3 | 21 | BF | 7F | 7D | 2F | D3 | 8A | 7C | 2F | D3 | 89 | 79 |
| 2F | D3 | 8B | 1A | E6 | 7F | 4F | 21 | 1Ø | 47 | Ø6 | ØØ | Ø9 | 7E | EE | ØC | 77 | ED | 79 | DD | 35 |
| ØØ | 2Ø | 2B | CD | 9E | 14 | 3A | A6 | 46 | 3D | 6F | 26 | CØ | CB | 45 | 28 | Ø2 | 26 | 8Ø | 79 | 2F |
| D3 | 8A | 7C | B5 | 2F | D3 | 89 | 7D | 2F | D3 | 8B | Ø6 | ØØ | 6Ø | 69 | 29 | 29 | Ø9 | Ø1 | 63 | 41 |
| Ø9 | 23 | 36 | Ø6 | DD | 2B | 1B | 21 | A6 | 46 | 35 | 2Ø | 96 | C9 | F5 | C5 | D5 | E5 | DD | E5 | FD |
| E5 | CD | FØ | 11 | 21 | 14 | 4Ø | 35 | C2 | 98 | ØE | 36 | Ø4 | 3A | FF | 4Ø | 3D | FA | 48 | ØE | 32 |
| FF | 4Ø | CD | D4 | 17 | CD | Ø3 | 18 | CD | 37 | 18 | CD | EB | 14 | CD | 8F | 12 | FD | 21 | 1Ø | 47 |
| DD | 21 | 63 | 41 | 3E | ØØ | 32 | 62 | 41 | DD | 7E | Ø1 | 3C | CA | C6 | ØF | DD | 35 | Ø1 | C2 | C6 |
| ØF | DD | 7E | ØØ | ØF | E6 | ØE | 4F | Ø6 | ØØ | F3 | 21 | C6 | ØF | E5 | 21 | A3 | ØE | Ø9 | 5E | 23 |
| 56 | EB | E9 | FB | FD | 23 | 11 | Ø5 | ØØ | DD | 19 | 3A | 62 | 41 | 3C | FE | 8Ø | 38 | C9 | FD | E1 |
| DD | E1 | E1 | D1 | C1 | F1 | FB | ED | 4D | B3 | ØE | DB | ØE | ØF | ØF | 25 | ØF | 82 | ØF | A1 | ØF |
| CØ | ØF | C1 | ØF | DD | 7E | ØØ | F6 | 1C | DD | 77 | ØØ | CD | 7E | 14 | DD | 4E | Ø4 | Ø6 | ØØ | 21 |
| 19 | 44 | Ø9 | 36 | ØØ | CD | 8C | 15 | Ø6 | Ø2 | CD | CC | 15 | 79 | 1F | 3Ø | Ø5 | 16 | Ø4 | CD | CC |
| 15 | C9 | 3A | Ø1 | 4Ø | A7 | 28 | 29 | DD | 6E | Ø4 | 26 | ØØ | 4D | 44 | 29 | 29 | 11 | 18 | 4Ø | 19 |
| 7E | A7 | CA | ØA | ØF | Ø7 | EB | 21 | DØ | 4Ø | Ø9 | 77 | 6B | 62 | 23 | Ø1 | Ø3 | ØØ | ED | BØ | EB |
| 36 | ØØ | DD | 36 | Ø1 | 12 | C9 | DD | 36 | Ø1 | Ø1 | C9 | 3A | 62 | 41 | 4F | 3E | ØØ | 2F | ED | 79 |
| DD | 7E | ØØ | F6 | 1C | DD | 77 | ØØ | FD | 36 | ØØ | ØØ | C9 | CD | 7E | 14 | CD | 17 | 16 | CA | 34 |
| ØF | 3D | C8 | CB | 79 | 28 | 23 | FD | CB | ØØ | 5E | C2 | 45 | 11 | Ø6 | Ø9 | CD | CC | 15 | FD | 7E |
| ØØ | E6 | ØF | 4B | ED | 79 | DD | 7E | ØØ | E6 | E3 | F6 | 14 | DD | 77 | ØØ | DD | 36 | Ø1 | Ø2 | C9 |
| FD | 7E | ØØ | CB | 5F | C2 | BE | 1Ø | Ø6 | ØØ | CD | CC | 15 | FD | 7E | ØØ | E6 | ØF | 4F | Ø6 | Ø8 |
| CD | 71 | 12 | 79 | 4B | ED | 79 | DD | 7E | ØØ | E6 | E3 | F6 | Ø4 | DD | 77 | ØØ | DD | 36 | Ø1 | Ø1 |
| C9 | 3A | 62 | 41 | 4F | FD | 7E | ØØ | E6 | F3 | F6 | Ø4 | FD | 77 | ØØ | ED | 79 | DD | 7E | ØØ | E6 |
| E3 | F6 | Ø4 | DD | 77 | ØØ | DD | 36 | Ø1 | Ø1 | C9 | 3A | 62 | 41 | 4F | FD | 7E | ØØ | E6 | FØ | F6 |
| ØE | FD | 77 | ØØ | ED | 79 | DD | 7E | ØØ | E6 | E3 | F6 | Ø8 | DD | 77 | ØØ | DD | 36 | Ø1 | 3C | C9 |
| C9 | FD | CB | ØØ | AE | C9 | CD | 56 | 14 | CA | 88 | ØE | DD | 4E | Ø3 | CB | 21 | Ø6 | ØØ | 21 | EØ |
| ØF | Ø9 | 5E | 23 | 56 | 21 | 88 | ØE | E5 | EB | E9 | ØØ | 1Ø | 56 | 1Ø | 74 | 1Ø | 55 | 1Ø | 55 | 1Ø |
| 55 | 1Ø | 55 | 1Ø | 55 | 1Ø | BE | 1Ø | 93 | 1Ø | 93 | 1Ø | BE | 1Ø | BE | 1Ø | BE | 1Ø | BE | 1Ø | 6F |
| 11 | FD | CB | ØØ | 66 | 28 | 32 | FD | 36 | ØØ | ØØ | DD | 4E | Ø4 | CD | 7E | 14 | CD | 8C | 15 | Ø6 |
| Ø8 | CD | CC | 15 | 21 | 19 | 41 | 7B | Ø1 | 1Ø | ØØ | 23 | 23 | ED | A1 | 2Ø | F9 | 2B | 36 | FF |
| DD | 7E | ØØ | F6 | 1C | DD | 77 | ØØ | 4B | 3E | ØØ | 2F | ED | 79 | C9 | DD | 7E | ØØ | 4F | E6 | 1C |
| FE | 18 | CØ | 3E | 1C | B1 | DD | 77 | ØØ | 3A | 62 | 41 | 4F | FD | 7E | ØØ | E6 | ØF | 2Ø | Ø1 | 2F |
| ED | 79 | C9 | DD | CB | ØØ | 7E | C8 | FD | CB | ØØ | 66 | CØ | FD | CB | ØØ | E6 | DD | CB | ØØ | EE |
| CD | 7E | 14 | Ø6 | Ø5 | CD | CC | 15 | CD | 49 | 12 | C9 | DD | CB | ØØ | EE | CD | 7E | 14 | CD | 17 |
| 16 | DD | 36 | Ø1 | FF | 3E | ØØ | 4B | 2F | ED | 79 | DD | 7E | ØØ | E6 | E3 | F6 | 18 | DD | 77 | ØØ |
| C9 | DD | CB | ØØ | 7E | C8 | FD | CB | ØØ | 66 | 28 | Ø8 | DD | CB | Ø3 | 46 | CØ | C3 | BE | 1Ø | DD |
| CB | ØØ | 76 | CA | BE | 1Ø | CD | 7E | 14 | Ø6 | Ø6 | DD | CB | Ø3 | 4E | 28 | Ø2 | Ø6 | Ø7 | CD | CC |
| 15 | C9 | DD | CB | ØØ | 7E | CA | 4A | 11 | FD | CB | ØØ | 6E | CA | 62 | 11 | DD | 7E | ØØ | E6 | 1C |
| 28 | 4A | EE | 1C | CØ | DD | 7E | Ø3 | FE | Ø6 | 2Ø | Ø4 | DD | CB | ØØ | EE | CD | 7E | 14 | CD | 17 |
| 16 | F2 | 44 | 11 | Ø6 | ØØ | CD | CC | 15 | DD | 7E | Ø3 | Ø6 | ØØ | 21 | 19 | 44 | Ø9 | 77 | E6 | Ø7 |
| FE | Ø5 | 2Ø | Ø5 | DD | CB | ØØ | F6 | AF | FE | Ø6 | 2Ø | Ø2 | 3E | 1Ø | Ø6 | Ø1 | 4F | CD | CC | 15 |
| DD | 7E | ØØ | E6 | E3 | DD | 77 | ØØ | DD | 36 | Ø1 | 46 | C9 | DD | 36 | Ø1 | 46 | DD | 4E | Ø4 | Ø6 |
| ØØ | 21 | 19 | 44 | Ø9 | 7E | DD | 56 | Ø3 | BA | C8 | DD | 36 | Ø1 | FF | 72 | CD | 7E | 14 | Ø6 | Ø1 |
| 7A | E6 | Ø7 | F6 | 2Ø | 4F | CD | CC | 15 | C9 | CØ | DB | EØ | CB | 57 | CØ | 3A | 62 | 41 | 4F | 3E |
| Ø8 | 2F | ED | 79 | DD | 7E | ØØ | E6 | E3 | F6 | 14 | DD | 77 | ØØ | DD | 36 | Ø1 | Ø2 | C9 | DD | 36 |
| Ø2 | ØØ | FD | CB | ØØ | EE | DD | 36 | Ø1 | Ø3 | C9 | CD | 7E | 14 | DD | 4E | Ø4 | ØC | 28 | 65 | ØD |
| Ø6 | ØØ | DD | 7E | ØØ | E6 | 1C | 2Ø | 13 | 21 | 19 | 44 | Ø9 | 36 | ØØ | DD | CB | ØØ | 7E | 28 | 48 |
| Ø6 | Ø2 | CD | CC | 15 | 18 | 41 | FE | Ø4 | 2Ø | 1B | 21 | DØ | 4Ø | Ø9 | 36 | ØØ | 21 | 18 | 4Ø | CB |
| 21 | CB | 21 | Ø9 | Ø6 | Ø4 | 36 | ØØ | 23 | 1Ø | FB | CB | 39 | CB | 39 | 18 | 17 | FD | CB | ØØ | 66 |
| 2Ø | 11 | 21 | 19 | 41 | 7B | Ø1 | 1Ø | ØØ | 23 | 23 | ED | A1 | 2Ø | F9 | 2B | 36 | FF | DD | CB |
| ØØ | 7E | 28 | Ø5 | Ø6 | Ø9 | CD | CC | 15 | DD | CB | ØØ | AE | CD | 8C | 15 | FD | 36 | ØØ | ØØ | DD |
| 36 | Ø1 | FF | DD | 7E | ØØ | E6 | 83 | F6 | 18 | DD | 77 | ØØ | C9 | DD | 21 | 1C | 41 | DD | 7E | ØØ |
| FE | FF | 28 | 12 | CD | 5A | 14 | 28 | ØD | DD | 7E | Ø3 | FE | Ø1 | 2Ø | 1E | 12 | FE | Ø9 | CC | 3D |
| 12 | DD | 23 | DD | 23 | DD | 23 | DD | 23 | DD | 7E | ØØ | FE | 8Ø | 2Ø | DB | ED | 4D | 3A | DD | 46 |
| A7 | 28 | Ø5 | FE | Ø9 | 28 | Ø9 | C9 | DD | 4E | ØØ | 3E | Ø8 | 2F | ED | 79 | DD | 56 | Ø1 | DD | 5E |
| ØØ | Ø6 | Ø5 | CD | CC | 15 | C9 | DD | 56 | Ø1 | DD | 5E | ØØ | Ø6 | Ø6 | CD | CC | 15 | C9 | 21 | 1C |
| 41 | 3E | FF | Ø1 | 1Ø | ØØ | ED | A1 | 28 | Ø8 | E2 | 8A | 18 | 23 | 23 | 18 | F4 | 2B | 73 | 23 |
| DD | 7E | ØØ | E6 | Ø3 | 77 | 23 | DD | 7E | Ø2 | 77 | 23 | DD | 7E | Ø3 | 77 | C9 | 3A | C3 | 46 | CB |
| 5F | C8 | D5 | 2A | 43 | 46 | 11 | 9F | 46 | EB | A7 | ED | 52 | EB | D1 | C8 | 7Ø | 23 | 73 | 23 | 71 |
| 23 | 22 | 43 | 46 | C9 | DB | CØ | CB | 47 | 28 | 59 | 21 | DA | 46 | CB | B6 | 2A | 43 | 46 | 11 | 45 |
| 46 | A7 | ED | 52 | C8 | 21 | 45 | 46 | Ø6 | ØF | 3E | ØØ | 86 | 23 | 1Ø | FC | 57 | ØE | CØ | 21 | 45 |
| 46 | Ø6 | ØF | ED | B3 | ED | 51 | DB | CØ | CB | 47 | 2Ø | 39 | 3A | 5E | 41 | CB | CF | D3 | C8 | CB |
| 8F | D3 | C8 | EB | 2A | 43 | 46 | A7 | ED | 52 | 4D | 44 | EB | 11 | 45 | 46 | FA | E1 | 12 | CA | E1 |
| 12 | ED | BØ | EB | 22 | 43 | 46 | 3E | FF | Ø6 | ØF | 77 | 23 | 1Ø | FC | C9 | 3A | 5E | 41 | CB | CF |
| D3 | C8 | CB | 8F | D3 | C8 | C9 | 21 | DA | 46 | CB | F6 | C9 | F5 | C5 | D5 | E5 | DD | E5 | 21 | DB |
| 46 | CB | A6 | DB | CØ | CB | 4F | 28 | 6C | ØE | AØ | Ø6 | 1Ø | 21 | Ø2 | 4Ø | ED | B2 | 21 | Ø2 | 4Ø |
| Ø6 | ØF | 3E | ØØ | 86 | 23 | 1Ø | FC | 96 | 2Ø | 5A | 3A | DB | 46 | E6 | F9 | 32 | DB | 46 | 3E | FF |
| 32 | 11 | 4Ø | 21 | Ø2 | 4Ø | 22 | 12 | 4Ø | 7E | FE | FF | 28 | 42 | 11 | 72 | 13 | D5 | FE | Ø8 | CA |
| 45 | 14 | FE | Ø4 | CA | 8B | 13 | FE | Ø1 | CA | 8C | 13 | FE | Ø2 | CA | C5 | 13 | FE | ØØ | CA | 3F |
| 14 | FE | Ø4 | CA | B4 | 13 | FE | Ø7 | CA | 8D | 13 | FE | Ø6 | CA | 93 | 13 | FE | Ø5 | CA | 9C | 13 |
| E1 | 2A | 12 | 4Ø | 23 | 23 | 23 | 22 | 12 | 4Ø | 18 | BE | 21 | DB | 46 | CB | E6 | DD | E1 | E1 | D1 |
| C1 | F1 | FB | ED | 4D | C9 | C9 | 21 | DC | 46 | CB | D6 | C9 | 3A | DC | 46 | CB | 77 | CA | 8Ø | ØØ |
| C9 | 3A | DC | 46 | CB | 77 | CA | AA | 13 | Ø6 | Ø7 | CD | 77 | 12 | C9 | Ø6 | Ø4 | 3A | DC | 46 | 4F |
| CD | 77 | 12 | C9 | 23 | 23 | CB | 76 | 28 | Ø5 | 21 | DC | 46 | CB | EE | Ø6 | Ø2 | CD | A4 | Ø4 | C9 |
| 3A | DC | 46 | CB | 77 | C8 | 3A | 9F | 46 | 3C | 47 | 4F | 21 | C9 | 46 | 3E | Ø2 | 11 | Ø4 | ØØ | A6 |
| 19 | 1Ø | FC | C8 | 41 | 21 | A2 | 46 | 3E | Ø4 | A6 | 23 | 1Ø | FC | C8 | 21 | D8 | 46 | 7E | 21 | FB |
| 46 | 41 | 11 | Ø4 | ØØ | B6 | 19 | 1Ø | FC | E6 | 18 | CØ | 21 | A2 | 46 | 41 | CB | 96 | 23 | 1Ø | FB |
| ØD | 51 | 1E | ØØ | Ø6 | ØB | 4A | CB | 21 | CB | 21 | CB | 21 | CD | CC | 15 | 15 | F2 | ØA |
| 14 | 21 | 8F | 47 | 1E | 7F | Ø6 | Ø8 | 7E | E6 | ØF | 4F | 28 | Ø9 | E6 | Ø8 | 2Ø | Ø5 | E5 | CD | 77 |
| 12 | E1 | 2B | 1D | F2 | 21 | 14 | Ø6 | Ø4 | 3A | DC | 46 | 4F | CD | 77 | 12 | C9 | 21 | DB | 46 | CB |
| DE | C9 | 23 | 7E | EE | 3C | 4F | 23 | 7E | E6 | ØF | 21 | 1Ø | 47 | Ø6 | ØØ | Ø9 | 77 | C9 | 3A | 62 |

APPENDIX II-continued

COT Controller

| | | | | | | | | | | | | | | | | | | | |
|---|---|---|---|---|---|---|---|---|---|---|---|---|---|---|---|---|---|---|---|
| 41 | 4F | DD | 7E | Ø2 | 32 | DD | 46 | DD | 46 | Ø3 | DD | 7Ø | Ø2 | 9Ø | 57 | ED | 78 | 2F | E6 | ØF |
| DD | 77 | Ø3 | 5F | 9Ø | 28 | Ø8 | 7A | A7 | C8 | DD | 73 | Ø2 | AF | C9 | B2 | C9 | DD | 7E | ØØ | E6 |
| Ø3 | 57 | 3A | 62 | 41 | 5F | C9 | DD | 21 | 63 | 41 | DD | Ø9 | CB | 21 | CB | 21 | CB | 1Ø | DD | Ø9 |
| CB | 38 | CB | 19 | CB | 39 | C9 | 21 | D8 | 46 | 96 | Ø6 | ØD | 2E | Ø2 | DB | 88 | CB | 47 | CØ |
| 1Ø | F9 | 3E | FF | 2F | D3 | 8B | 3E | BD | 2F | D3 | 8A | 3E | CØ | F6 | 2E | 2F | D3 | 89 | 3E | 2E |
| 2F | D3 | 8B | Ø6 | ØE | 2D | 2Ø | DE | 21 | D8 | 46 | CB | D6 | C9 | DD | 7E | ØØ | E6 | 1C | D6 | 18 |
| C9 | 3E | 29 | 18 | Ø6 | 3E | Ø6 | 18 | Ø2 | 3E | Ø2 | 32 | ØF | 47 | 3A | ØF | 47 | A7 | 2Ø | FA | C9 |
| 3A | E5 | 43 | 47 | E6 | Ø8 | 2Ø | Ø2 | 3E | 1Ø | 4F | 3A | D8 | 46 | A1 | C8 | 78 | CB | AF | 2F | D3 |
| 88 | C9 | 21 | C7 | 46 | 34 | Ø6 | 1Ø | 3A | FE | 4Ø | EE | Ø8 | E6 | Ø9 | 2Ø | Ø2 | Ø6 | ØØ | 3A | E5 |
| 43 | E6 | Ø8 | 2Ø | Ø2 | 3E | 1Ø | 4F | 3A | D8 | 46 | BØ | 47 | A1 | 2Ø | ØB | 78 | E6 | 6Ø | 2Ø | Ø6 |
| 3A | E5 | 43 | C3 | 43 | 15 | 78 | E6 | 18 | 2Ø | Ø9 | 3A | E5 | 43 | E6 | Ø8 | EE | Ø8 | 18 | Ø5 | EE |
| 18 | C8 | E6 | Ø8 | F6 | 3Ø | 32 | E5 | 43 | 2F | D3 | 88 | D3 | 88 | E6 | Ø8 | 47 | 3A | FE | 4Ø | CB |
| 47 | 28 | Ø5 | DB | F8 | E6 | Ø8 | 47 | 3A | 5E | 41 | E6 | F7 | BØ | 32 | 5E | 41 | D3 | C8 | 3E | Ø5 |
| 32 | BØ | 47 | A7 | C9 | ØE | 7F | 21 | 8F | 47 | ED | AB | ØD | F2 | 73 | 15 | C9 | Ø6 | Ø2 | 23 | 7E |
| 57 | 23 | 7E | Ø7 | 17 | 17 | 17 | B2 | 57 | Ø5 | C8 | 5F | 18 | FØ | DD | CB | ØØ | 6E | 2Ø | 2C | DD |
| 36 | Ø4 | FF | 21 | EØ | 46 | Ø6 | ØØ | Ø9 | 36 | FF | 21 | BC | BF | 79 | 1F | 3Ø | Ø8 | Ø6 | Ø3 | CD |
| 71 | 12 | 21 | BF | 7F | E5 | CD | 9E | 14 | E1 | 7D | 2F | D3 | 8A | 7C | 2F | D3 | 89 | 79 | 2F | D3 |
| 8B | DD | CB | ØØ | 7E | 28 | Ø5 | Ø6 | Ø3 | CD | CC | 15 | Ø6 | ØØ | C9 | 7A | D5 | 21 | 47 | 44 | ED |
| 5B | EA | 43 | A7 | ED | 52 | 3C | 19 | 3D | 2Ø | FC | 5E | 23 | 56 | 2B | ED | 53 | E6 | 43 | 22 | C4 |
| 46 | ED | 5B | EA | 43 | 19 | ED | 5B | E6 | 43 | A7 | ED | 52 | CA | 15 | 16 | EB | D1 | D5 | 7Ø | 23 |
| 73 | 23 | 7B | 1F | 1F | 1F | 1F | 77 | 23 | 79 | 1F | 1F | 1F | 77 | 23 | EB | 2A | C4 |
| 46 | 73 | 23 | 72 | D1 | C9 | 21 | ØC | 47 | 3E | FF | DD | BE | Ø4 | 28 | Ø6 | DD | 4E | Ø4 | C3 | 12 |
| 17 | CD | CF | 14 | CA | 12 | 17 | 3E | FF | Ø6 | 17 | BE | 28 | 37 | 2B | 2B | 1Ø | F9 | DD | CB | ØØ |
| 6E | 2Ø | 3B | 3A | 61 | 41 | A7 | CA | 12 | 17 | 3A | C3 | 46 | CB | 5F | 3E | ØØ | CA | 12 | 17 | DD |
| 36 | Ø4 | 8Ø | DD | 7E | ØØ | E6 | E3 | F6 | ØC | DD | 77 | ØØ | DD | 36 | Ø1 | Ø4 | Ø6 | Ø1 | CD | 71 |
| 12 | 3E | Ø1 | C3 | 12 | 17 | Ø5 | 48 | CB | 21 | DD | CB | ØØ | 6E | 28 | 69 | CB | FB | 18 | 65 | 21 |
| F6 | 46 | Ø6 | 17 | CB | 7E | 28 | Ø6 | 2B | 1Ø | F9 | C3 | 8A | 18 | 48 | Ø6 | ØØ | D5 | E5 | 5E | 21 |
| 19 | 44 | Ø9 | 36 | ØØ | 21 | DØ | 4Ø | Ø9 | 36 | ØØ | 51 | CB | 21 | CB | 21 | 21 | 18 | 4Ø | Ø9 | Ø6 |
| Ø4 | 36 | ØØ | 23 | 1Ø | FB | 4A | 43 | 16 | ØØ | 21 | 1Ø | 47 | 19 | 36 | ØØ | 21 | 63 | 41 | 19 | CB |
| 23 | CB | 23 | CB | 12 | 19 | 7E | E6 | Ø3 | 57 | 7E | E6 | E3 | F6 | 14 | 77 | 23 | 36 | Ø2 | 23 | 23 |
| 23 | 36 | FF | 58 | Ø6 | Ø9 | CD | CC | 15 | Ø6 | Ø3 | CD | CC | 15 | E1 | D1 | 3A | DF | 46 | BB | 2Ø |
| 15 | E5 | CD | 9E | 14 | 21 | BC | BF | 7D | 2F | D3 | 8A | 7C | 2F | D3 | 89 | 3E | ØØ | 2F | D3 | 8B |
| E1 | 73 | CB | BB | DD | 71 | Ø4 | CD | 9E | 14 | 7B | 2F | D3 | 8A | 3E | CØ | B1 | 2F | D3 | 89 | 79 |
| 2F | D3 | 8B | 3E | FF | A7 | C9 | 2A | AB | 46 | 22 | BF | 46 | 2A | A7 | 46 | 22 | C1 | 46 | DB | F8 |
| E6 | Ø8 | 21 | D8 | 46 | DB | E8 | 32 | C3 | 46 | 28 | ØC | 3A | 5E | 41 | CB | DF | 32 | 5E | 41 | D3 |
| C8 | 18 | 1Ø | CD | 9Ø | 17 | FE | Ø2 | 28 | ØB | 21 | D8 | 46 | CB | 9E | FE | ØØ | 28 | Ø2 | CB | DE |
| 2A | BF | 46 | 22 | AB | 46 | 2A | C1 | 46 | 2A | A7 | 46 | 2A | B3 | 46 | 22 | BF | 46 | 2A | A9 | 46 |
| 22 | C1 | 46 | 3A | FE | 4Ø | E6 | Ø8 | 28 | ØC | 3A | C3 | 46 | CB | 3F | CD | 9Ø | 17 | FE | Ø2 | 28 |
| ØB | 21 | D8 | 46 | CB | A6 | FE | ØØ | 28 | Ø2 | CB | E6 | 2A | BF | 46 | 22 | B3 | 46 | 2A | C1 | 46 |
| 22 | A9 | 46 | ED | 4D | CB | 47 | 28 | Ø7 | 2A | BF | 46 | 23 | 22 | BF | 46 | 2A | C1 | 46 | 2B | 22 |
| C1 | 46 | 7C | B5 | C2 | D1 | 17 | 2A | BF | 46 | Ø1 | ØØ | A7 | ED | 42 | F2 | C2 | 17 | 2A | BB |
| 46 | 22 | C1 | 46 | 21 | ØØ | ØØ | 22 | BF | 46 | 3E | ØØ | C9 | 2A | BD | 46 | 22 | C1 | 46 | 21 | ØØ |
| ØØ | 22 | BF | 46 | 3E | Ø1 | C9 | 3E | Ø2 | C9 | 21 | DA | 46 | CB | 86 | DB | F8 | CB | 47 | CA | E2 |
| 17 | CB | C6 | CB | 8E | DB | F8 | CB | 4F | CA | ED | 17 | CB | CE | 3A | FE | 4Ø | CB | 57 | 2Ø | ØE |
| 21 | DA | 46 | 7E | E6 | Ø3 | FE | Ø3 | 28 | Ø4 | CB | 8E | CB | 86 | C9 | DB | 88 | 2F | CB | 4F | CA |
| 24 | 18 | 3A | E5 | 43 | 2F | D3 | 88 | 3A | 5D | 41 | A7 | CA | 1D | 18 | 21 | D8 | 46 | CB | EE | 3E |
| Ø7 | 32 | 5D | 41 | 18 | 12 | 3A | 5D | 41 | A7 | CA | 31 | 18 | 3D | 32 | 5D | 41 | 18 | Ø5 | 21 | D8 |
| 46 | CB | AE | C9 | 21 | D8 | 46 | CB | B6 | DB | 88 | 2F | CB | 57 | CA | 46 | 18 | CB | F6 | 3A | E5 |
| 43 | 2F | D3 | 88 | C9 | 21 | D9 | 46 | CB | 8E | DB | EØ | CB | 47 | CA | 63 | 18 | 3A | C3 | 46 | CB |
| 5F | C2 | 63 | 18 | CB | CE | 21 | 5F | 41 | CB | 26 | 3A | FE | 4Ø | CB | 47 | 28 | ØA | DB | 8Ø | 2F |
| CB | 5F | CA | 79 | 18 | CB | C6 | 7E | E6 | Ø7 | FE | Ø7 | 21 | D9 | 46 | C2 | 87 | 18 | CB | D6 | C9 |
| CB | 96 | C9 | C3 | 8A | 18 | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |
| FF | FF | FF | FF | FF | FF | FF | FF | FF | FF | FF | FF | FF | FF | FF | FF | FF | FF | FF | FF | FF |

APPENDIX II-continued

COT Controller

```
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
FF FF FF FF FF FF FF FF FF FF FF FF FF FF FF FF FF FF FF FF FF
AF E3
```

What is claimed is:

1. A telephone system ring signal scheduler, comprising:
    clock means for establishing successive clock periods;
    first and second telephone lines, each said line for coupling to a plurality of telephones, each said telephone responsive to a ring signal having a different characteristic;
    ring signal generator means responsive to said clock means for producing a ring signal having a first characteristic during a first one of said successive clock periods, and a different second characteristic during a second one of said successive clock periods; and
    a controller means for sorting telephones being called into ring signal compatible groups of less than or equal to a predetermined maximum number of lines coupled to telephones responsive to a ring signal of common characteristics and for causing said ring signal generator means to generate and apply a ring signal having said common characteristics to each said group, each said group receiving its particular common ring signal during a particular clock period selected by said controller means.

2. An apparatus, as defined in claim 1, wherein said ring signal characteristics are frequency and voltage polarity.

3. An apparatus, as defined in claim 1, wherein said controller means sends signals to said ring signal generator means to control the frequency of said ring signal and the polarity of the voltage upon which said ring signal is superimposed.

4. A ring signal scheduler for a multiple telephone system, comprising:
- means for generating a ring signal, said ring signal having a first characteristic during a first time period and a second characteristic during a second time period;
- a first telephone responsive to a ring signal having said first characteristic;
- a second telephone responsive to a ring signal having said second characteristic; and
- controller means for connecting said generating means to said first and second telephones, said controller means disconnecting said first telephone from said generating means during said second time period and disconnecting said second telephone from said generating means during said first time period, said controller means also for sorting all the telephones being called into voltage and frequency compatible groups with respect to the particular characteristics of the ring signal, said telephones respond to, each said group being of a size less than a predetermined maximum number of telephones, and assigning said groups to portions of a duty cycle, and for sending data to said generating means to control the frequency of the ring signal generated and the polarity of the DC signal upon which the ring signal is superimposed for each portion of said duty cycle and for applying the ring signal during any particular portion of said duty cycle to the group of telephones responsive to a ring signal of that particular characteristic.

5. An apparatus, as defined in claim 4, further comprising a third telephone responsive to a ring signal having a third characteristic and wherein said controller means connects said generating means to said third telephone and disconnects said third telephone from said generating means during said first and second time periods.

6. A ring signal scheduler for a multiple telephone system, comprising:
- means for generating a ring signal, said ring signal having a first characteristic during a first time period and a second characteristic during a second time period;
- a first telephone responsive to a ring signal having said first characteristic; and
- a second telephone responsive to a ring signal having said second characteristic; and
- telephone interface means for connecting said generating means to said first and second telephones, said interface means disconnecting said first telephone from said ring signal generating means during said second time period and disconnecting said second telephone from said ring signal generating means during said first time period, said ring signal scheduler further comprising a third telephone responsive to a ring signal having said first characteristic and a fourth telephone responsive to a ring signal having said second characteristic and wherein said telephone interface means disconnects said first and third telephones from said ring signal generating means during said second time period and disconnects said second and fourth telephones from said ring signal generating means during said first time period.

7. An apparatus, as defined in claim 6, wherein said first and third telephones are not connected to the same telephone line and said second and fourth telephones are not connected to the same telephone line.

8. An apparatus, as defined in claim 6 or 7 wherein said telephone interface means includes means for limiting to a predetermined number the number of telephones in a group of telephones responsive to a ring signal having said first characteristic which are coupled to said ring signal generating means during said first time period and for limiting to a predetermined number the number of telephones in a group of telephones responsive to a ring signal having said second characteristic which are coupled to said ring signal generating means during said second time period.

9. An apparatus, as defined in claim 5, or 6, or 7, wherein said first and second characteristics include frequency.

10. An apparatus, as defined in claim 4, or 5, or 6, or 7, wherein said first and second characteristics include polarity of a D.C. voltage level upon which said ring signal is superimposed.

11. A ring signal scheduler for a multiple telephone system, comprising:
- means for ringing a first limited subgroup of said multiple telephones responsive to ring signals having a first characteristic during a first plurality of ring periods;
- means for ringing a second limited subgroup of said multiple telephones responsive to ring signals having a second characteristic during a second plurality of ring periods; and
- scheduling means for controlling said first plurality of ring periods and said second plurality of ring periods to prohibit said first and second plurality of ring periods from overlapping in time and for assigning and limiting the number of assigned telephones in each of said first and second subgroups and for controlling said means for ringing so that ring signals of said first characteristic are generated during said first plurality of ring periods and so that ring signals having said second characteristic are generated by said means for ringing during said second plurality of ring periods to limit peak ringing power consumption.

12. An apparatus, as defined in claim 11, further comprising means for ringing a third limited subgroup of said multiple telephones during a third plurality of ring periods and wherein said scheduling means also controls the size of said third subgroup and controls said third plurality of ring periods from overlapping in time with either of said first or second pluralities of ring periods.

13. An apparatus, as defined in claim 11, wherein said scheduling means limits the number of telephones in each subgroup to less than or equal to a predetermined number, said predetermined number being determined based upon the ring current supply capacity of the means for ringing.

14. An apparatus for generating a ring signal in a multiple telephone system, comprising:
- means for selectively generating a ring signal having a first or second characteristic; and
- means for controlling said generating means causing said generating means to generate said ring signal having said first characteristic during a first time period and causing said generating means to generate said ring signal having said second characteristic during a second time period, and for sorting the telephones being called into first and second ring signal compatible groups, each telephone in said first group responsive to a ring signal having said first characteristic and each telephone in said second group responsive to a ring signal having said second characteristic, said controlling means also for applying said ring signal to said first group during said first time period and for applying said ring signal to said second group during said second time period.

15. An apparatus, as defined in claim 14, wherein said first and second characteristics include frequency.

16. An apparatus, as defined in claim 14, wherein said first and second characteristics include the polarity of the D.C. voltage level upon which said ring signal is superimposed.

17. An apparatus, as defined in claim 13, wherein said scheduling means controls the characteristic of said ring signal by generating a digital control word and transferring it to said means for ringing.

18. An apparatus for generating a ring signal in a multiple telephone system, comprising:
a clock;
means responsive to said clock for generating said ring signal by dividing said clock signal by a factor N;
plural telephones connected by a common communication link to said generating means, each said telephone responsive to a different frequency ring signal; and
means for ringing selected ones of said plural telephones by changing N.

19. An apparatus, as defined in claim 18, wherein said means for ringing rings two or more said plural telephones by alternating between two or more values of N.

20. An apparatus, as defined in claim 19, wherein N is represented by a digital control word and said means for ringing schedules the telephones to be rung into frequency compatible groups of a predetermined maximum number of telephones and includes means for limiting the maximum number of telephones being rung for any selected N to said predetermined maximum.

21. An apparatus for generating a ring signal in a digital multiplexed telecommunication system including:
a transformer having a primary winding and a secondary winding, said transformer having a ring signal output and a D.C. input coupled to its secondary winding;
an amplifier having its output coupled to and driving the primary winding of said transformer;
a signal generator having a control word input for receiving digital data indicating the frequency of periodic waveform to be generated and having an output coupled to the input of said amplifier;
a latch means for storing control word data having a data output coupled to the control word input of the signal generator and having a polarity data output and having a data input for receiving digital data indicating frequency and polarity and an address and control input for receiving signals indicating when data is to be loaded from said data input into the latch; and
a means coupled to the polarity data output of said latch means and to the D.C. input of the secondary winding for controlling whether a positive or negative DC voltage is applied to the DC input.

22. An apparatus for generating a ring signal in a digital multiplexed telecommunication system including:
a transformer having a primary winding and a secondary winding, said secondary winding inductively coupled to said primary winding and said secondary winding having an output for the ring signal generated therein and having a DC input for receiving either a positive predetermined DC voltage or a negative predetermined DC voltage;
a first means having an output coupled to the primary winding of the transformer and having an input for receiving a clock signal, and having inputs for receiving a control word for determining frequency, said first means for generating a ring signal having a periodic waveform and a frequency determined by said control word; and
a second means having outputs for a control word coupled to the control word inputs of the first means and having an output coupled to the DC input of the secondary winding of said transformer and having data, address and control word inputs for receiving digital data, said second means for determining from said input digital data when and whether the positive predetermined DC voltage or the negative predetermined DC voltage is to be applied to the DC input of the secondary winding of said transformer and for applying the selected DC voltage, and for determining from the digital input data when and what frequency of ringing signal is to be generated, and for generating a control word for controlling said first means so as to produce a ring signal of that frequency.

23. An apparatus for generating a ring signal in a digital multiplexed telecommunications system including:
a transformer having a primary winding and a secondary winding, said secondary winding having an output for a ring signal and having a DC input for receiving a predetermined positive DC voltage or a predetermined negative DC voltage;
an amplifier having an output coupled to the primary winding of the transformer and having an input, said amplifier for amplifying a ring signal applied to said input and for applying the amplified ring signal to said primary winding;
an optical coupler having an output coupled to the input of said amplifier and having an input, said optical coupler for isolating the amplifier circuitry on the output side from the logic circuitry on the input side so that transients on the output side cannot be coupled to the input side to destroy the logic circuitry;
a signal generator for generating a ring signal in the form of a periodic waveform of a specified frequency, and having an output coupled to the input of the optical coupler and having an input for receiving a clock signal of a fixed frequency and having an input for receiving a digital data control word specifying the frequency of the ring signal periodic waveform which is to be generated by the signal generator from the clock signal; and
a control means coupled to the control word input of said signal generator and having an output coupled to the DC input of said secondary winding and having data, address and control inputs for receiving digital data which specifies when and what frequency ring signal is to be generated by said signal generator and when and whether a positive DC voltage or a negative DC voltage is to be applied to the DC input of the secondary winding of said transformer, and for storing said digital input data and applying it to said control word input and for causing the selected polarity DC voltage to be applied to said DC input of said secondary winding of said transformer.

24. An apparatus, as defined in claim 23, wherein said amplifier is comprised of push-pull Darlington pair stages coupled to two primary windings of the transformer.

25. An apparatus, as defined in claim 23 or 24, wherein said signal generator includes a divide-by-N counter having an input coupled to a clock signal of a fixed frequency, and having an input for receiving a digital control word specifying the factor N by which the frequency of the clock signal is to be divided, and for generating an output signal which is a periodic waveform of a frequency which is equal to the frequency of the incoming clock signal divided by the factor N specified by the control word.

26. An apparatus, as defined in claim 25, wherein the output of said divide-by-N counter is coupled to the input of a square wave generator which causes the output signal from the divide-by-N counter to be transformed into a square wave and applied to the input of said optical coupler.

27. An apparatus, as defined in claim 26, wherein said control means includes:
- a latch having data inputs and data outputs and a clock input, said latch for receiving digital data at said data input specifying the polarity of DC voltage to apply to the DC input of the secondary winding of the transformer, said data input also for receiving digital data specifying the frequency of ring signal to be generated and for storing said data and applying said data in the form of a control word to the control word input of said divide-by-N counter;
- a means for driving a relay coupled to one of said data outputs of said latch and having an output;
- a DC voltage source of a fixed, predetermined voltage level and having both a positive and a negative DC voltage output measured with respect to DC ground;
- a relay having its coil coupled to the output of said means for driving a relay and having a contact coupling alternately either the positive or the negative DC voltage output of the DC voltage source to the DC input of the secondary winding of the transformer depending upon the energization state of the relay coil;
- a decoder means having an address input for receiving address data and a control input for receiving control signals, said decoder means for converting the address and control signals at its inputs into control signals coupled to said latch for controlling when loading of the latch occurs; and
- a controller including a programmed digital computer, said controller having data outputs coupled to the data inputs of the latch and having address and control outputs coupled to the address and control inputs of the decoder, said controller programmed to determine at any particular time the frequency of the ring signal to be generated by the signal generator and the polarity of the DC voltage to be applied to the DC input of the secondary winding of the transformer and for generating the proper data, control, and address signals to cause these conditions to occur.

28. An apparatus for generating a ring signal in a digital multiplexed telecommunication system including:
- a controller having data, address and control outputs;
- a transformer having two primary windings and a secondary winding, said secondary winding having an output for a ring signal and having a DC input for receiving a predetermined positive DC voltage or a predetermined negative DC voltage;
- an amplifier comprised of two Darlington pairs in push-pull operation, each pair driving one of the primary windings of the transformer and each having a signal input;
- two optical couplers each coupled to the signal input of one of the Darlington pairs and each having a signal input;
- a first means having a signal output coupled to the signal input of the optical coupler for lowering power dissipation in the optical coupler and the Darlington pairs upon the appearance of a power down signal at a power down input and having a signal input for receiving a square wave ring signal and passing it through to said signal output in the absence of said power down signal;
- a square wave generator having a signal output coupled to the signal input of the first means and having an input for receiving a clock signal of a fixed frequency and control word inputs for receiving a digital control word which determines the frequency of the square wave generated by said square wave generator at said signal output of said square wave generator;
- a latch having data outputs coupled to the control word inputs of the square wave generator and having data inputs for receiving digital data from said controller's data outputs specifying the control word and having a clock input for receiving a signal specifying when said input data is to be loaded, said latch for storing said input data and applying it as said control word to the signal generator;
- a decoder having address inputs for receiving a plurality of binary address bits from said controller's address outputs and having a plurality of enable outputs, one of which is coupled to the clock input of the latch, said decoder for decoding said address bits and for applying an enable signal to one of said enable outputs, said decoder also having an enable input;
- a second means having a control signal input for receiving a control signal from said controller's control outputs indicating when said decoder is to be enabled and having an enable output coupled to the enable input of said decoder, said second means for enabling the decoder upon receipt of the control signal;
- a first flip-flop having a data input coupled to an on/off bit data line at the data input of said latch and having a clock input coupled to an enable output of said decoder, and having an output coupled to said first means, said first flip-flop for loading the data on said on/off bit data input line upon receipt of an enable signal from said decoder and for storing the data and applying it to said first means for causing said first means to lower power dissipation for one binary state of said on/off bit but not for the other;

a second flip-flop having a data input coupled to a polarity indicating bit data input line at the input of said latch and having a clock input coupled to an enable output of said decoder for storing the binary state of said polarity bit upon receipt of an enable signal from said decoder and for presenting it at a data output;

a relay driver having an input coupled to said data output of said second flip-flop and having an output; and a relay having its coil coupled to the output of said relay driver and having a contact alternately coupling said DC input of the secondary winding of the transformer to either a positive DC voltage or a negative DC voltage depending upon the energization state of the relay coil.

29. An apparatus, as defined in claim 28, further comprising:

a cross-over means coupled to said ring signal output of said secondary winding and having an input coupled to said controller for receiving control signals indicating that a failure of a similar ring signal generating apparatus in another part of said digital multiplexed telecommunication system has occurred, said means for directing the ring signal at the ring signal output of said secondary winding to said other part of the telecommunication system for use there.

30. An apparatus, as defined in claim 28 or 29, further comprising:

an alarm means having an input coupled to said ring signal ouput of said secondary winding for detecting when no ring signal is present there and having an alarm bit output and having an enable input, said alarm means for detecting when the ring signal voltage is not present and for generating a signal coupled to said alarm bit output so indicating when enabled; and an enabling means having control inputs for receiving control signals indicating said alarm bit output is to be enabled and having an enable output coupled to the enable input of said alarm means for enabling it.

31. An apparatus, as defined in claim 30, wherein said transformer includes a second secondary winding inductively coupled to said primary windings for generating a voltage therein proportional to the ring signal voltage in said primary windings and further comprising a low voltage alarm means having an input coupled to the second secondary winding for detecting when the voltage generated therein is lower than a reference voltage indicating that the ring signal at the ring signal output is insufficient, and having an alarm bit output and having an enable input, and further comprising a second enabling means having control signal inputs for receiving control signals indicating when said alarm bit is to be enabled and having an output coupled to the enable input of the low voltage alarm means for enabling it.

32. An apparatus, as defined in claim 21, or 22, or 25, or 26, or 30, or 31 in a digital multiplexed telephone system including a central office terminal, further comprising:

a plurality of telephones each connected to a plurality of common telephone lines comprised of a tip and a ring line, groups of which telephones are responsive to a different frequency ring signal superimposed upon either a positive or negative DC voltage applied either to said tip or said ring line and different groups of which telephones are coupled to common telephone lines, and where no two telephones coupled to a common telephone line respond to the same ring signal frequency, polarity, and tip or ring input;

a line interface means coupled to each said common telephone line for applying a ring signal received at a ring signal input to either the tip or ring line and having a first data port for receiving a digital ring code indicating whether the ring signal should be applied to either the tip or ring line and having first control and address inputs for receiving digital data indicating when a particular telephone is being called such that the common telephone line coupled to the telephone being called should have said ring signal applied to it, said line interface circuit also for converting in first conversion means analog signals from said called telephone to digital data and presenting said data at a bidirectional second data port, and for converting in second conversion means data received at said bidirectional data port into analog signals for coupling to said called telephone and said line interface circuit having second control and address inputs for receiving signals indicating which common telephone line is desired and when data from said called telephone should be presented at the bidirectional second data port and when data arriving at the bidirectional second data port should be converted to analog signals and applied to the called telephone;

a multiplexer means having a serial data input and a serial data output and having a bidirectional parallel data port coupled to said second data port of said line interface means and having data, address and control ports, said address and control ports each coupled to said second control and address inputs of said line interface means, said multiplexer for converting serial format digital data received at said serial data input into parallel format data and for converting parallel format digital data received at said parallel data port into serial format data, and for dividing the time on said serial data input and said serial data output and the time on said bidirectional parallel data port into time slots, and for generating the proper address and control signals at the multiplexer's address and control ports to establish bidirectional data transfers to and from a called telephone during a selected time slot utilizing data received at said serial data input during a first portion of said selected time slot for transmission to the selected telephone via the bidirectional parallel data port, and utilizing data received from said called telephone at said bidirectional data port during a second portion of said time slot for conversion to serial format and transmission out from said serial data output, said selection of the common telephone line to be addressed coupled to said called telephone and the time slot during which the link is to be established being determined by control word data received at said data, address and control ports; and a controller means having data, address and control ports coupled to said data, address and control ports of the multiplexer means and coupled to said first data port and said first control and address inputs of said line interface means and coupled to the data, address and control inputs of the latch and decoder means of said ring signal generator, said controller for receiving data from said central office terminal over a supervisory time slot indicating which telephones are being called and what ring code is assigned to that telephone and what time slot is assigned for the call, and for sorting the telephones being called into one or more groups of up to a predetermined maximum number of telephones, each called telephone in the sorted groups responsive to the same frequency ring signal superimposed upon the same polarity fixed DC voltage, and for addressing the latch means and writing suitable data to establish the proper frequency and polarity, and for writing the proper ring code to the line interface means to cause it to apply the ring signal to the proper tip or ring line of the common telephone line coupled to each called telephone in the group being rung during that portion of a ring signal duty cycle established by said controller, and for addressing the multiplexer means and writing the proper control words to it to establish the proper links during the assigned time slots for the various called telephones in the various groups.

33. An apparatus, as defined in claim 32, further comprising:

a means for self-testing of idle telephone lines, said self-testing means having a first bidirectional data port coupled to said bidirectional parallel data port of said multiplexer, and having first address inputs coupled to said address ports of said multiplexer and having first control inputs coupled to said control ports of said multiplexer and having a second bidirectional data port coupled to said data ports of said controller and having second address and control inputs coupled to the address and control ports of said controller, said self-testing means for generating binary data representing a periodic analog signal and transmitting it to said bidirectional parallel data port of said multiplexer upon receipt of the proper address and control signals from the multiplexer and for detecting, upon receipt of the proper address and control signals from the multiplexer and the proper data, address and control signals from the controller, whether binary data received at the first bidirectional data port from the multiplexer represents the periodic analog signal which was sent out; and wherein said controller is further programmed to determine which telephones are not in use and to send a control word to said multiplexer causing it to establish a data link between the line interface means coupled to the idle telephone and the means for self-testing during a designated time slot so that binary test data from said means for self-testing will be sent to the selected line interface means, transmitted through the second conversion means thereof, converted to an analog signal, looped back through the first conversion means of said line interface means and reconverted to binary data and sent back through the multiplexer to the means for self-test where the returned data is tested to see if it represents a periodic waveform so as to test the circuitry involved in this transfer.

34. An apparatus, as defined in claim 33, further comprising a display and alarm means coupled to the data and address and control ports of said controller such that when said controller reads the results of the self-test via its data port and finds a malfunction, the controller can address the display and alarm means and set an alarm and display the location of the malfunction via its bidirectional data port.

* * * * *